(12) United States Patent
Morrison

(10) Patent No.: US 10,570,222 B2
(45) Date of Patent: Feb. 25, 2020

(54) THERMALLY TUNABLE PHOSPHINIMINE CATALYSTS

(71) Applicant: NOVA Chemicals (International) S.A., Fribourg (CH)

(72) Inventor: Darryl J. Morrison, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 16/342,328

(22) PCT Filed: Oct. 12, 2017

(86) PCT No.: PCT/IB2017/056331
§ 371 (c)(1),
(2) Date: Apr. 16, 2019

(87) PCT Pub. No.: WO2018/073705
PCT Pub. Date: Apr. 26, 2018

(65) Prior Publication Data
US 2019/0241683 A1 Aug. 8, 2019

(30) Foreign Application Priority Data

Oct. 19, 2016 (CA) ..................................... 2945595

(51) Int. Cl.
*C08F 4/6592* (2006.01)
*C08F 4/659* (2006.01)
(Continued)

(52) U.S. Cl.
CPC ........ *C08F 4/6592* (2013.01); *C08F 4/65908* (2013.01); *C08F 4/65912* (2013.01);
(Continued)

(58) Field of Classification Search
CPC .. C08F 4/6592; C08F 4/65908; C08F 210/16; C08F 4/65912
See application file for complete search history.

(56) References Cited

U.S. PATENT DOCUMENTS 5,376,439 A 12/1994 Hodgson et al.
5,589,555 A 12/1996 Zboril et al.
(Continued)

FOREIGN PATENT DOCUMENTS

WO 93/03093 A1 2/1993

OTHER PUBLICATIONS

ASTM D6474-99 (Reapproved 2006)—Standard Test Method for Determining Molecular Weight Distribution and Molecular Weight Averages of Polyolefins by High Temperature Gel Permeation Chromatography; Copyright ASTM International. Current edition approved Mar. 15, 2006. Published Apr. 2006. Originally approved in 1999. Last previous edition approved in 1999 as D6474-99. pp. 1-6.

(Continued)

*Primary Examiner* — Catherine S Branch
(74) *Attorney, Agent, or Firm* — Thomas J. Styslinger

(57) ABSTRACT

A new phosphinimine polymerization catalyst exhibits restricted rotation about a carbon-phosphorous bond. The restricted rotation is demonstrated using variable temperature $^1$H NMR. Ethylene copolymers made using the catalysts have microstructures which are dependent on the temperature at which polymerization takes place.

11 Claims, 30 Drawing Sheets

(51) Int. Cl.
*C08F 210/16* (2006.01)
*B01J 31/18* (2006.01)
*C08F 2/06* (2006.01)

(52) U.S. Cl.
CPC ......... *C08F 210/16* (2013.01); *B01J 31/1845* (2013.01); *C08F 2/06* (2013.01)

(56) References Cited

U.S. PATENT DOCUMENTS

| 6,160,064 | A | 12/2000 | Waymouth et al. |
| 6,372,864 | B1 | 4/2002 | Brown |
| 6,559,262 | B1 | 5/2003 | Waymouth et al. |
| 6,777,509 | B2 | 8/2004 | Brown et al. |
| 6,960,550 | B2 | 11/2005 | Waymouth et al. |
| 6,984,695 | B2 | 1/2006 | Brown et al. |

OTHER PUBLICATIONS

Pangborn, Amy B.; Giardello, Michael A.; Grubbs, Robert H.; Rosen, Robert K. and Timmers, Francis J.; Safe and Convenient Procedure for Solvent Purification, Copyright 1996 American Chemical Society; Organometallics, vol. 15, pp. 1518-1520.

Maldanis, Richard J.; Chien, James C.W. and Rausch; The formation and polymerization behavior of (pentafluorophenyl)-cyclopentadienyl titanium compounds, Journal or Organometallic Chemistry 599 (2000). pp. 107-111.

Miller, Stephen A. and Bercaw, John E.; Highly Stereoregular Syndiotactic Polypropylene Formation with Metallocene Catalysts via Influence of Distal Ligand Substituents; Copyright 2004 American Chemical Society; Organometallics 2004, vol. 23, pp. 1777-1789.

Stephen, Douglas W.; Stewart, Jeffrey C.; Guerin, Frederic; Courtenay, Silke; Kickham, James; Hollink, Emily; Beddie, Chad; Hoskin, Aaron; Graham, Todd; Wei, Pingrong; Spence, Rupert E. v. H.; Wei, Xu, Koch, Linda; Gao, Xiaoliang and Harrison, Daryll G.; An Approach to Catalyst Design: Cyclopentadienyl-Titanium Phosphinimide Complexes in Ethylene Polymerization; Copyright 2003 American Chemical Society; Organometallics 2003, vol. 22; pp. 1937-1947.

Gunther, Harald; NMR Spectroscopy; 9: The Influence of Dynamic Effects on H Nublear Magnetic Resonance Spectra; Second Edition; Copyright John Wiley & Sons 1995; pp. 336-345.

Tonks, Ian A.; Tofan, Daniel; Weintrob, Edward C.; Agapie, Theodor and Bercaw, John E.; Zirconium and Titanium Propylene Polymerization precatalysts Supported by a Fluxional C2-Symmetric Bis(anilide)pyridine Ligand; Copyright 2012, American Chemical Society; Organometallics, pp. 1965-1974.

THERMALLY TUNABLE PHOSPHINIMINE CATALYSTS

TECHNICAL FIELD

The present disclosures provides phosphinimine polymerization catalysts exhibiting variable single-site/multi-site behavior. The catalysts allow one to tune the microstructure of ethylene copolymers simply by changing the temperature of polymerization.

BACKGROUND ART

Fluxional molecules are molecules that undergo dynamics such that some or all of their atoms interchange between symmetry-inequivalent positions.

Metallocene polymerization catalysts showing fluxional ligand behavior are known. For example, in U.S. Pat. Nos. 6,160,064; 6,559,262; and 6,960,550, unbridged metallocenes have two 2-arylindenyl ligands, each substituted on the 1-position. These propylene polymerization catalysts which can be substituted on the 1-postion by a substituted or unsubstituted alky, alkylsilyl, or aryl substituent produce blocky polypropylene by virtue of rotation about the metal-ligand on a timescale competitive with the formation of polymer chain blocks.

An example of another propylene polymerization catalyst having rotational isomers which can be "frozen out" at lower temperature, is provided in an article to Bercaw et al, in Organometallics, 2012, vol. 31, pg. 1965. The catalyst employed was a "non-metallocene" catalyst having a tridentate ligand set.

The use of phosphinimine catalysts for the solution phase production of ethylene copolymers is well known. See for example, U.S. Pat. Nos. 6,372,864; 6,777,509; and U.S. Pat. No. 6,984,695. Phosphinimine catalysts however, have not previously been known for temperature dependent rotational behavior within a phosphinimine ligand.

DISCLOSURE OF INVENTION

We now present phosphinimine catalysts which on the proton $^1$H NMR time scale show restricted rotational behavior within a phosphinimine ligand, and which can be tuned by temperature during solution phase polymerization to give ethylene copolymer products having variant composition.

Provided is a phosphinimine olefin polymerization catalyst having the following structure:

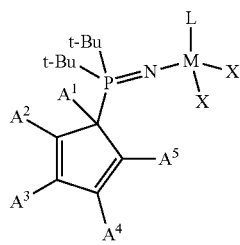

wherein M is Ti, Zr or Hf; L is a cyclopentadienyl type ligand; each X is independently an activatable ligand; $A^1$ is a H or a substituted or unsubstituted alkyl group; $A^2$ and $A^5$ are independently an acyclic or a cyclic hydrocarbyl group or an acyclic or a cyclic heteroatom containing hydrocarbyl group; $A^3$ and $A^4$ are independently a H, a halide, an acyclic or a cyclic hydrocarbyl group or an acyclic or a cyclic heteroatom containing hydrocarbyl group; and where any of $A^2$ to $A^5$ may be part of a cyclic hydrocarbyl group or a cyclic heteroatom containing hydrocarbyl group.

Provided is a solution polymerization process comprising polymerizing ethylene with one or more $C_{3-12}$ alpha olefins in a solvent in the presence of a catalyst system comprising: i) a phosphinimine catalyst having the following structure:

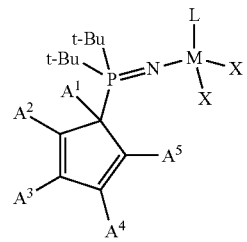

wherein M is Ti, Zr or Hf; L is a cyclopentadienyl type ligand; each X is independently an activatable ligand; $A^1$ is a H or a substituted or unsubstituted alkyl group; $A^2$ and $A^5$ are independently an acyclic or a cyclic hydrocarbyl group or an acyclic or a cyclic heteroatom containing hydrocarbyl group; $A^3$ and $A^4$ are independently a H, a halide, an acyclic or a cyclic hydrocarbyl group or an acyclic or a cyclic heteroatom containing hydrocarbyl group; and where any of $A^2$ to $A^5$ may be part of a cyclic hydrocarbyl group or a cyclic heteroatom containing hydrocarbyl group; and ii) a catalyst activator selected from the group consisting of an ionic activator, an alkylaluminoxane or a mixture thereof.

DESCRIPTION OF EMBODIMENTS

Figure 1:
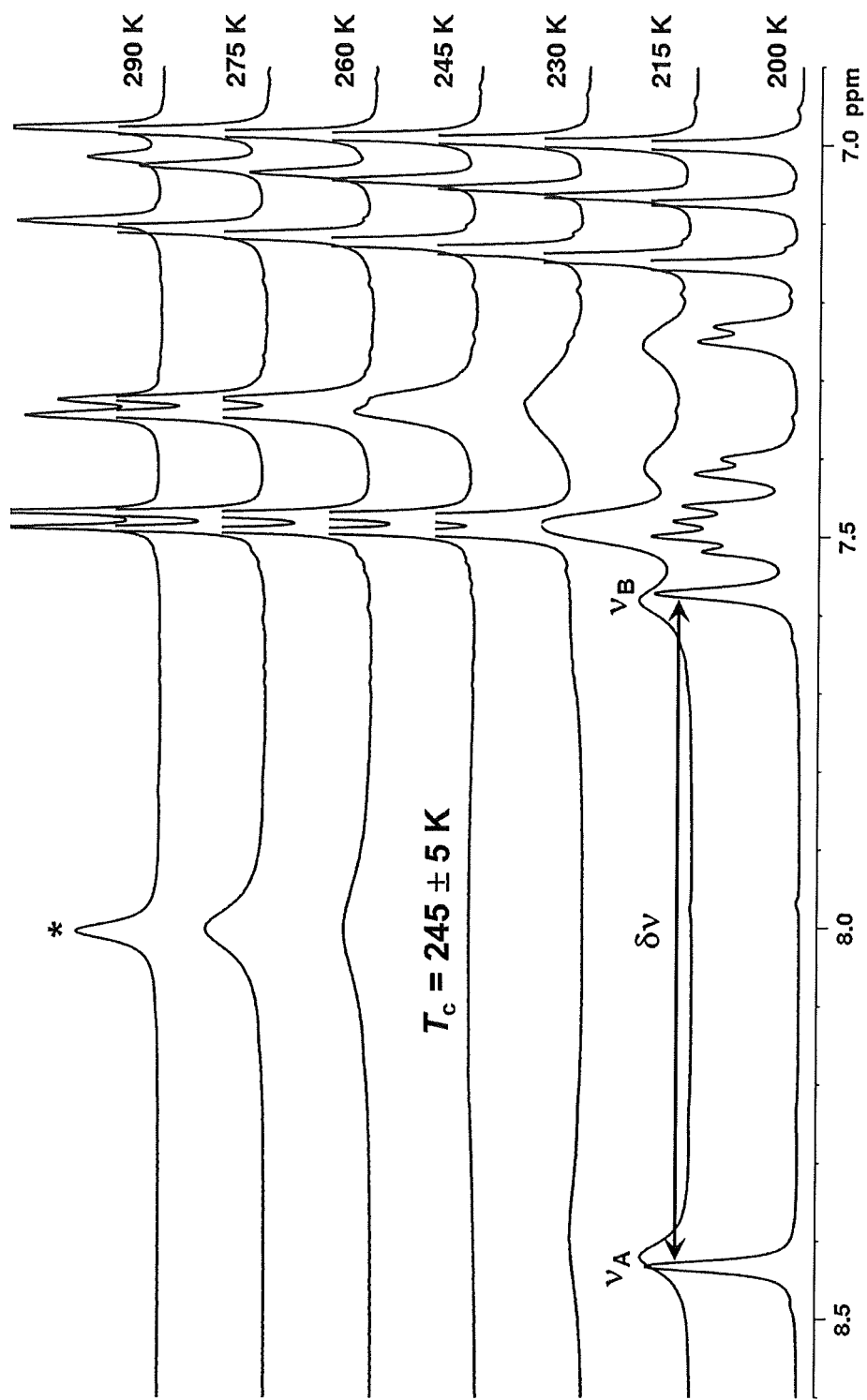
FIG. 1. shows the variable temperature $^1$H NMR spectra for the catalyst of Example 5 in toluene-$d_8$ solution (the aromatic region is shown).

The phosphinimine catalysts described herein, usually require activation by one or more cocatalytic or activator species in order to provide polymer from olefins. Hence, an un-activated phosphinimine complex may be described as a "pre-catalyst".

A phosphinimine catalyst is a compound (typically an organometallic compound) based on a group 3, 4 or 5 metal and which is characterized as having at least one phosphinimine ligand. Any compounds/complexes having a phosphinimine ligand and which display catalytic activity for ethylene (co)polymerization may be called "phosphinimine catalysts".

The phosphinimine catalyst employed in the present disclosure is one having a bulky phosphinimine ligand which leads to dynamic $^1$H NMR fluxional behavior.

The phosphinimine polymerization catalyst may be used in combination with further catalyst components such as but not limited to one or more than one support, one or more than one catalyst activator and one or more than one catalyst modifier.

The phosphinimine polymerization catalyst used in an embodiment of the disclosure is defined by the following structure:

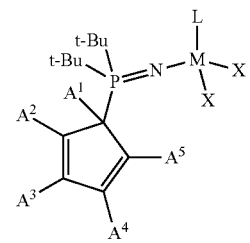

wherein M is Ti, Zr or Hf; L is a cyclopentadienyl type ligand; each X is independently an activatable ligand; $A^1$ is a H or a substituted or unsubstituted alkyl group; $A^2$ and $A^5$ are independently an acyclic or a cyclic hydrocarbyl group or an acyclic or a cyclic heteroatom containing hydrocarbyl group; $A^3$ and $A^4$ are independently a H, a halide, an acyclic or a cyclic hydrocarbyl group or an acyclic or a cyclic heteroatom containing hydrocarbyl group; and where any of $A^2$ to $A^5$ may be part of a cyclic hydrocarbyl group or a cyclic heteroatom containing hydrocarbyl group.

As used herein the term "unsubstituted" means that hydrogen atoms are bounded to the molecular group that follows the term unsubstituted.

The term "heteroatom containing" means that one or more than one non carbon atoms may be present in the hydrocarbyl groups. Some non-limiting examples of non-carbon atoms that may be present are N, O, S, P, Si, Ge and B as well as halides such as for example Br and metals such as Sn or Al.

The "hydrocarbyl group" or "heteroatom containing hydrocarbyl group", which are acyclic or cyclic may be $C_1$-$C_{30}$ hydrocarbyl groups which are unsubstituted or further substituted by a halogen atom, an alkyl group, an alkylaryl group, an arylalkyl group, an alkoxy group, an aryl group, an aryloxy group, an amido group, a silyl group or a germanyl group.

As used herein, the terms "hydrocarbyl", or "hydrocarbyl group" refers to linear or cyclic, aliphatic, olefinic, acetylenic and aryl (aromatic) radicals comprising hydrogen and carbon that are deficient by one hydrogen.

As used herein, the term "aryl" or "aryl group" includes phenyl, naphthyl, pyridyl and other radicals whose molecules have an aromatic ring structure; non-limiting examples include naphthylene, phenanthrene and anthracene.

An "arylalkyl group" is an alkyl group having one or more aryl groups pendant there from; non-limiting examples include benzyl, phenethyl and tolylmethyl.

An "alkylaryl group" is an aryl group having one or more alkyl groups pendant there from; non-limiting examples include tolyl, xylyl, mesityl and cumyl.

An "alkenyl group" refers to linear, branched and cyclic hydrocarbons containing at least one carbon-carbon double bond that is deficient by one hydrogen radical.

The terms "cyclic hydrocarbyl group" and "cyclic heteroatom containing hydrocarbyl group", connote groups that comprise cyclic moieties and which may have one or more than one cyclic aromatic ring, and/or one or more than one non-aromatic ring.

The term "alkyl group" includes saturated and unsaturated alkyl groups. The saturated or unsaturated groups may be straight chain alkyl groups or they may be branched alkyl groups. The straight chain alkyl groups or branched alkyl groups may be further substituted by a halogen atom, an alkyl group, an alkylaryl group, an arylalkyl group, an alkoxy group, an aryl group, an aryloxy group, an amido group, a silyl group or a germanyl group.

In an embodiment of the disclosure, $A^1$ is an alkyl group containing 1 to 30 carbon atoms. In an embodiment of the disclosure $A^1$, is an aliphatic (i.e. saturated) group. In embodiment of the disclosure, $A^1$ is an alkyl group containing unsaturation. In an embodiment of the disclosure, $A^1$ is a straight chain alkyl group. In an embodiment of the disclosure, $A^1$ is a substituted alkyl group. If substituted, the $A^1$ alkyl group may be substituted with a halogen group, an aryl group, and arylalkyl group, an alkylaryl group, an alkoxy group, an aryloxy group, an amido group, a silyl group or a germanyl group.

In an embodiment of the disclosure, $A^1$ is a straight chain alkyl group having 1 to 10 carbon atoms.

In an embodiment of the disclosure, $A^1$ is a branched alkyl group having at least 3 carbon atoms.

In embodiments of the disclosure, $A^1$ is an alkyl group selected from the group consisting of methyl, ethyl, n-propyl, n-butyl, n-heptyl, n-hexyl, n-septyl, and n-octyl.

In an embodiment of the disclosure, $A^1$ is a methyl group.

In an embodiment of the disclosure, $A^1$ is an alkenyl group.

In an embodiment of the disclosure, $A^1$ is an allyl group.

In an embodiment of the disclosure, $A^1$ is H.

In an embodiment of the disclosure, $A^1$ is H, an alkyl group or a substituted alkyl group and each of $A^2$, $A^3$, $A^4$ and $A^5$ is a methyl group.

In an embodiment of the disclosure, $A^1$ is H, or an alkyl group and each of $A^2$, $A^3$, $A^4$ and $A^5$ is a methyl group.

In an embodiment of the disclosure, $A^1$ is H, or a methyl group and each of $A^2$, $A^3$, $A^4$ and $A^5$ is a methyl group.

In an embodiment of the disclosure, $A^1$ is H, or a methyl group, and of each of $A^2$ and $A^3$ are independently a substituted or unsubstituted alkyl group while $A^4$ and $A^5$ are H.

In an embodiment of the disclosure, $A^1$ is H, or a methyl group, and each of $A^2$ and $A^3$ are independently a substituted or unsubstituted alkyl group while $A^4$ and $A^5$ are independently a H, a halide, an acyclic or a cyclic hydrocarbyl group or an acyclic or a cyclic heteroatom containing hydrocarbyl group.

In an embodiment of the disclosure, $A^1$ is H, or a methyl group, and each of $A^2$ and $A^3$ are independently a substituted or unsubstituted alkyl or aryl group, while $A^4$ and $A^5$ are independently a H, or a substituted or an unsubstituted alkyl or aryl group.

In an embodiment of the disclosure, the $A^2$ to $A^5$ substituents form an indenyl group having the following structure:

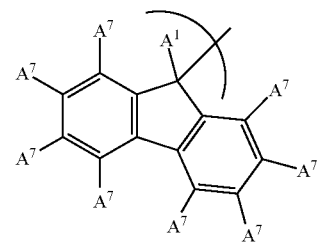

wherein each $A^7$ is independently a H, a halide, an acyclic or a cyclic hydrocarbyl group or an acyclic or a cyclic heteroatom containing hydrocarbyl group, and where any $A^7$ may be part of a cyclical hydrocarbyl group or a cyclical heteroatom containing hydrocarbyl group and where $A^1$ is a H, or a substituted or unsubstituted alkyl group In an embodiment of the disclosure the moiety:

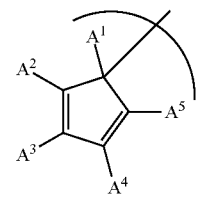

is selected from the group consisting of the following structures:

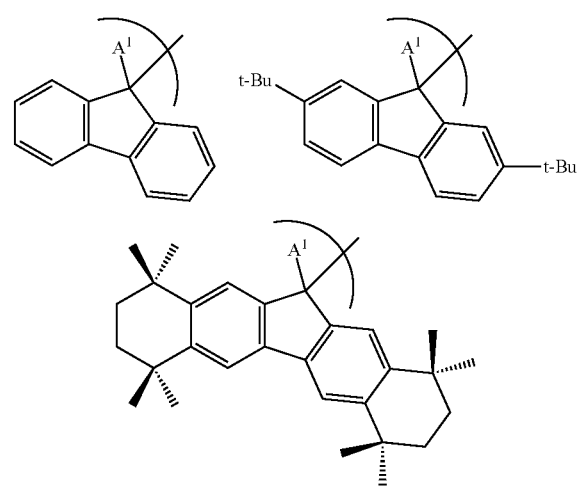

-continued

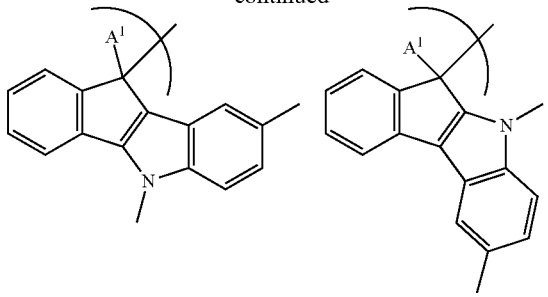

where $A^1$ is a H, or a substituted or unsubstituted alkyl group.

In an embodiment of the disclosure the moiety:

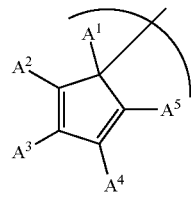

is selected from the group consisting of the following structures:

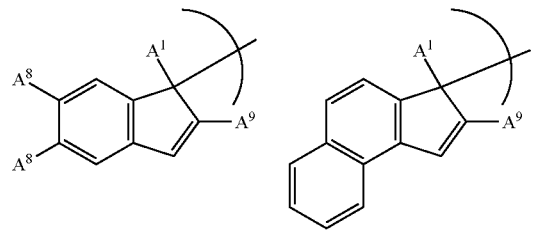

where $A^1$ is a H, or a substituted or unsubstituted alkyl group; each $A^8$ is independently a H, a halide, a hydrocarbyl group or heteroatom containing hydrocarbyl group, a cyclical hydrocarbyl group or a cyclical heteroatom containing hydrocarbyl group, where any $A^8$ may be part of a cyclical hydrocarbyl group or a cyclical heteroatom containing hydrocarbyl group; and $A^9$ is a hydrocarbyl group or heteroatom containing hydrocarbyl group, a cyclical hydrocarbyl group or a cyclical heteroatom containing hydrocarbyl group.

In an embodiment, $A^9$ is an aryl group (such as for example a phenyl group, or a napthyl group), which may be substituted or unsubstituted by one or more of an alkyl group, an aryl group, or a halide group.

In an embodiment of the disclosure the moiety:

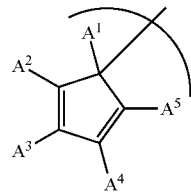

has the following structure:

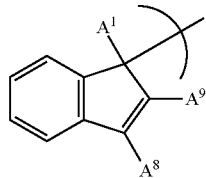

where $A^1$ is a H, or a substituted or unsubstituted alkyl group; $A^8$ is a H, a halide, a hydrocarbyl group or heteroatom containing hydrocarbyl group, a cyclical hydrocarbyl group or a cyclical heteroatom containing hydrocarbyl group; where $A^8$ may be part of a cyclical hydrocarbyl group or a cyclical heteroatom containing hydrocarbyl group; and $A^9$ is a hydrocarbyl group or heteroatom containing hydrocarbyl group, a cyclical hydrocarbyl group or a cyclical heteroatom containing hydrocarbyl group and where $A^9$ may be part of a cyclical hydrocarbyl group or a cyclical heteroatom containing hydrocarbyl group.

In an embodiment, $A^9$ an aryl group (such as for example a phenyl group, or a napthyl group), which may be substituted or unsubstituted by one or more of an alkyl group, an aryl group, or a halide group.

In an embodiment of the disclosure the moiety:

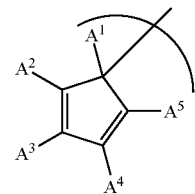

has the following structure:

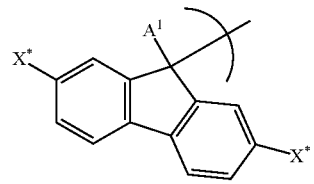

where $A^1$ is a H, or a substituted or unsubstituted alkyl group and $X^*$ is a halide.

In an embodiment, $X^*$ is bromide.

In an embodiment of the disclosure the moiety:

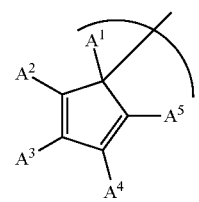

is selected from the group consisting of the following structures:

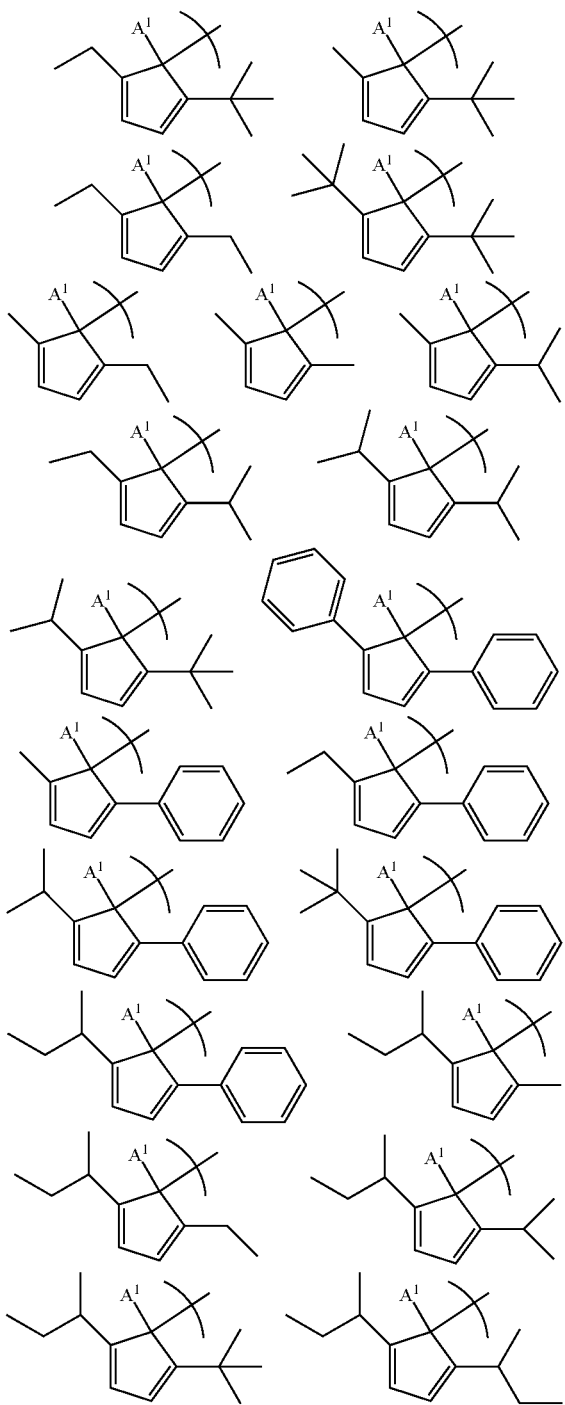

where $A^1$ is a H, or a substituted or unsubstituted alkyl group.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from the group consisting of a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as $—CH_2C_6F_5$); a halogen atom; a $C_{1-8}$ alkoxy radical; a $C_{6-10}$ aryl or aryloxy radical (each of which may be further substituted by for example a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula $—Si(R')_3$ wherein each R' is independently selected from the group consisting of hydrogen, a $C_{1-8}$ alkyl or alkoxy radical, $C_{6-10}$ aryl or aryloxy radicals; and a germanyl radical of the formula $—Ge(R')_3$ wherein R' is as defined directly above.

In an embodiment of the disclosure, L is a ligand selected from the group consisting of cyclopentadienyl, substituted cyclopentadienyl, indenyl, substituted indenyl, fluorenyl, and substituted fluorenyl.

In an embodiment of the disclosure, L is an unsubstituted cyclopentadienyl ligand (i.e. Cp).

In an embodiment of the disclosure, L is perfluorophenyl substituted cyclopentadienyl ligand (i.e. Cp-$C_6F_5$).

In an embodiment of the disclosure, L is 1,2 substituted cyclopentadienyl ligand (e.g. a 1,2-(R*)(Ar—F)Cp) where the substituents are selected from R* a hydrocarbyl group, and Ar—F a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group respectively.

In an embodiment of the disclosure, 1,2 substituted cyclopentadienyl ligands such as for example 1,2-(R*)(Ar—F)Cp ligands may contain as impurities 1,3 substituted analogues such as for example 1,3-(R*)(Ar—F)Cp ligands.

In an embodiment of the disclosure, L is 1,2-(R*)(Ar—F)Cp where R* is a hydrocarbyl group; Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group. In an embodiment of the disclosure, L is 1,2-(R*)(Ar—F)Cp where R' is an alkyl group; Ar—F is a perfluorinated aryl group, a 2,6 (i.e. ortho) fluoro substituted phenyl group, a 2,4,6 (i.e. ortho/para) fluoro substituted phenyl group or a 2,3,5,6 (i.e. ortho/meta) fluoro substituted phenyl group. In an embodiment of the disclosure, L is 1,2-(R*)(Ar—F)Cp where R* is a hydrocarbyl group having from 1 to 20 carbons; Ar—F is a perfluorinated aryl group. In an embodiment of the disclosure, L is 1,2-(R*)(Ar—F)Cp where R* is a straight chain alkyl group; Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group. In an embodiment of the disclosure, L is 1,2-(n-R*)(Ar—F)Cp where R* is a straight chain alkyl group; Ar—F is a perfluorinated aryl group. In an embodiment of the disclosure, L is 1,2-(R*)($C_6F_5$)Cp where R* is a hydrocarbyl group having 1 to 20 carbon atoms. In an embodiment of the disclosure, L is 1,2-(n-R*)($C_6F_5$)Cp where R* is a straight chain alkyl group. In an embodiment of the disclosure, L is 1,2-(n-R*)(C$_6$F$_5$)Cp where R* is any one of a methyl, ethyl, n-propyl, n-butyl, n-penty, n-hexyl, n-heptyl, and n-octyl group.

The term "perfluorinated aryl group" means that each hydrogen atom attached to a carbon atom in an aryl group has been replaced with a fluorine atom as is well understood in the art (e.g. a perfluorinated phenyl group or substituent has the formula —C$_6$F$_5$).

In an embodiment of the disclosure, M is titanium.
In an embodiment of the disclosure, M is hafnium.

An indenyl ligand (or "Ind" for short) as defined in the present disclosure will have framework carbon atoms with the numbering scheme provided below, so the location of a substituent can be readily identified.

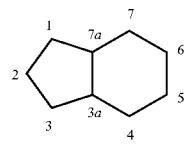

In an embodiment of the disclosure, L is a singly substituted or multiply substituted indenyl ligand.

In an embodiment, L is a singly or multiply substituted indenyl ligand where the substituent is selected from the group consisting of a substituted or unsubstituted alkyl group, a substituted or an unsubstituted aryl group, and a substituted or unsubstituted benzyl (e.g. C$_6$H$_5$CH$_2$—) group. Suitable substituents for the alkyl, aryl or benzyl group may be selected from the group consisting of alkyl groups, aryl groups, alkoxy groups, aryloxy groups, alkylaryl groups (e.g. a benzyl group), arylalkyl groups and halide groups.

In an embodiment of the disclosure, L is a singly substituted indenyl ligand, R$^¥$-Indenyl, where the R$^¥$ substituent is a substituted or unsubstituted alkyl group, a substituted or an unsubstituted aryl group, or a substituted or unsubstituted benzyl group. Suitable substituents for an R$^¥$ alkyl, R$^¥$ aryl or R$^¥$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the disclosure, L is an indenyl ligand having at least a 1-position substituent (1-R$^¥$) where the substituent R$^¥$ is a substituted or unsubstituted alkyl group, a substituted or an unsubstituted aryl group, or a substituted or unsubstituted benzyl group. Suitable substituents for an R$^¥$ alkyl, R$^¥$ aryl or R$^¥$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the disclosure, L is a singly substituted indenyl ligand, 1-R$^¥$-Indenyl where the substituent R$^¥$ is in the 1-position of the indenyl ligand and is a substituted or unsubstituted alkyl group, a substituted or unsubstituted aryl group, or a substituted or an unsubstituted benzyl group. Suitable substituents for an R$^¥$ alkyl, R$^¥$ aryl or R$^¥$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the disclosure, L is a singly substituted indenyl ligand, 1-R$^¥$-Indenyl, where the substituent R$^¥$ is a (partially/fully) halide substituted alkyl group, a (partially/fully) halide substituted benzyl group, or a (partially/fully) halide substituted aryl group.

In an embodiment of the disclosure, L is a singly substituted indenyl ligand, 1-R$^¥$-Indenyl, where the substituent R$^¥$ is a (partially/fully) halide substituted benzyl group.

When present on an indenyl ligand, a benzyl group can be partially or fully substituted by halide atoms, preferably fluoride atoms. The aryl group of the benzyl group may be a perfluorinated aryl group, a 2,6 (i.e. ortho) fluoro substituted phenyl group, 2,4,6 (i.e. ortho/para) fluoro substituted phenyl group or a 2,3,5,6 (i.e. ortho/meta) fluoro substituted phenyl group respectively. The benzyl group is, in an embodiment of the disclosure, located at the 1 position of the indenyl ligand.

In an embodiment of the disclosure, L is a singly substituted indenyl ligand, 1-R$^¥$-Indenyl, where the substituent R$^¥$ is a pentafluorobenzyl (C$_6$F$_5$CH$_2$—) group.

In the current disclosure, the term "activatable", means that the ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, X is independently selected from the group consisting of a hydrogen atom; a halogen atom, a C$_{1-10}$ hydrocarbyl radical; a C$_{1-10}$ alkoxy radical; and a C$_{6-10}$ aryl or aryloxy radical, where each of the hydrocarbyl, alkoxy, aryl, or aryl oxide radicals may be un-substituted or further substituted by one or more halogen or other group; a C$_{1-8}$ alkyl; a C$_{1-8}$ alkoxy, a C$_{6-10}$ aryl or aryloxy; an amido or a phosphido radical, but where X is not a cyclopentadienyl. Two X ligands may also be joined to one another and form for example, a substituted or unsubstituted diene ligand (i.e. 1,3-butadiene); or a delocalized heteroatom containing group such as an acetate or acetamidinate group. In a convenient embodiment of the disclosure, each X is independently selected from the group consisting of a halide atom, a C$_{1-4}$ alkyl radical and a benzyl radical.

Particularly suitable activatable ligands are monoanionic such as a halide (e.g. chloride) or a hydrocarbyl (e.g. methyl, benzyl).

The catalyst activator (or simply the "activator" for short) used to activate the phosphinimine catalyst can be any suitable activator including one or more activators selected from the group consisting of alkylaluminoxanes and ionic activators, optionally together with an alkylating agent.

Without wishing to be bound by theory, alkylaluminoxanes are thought to be complex aluminum compounds of the formula: R$^3$$_2$Al$^1$O(R$^3$Al$^1$O)$_m$Al$^1$R$^3$$_2$, wherein each R$^3$ is independently selected from the group consisting of C$_{1-20}$ hydrocarbyl radicals and m is from 3 to 50. Optionally a hindered phenol can be added to the alkylaluminoxane to provide a molar ratio of Al$^1$:hindered phenol of from 2:1 to 5:1 when the hindered phenol is present.

In an embodiment of the disclosure, R$^3$ of the alkylaluminoxane, is a methyl radical and m is from 10 to 40.

The alkylaluminoxanes are typically used in substantial molar excess compared to the amount of group 4 transition metal in the organometallic compound/complex. The Al$^1$:

group 4 transition metal molar ratios may be from about 10:1 to about 10,000:1, preferably from about 30:1 to about 500:1.

In an embodiment of the disclosure, the catalyst activator is methylaluminoxane (MAO).

In an embodiment of the disclosure, the catalyst activator is modified methylaluminoxane (MMAO).

It is well known in the art, that the alkylaluminoxane can serve dual roles as both an alkylator and an activator. Hence, an alkylaluminoxane activator is often used in combination with activatable ligands such as halogens.

Alternatively, the catalyst activator of the present disclosure may be a combination of an alkylating agent (which may also serve as a scavenger) with an activator capable of ionizing the group 4 of the transition metal catalyst (i.e. an ionic activator). In this context, the activator can be chosen from one or more alkylaluminoxane and/or an ionic activator, since an alkylaluminoxane may serve as both an activator and an alkylating agent.

When present, the alkylating agent may be selected from the group consisting of $(R^4)_p MgX^2_{2-p}$ wherein $X^2$ is a halide and each $R^4$ is independently selected from the group consisting of $C_{1-10}$ alkyl radicals and p is 1 or 2; $R^4Li$ wherein in $R^4$ is as defined above, $(R^4)_q ZnX^2_{2-q}$ wherein $R^4$ is as defined above, $X^2$ is halogen and q is 1 or 2; and $(R^4)_s Al^2 X^2_{3-s}$ wherein $R^4$ is as defined above, $X^2$ is halogen and s is an integer from 1 to 3. Preferably in the above compounds $R^4$ is a $C_{1-4}$ alkyl radical, and $X^2$ is chlorine. Commercially available compounds include triethyl aluminum (TEAL), trimethylaluminum, triisobutyl aluminum, tributyl aluminum, diethyl aluminum chloride (DEAC), dibutyl magnesium ((Bu)$_2$Mg), and butyl ethyl magnesium (BuEtMg or BuMgEt). Alkylaluminoxanes can also be used as alkylating agents.

The ionic activator may be selected from the group consisting of: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^7)_3$; wherein each $R^7$ is independently selected from the group consisting of a hydrogen atom and a $C_{1-4}$ alkyl radical; and (ii) compounds of the formula $[(R^8)_t ZH]^+[B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^6$ is as defined above; and (iii) compounds of the formula $B(R^6)_3$ wherein $R^6$ is as defined above.

In the above compounds preferably $R^6$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

Examples of compounds capable of ionizing the phosphinimine catalyst include the following compounds: triethylammonium tetra(phenyl)boron, tripropylammonium tetra (phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl)boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltris-pentafluorophenyl borate, triphenylmethylium phenyl-trispentafluorophenyl borate, benzene (diazonium) phenyltrispentafluorophenyl borate, tropillium tetrakis (2,3, 5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4, 5-trifluorophenyl) borate, benzene (diazonium) tetrakis (3,4, 5-trifluorophenyl) borate, tropillium tetrakis (1,2,2-trifluoroethenyl) borate, trophenylmethylium tetrakis (1,2, 2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3, 4,5-tetrafluorophenyl) borate, and benzene (diazonium) tetrakis (2,3,4,5-tetrafluorophenyl) borate.

Commercially available activators which are capable of ionizing the phosphinimine catalyst include:
N,N-dimethylaniliniumtetrakispentafluorophenyl borate ("[Me$_2$NHPh][B(C$_6$F$_5$)$_4$]"); triphenylmethylium tetrakispentafluorophenyl borate ("[Ph$_3$C][B(C$_6$F$_5$)$_4$]"), and tris-pentafluorophenyl boron.

In an embodiment of the disclosure, the ionic activator compounds may be used in amounts which provide a molar ratio of group 4 transition metal to boron that will be from 1:1 to 1:6.

Optionally, mixtures of alkylaluminoxanes and ionic activators can be used as activators for the organometallic complex.

Solution polymerization processes for the polymerization or copolymerization of ethylene are well known in the art (see for example U.S. Pat. Nos. 6,372,864 and 6,777,509). These processes are conducted in the presence of an inert hydrocarbon solvent, typically, a $C_{5-12}$ hydrocarbon which may be unsubstituted or substituted by $C_{1-4}$ alkyl group such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional solution process is from about 80° C. to about 300° C. In an embodiment of the disclosure the polymerization temperature in a solution process if from about 120° C. to about 250° C. The polymerization pressure in a solution process may be a "medium pressure process", meaning that the pressure in the reactor is less than about 6,000 psi (about 42,000 kiloPascals or kPa). In an embodiment of the disclosure, the polymerization pressure in a solution process may be from about 10,000 to about 40,000 kPa, or from about 14,000 to about 22,000 kPa (i.e. from about 2,000 psi to about 3,000 psi).

Suitable monomers for copolymerization with ethylene include $C_{3-20}$ mono- and di-olefins. Preferred comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

The polyethylene polymers which may be prepared in accordance with the present disclosure are LLDPE's which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present disclosure may be LLDPE having a density from about 0.910 to 0.935 g/cc or (linear) high density polyethylene having a density above 0.935 g/cc. The present disclosure might also be useful to prepare polyethylene having a density below 0.910 g/cc—the so-called very low and ultra low density polyethylenes (note: "cc" is cubic centimeters, $cm^3$ and "g" is grams).

Generally the alpha olefin may be present in an amount from about 3 to 30 weight %, preferably from about 4 to 25 weight %.

The present disclosure may also be used to prepare co-and ter-polymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

In solution polymerization, the monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the reactor.

Generally, the catalyst components (the phosphinimine catalyst, an ionic activator and an alkylaluminoxane) may be premixed in the solvent for the reaction or fed as separate streams to the reactor. In some instances premixing it may be desirable to provide a reaction time for the catalyst components prior to entering the reaction. Such an "in line mixing" technique is described in a number of patents in the name of DuPont Canada Inc. (e.g. U.S. Pat. No. 5,589,555 issued Dec. 31, 1996).

An embodiment of the disclosure is a solution polymerization process comprising polymerizing ethylene with one or more $C_{3-12}$ alpha olefins in a solvent in the presence of a catalyst system comprising: i) a phosphinimine catalyst having the following structure:

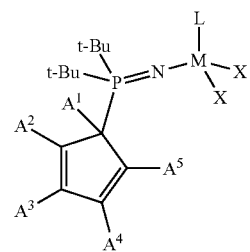

wherein M is Ti, Zr or Hf; L is a cyclopentadienyl type ligand; each X is independently an activatable ligand; $A^1$ is a H or an alkyl group; $A^2$ and $A^5$ are a hydrocarbyl group or heteroatom containing hydrocarbyl group; $A^3$ and $A^4$ are H, a hydrocarbyl group, or a heteroatom containing hydrocarbyl group; and where any of $A^2$ to $A^5$ may be part of a cyclic hydrocarbyl group or a cyclic heteroatom containing hydrocarbyl group; and ii) a catalyst activator selected from the group consisting of an ionic activator, a methylaluminoxane or a mixture thereof.

EXAMPLES

General

General Experimental Methods

All reactions involving air and/or moisture sensitive compounds were conducted under nitrogen using standard Schlenk and glovebox techniques. Reaction solvents were purified using the system described by Grubbs et al. (see Pangborn, A. B.; Giardello, M. A.; Grubbs, R. H.; Rosen R. K.; Timmers, F. J. *Organometallics* 1996, 15, 1518-1520) and then stored over activated molecular sieves in an inert atmosphere glovebox. Chlorodiisopropylphosphine, chlorodi-tert-butylphosphine, methylmagnesium bromide (3.0 M solution in diethylether), 2,6-di-tert-butyl-4-ethylphenol (BHEB), and azidotrimethylsilane were purchased from Aldrich and used as received. MMAO-7 (7 wt % solution in Isopar-E) was purchase from Akzo Nobel and used as received. Triphenylcarbenium tetrakis(pentafluorophenyl) borate was purchased from Albemarle Corp. and used as received. Cyclopentadienyltitanium trichloride ($CpTiCl_3$) was purchased from Strem and used as received. (Pentafluorophenyl)-cyclopentadienyltitanium trichloride, $(C_6F_5Cp)TiCl_3$, was prepared according to the literature method (Maldanis, R. J., Chien, J. C. W., Rausch, M. D. *J. Organomet. Chem.* 2000, 599, 107).

Octamethyloctahydrodibenzofluorene ($C_{29}H_{38}$) was prepared according to the literature method (Miller, S. A.; Bercaw, J. E. *Organometallics* 2004, 23, 1777-1789). Deuterated solvents were purchased from Sigma Aldrich (dichloromethane-$d_2$, toluene-$d_8$, bromobenzene-$d_5$) and were stored over 4 Å molecular sieves prior to use. NMR spectra were recorded on Bruker 300 and 400 MHz spectrometers ($^1$H NMR at 300.1 MHz, $^{31}$P NMR at 121.5 MHz, and $^{19}$F NMR at 282 MHz; and $^1$H NMR at 400.1 MHz, $^{31}$P NMR at 162 MHz, and $^{19}$F NMR at 376 MHz).

Molecular weight information ($M_w$, $M_n$ and $M_z$ in g/mol) and molecular weight distribution ($M_w/M_n$), and z-average molecular weight distribution (Mz/Mw) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS® GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e. the short chain branching, SCB per 1000 carbons) and the C6 comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

If the comonomer incorporation decreases with molecular weight, as measured using GPC-FTIR, the distribution is described as "normal" or "negative". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for the copolymer, there is one or more higher molecular weight components having a higher comonomer incorporation than in one or more lower molecular weight segments. The term "reverse(d) comonomer distribution" is used herein to mean, that across the molecular weight range of the ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse".

To determine CDBI(50), a solubility distribution curve is first generated for the polyethylene composition. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI(50) is determined by establishing the weight percentage of a copolymer sample that has a comonomer content within 50% of the median comonomer content on each side of the median (See WO 93/03093 and U.S. Pat. No. 5,376,439). The CDBI(25) is determined by establishing the weight percentage of a copolymer sample that has a comonomer content within 25% of the median comonomer content on each side of the median.

The temperature rising elution fractionation (TREF) method used herein was as follows. Polymer samples (50 to 150 mg) were introduced into the reactor vessel of a crystallization-TREF unit (Polymer Char). The reactor vessel was filled with 20 to 40 mL 1,2,4-trichlorobenzene (TCB), and heated to the desired dissolution temperature (e.g. 150° C.) for 1 to 3 hours. The solution (0.5 to 1.5 mL) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer Char software, Excel spreadsheet and TREF software developed in-house.

The Phosphinimine Catalysts

The general synthetic method employed to make the phosphinimine catalyst of Examples 1-15 is shown in Scheme 1.

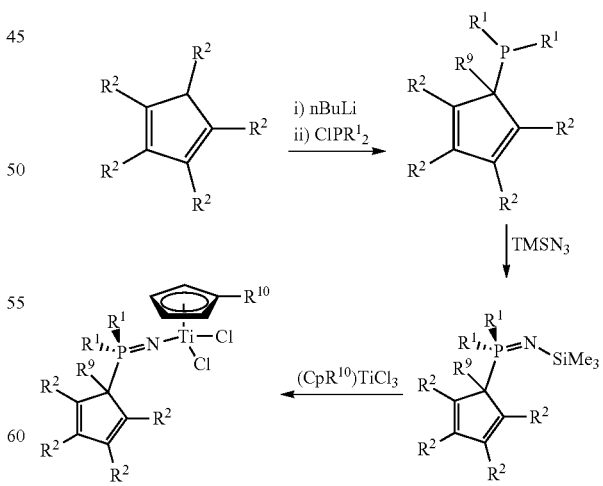

$R^1$ = hydrocarbyl, e.g. i-Pr, t-Bu
$R^2$ = hydrocarbyl or heteroatom containing hydrocarbyl
$R^9$ = H or alkyl, e.g. Me, allyl
$R^{10}$ = H or $C_6F_5$

Example 1

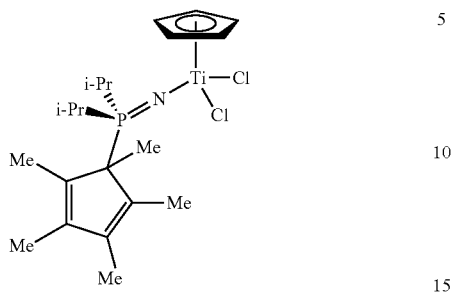

Di-iso-propyl(pentamethylcyclopentadienyl)phosphine, (Cp*)(i-Pr)$_2$P.

To a THF solution (30 mL) of pentamethylcyclopentadiene (1.00 g; 7.34 mmol; 1 equiv.) cooled to 0° C. was added n-BuLi (4.6 mL of a 1.6 M hexane solution; 7.34 mmol; 1 equiv.) dropwise via canula. The formation of a white precipitate was immediately observed. The cold bath was removed and the mixture was allowed to warm to ambient temperature and stirred for 4 hours. To the mixture was added a THF solution (10 mL) of ClP(i-Pr)$_2$ (1.12 g; 7.34 mmol; 1 equiv.) dropwise via canula. The mixture was stirred for 18 hours at ambient temperature and then concentrated under vacuum. The residue was taken up into heptane (30 mL), filtered, and the filtrate was concentrated under vacuum to give the desired product as a clear yellow oil (1.67 g; 90%). $^1$H NMR (toluene-d$_8$): δ 1.89 (s, 6H), 1.72 (s, 6H), 1.72 (m, 2H), 1.24 (d, J=12.4 Hz, 3H), 1.16 (dd, J=14.4, 7.2 Hz, 6H), 0.99 (dd, J=10.4, 7.2 Hz, 6H). $^{31}$P{$^1$H} NMR: δ 35.9.

N-Trimethylsilyl-di-iso-propyl(pentamethylcyclopentadienyl)phosphinimine, (Cp*)(i-Pr)$_2$P=NSiMe3. To the neat phosphine (Cp*)(i-Pr)$_2$P (1.67 g; 6.62 mmol; 1 equiv.) was added azidotrimethylsilane (1.1 mL; 8.4 mmol; 1.3 equiv.) at ambient temperature. The mixture was then heated up to 100° C. and a further portion of azidotrimethylsilane (3.3 mL; 25.1 mmol; 3.8 equiv.) was added. After heating for 3 hours, the mixture was allowed to cool to ambient temperature and the volatiles were removed under vacuum to give the product as an orange oil. The isolated product (1.72 g; 76%) was >98% pure by NMR. $^1$H NMR (toluene-d$_8$): δ 1.92 (s, 6H), 1.73 (m, 2H), 1.65 (s, 6H), 1.32 (d, J=14.4 Hz, 3H), 1.07 (dd, J=14.8, 7.2 Hz, 6H), 0.90 (dd, J=15.2, 6.8 Hz, 6H), 0.39 (s, 9H). $^{31}$P{$^1$H} NMR: δ 23.5.

To a toluene slurry (10 mL) of CpTiCl$_3$ (0.555 g; 2.53 mmol; 1 equiv.) was added a toluene solution of (Cp*)(i-Pr)$_2$P=NSiMe3 (0.859 g; 2.53 mmol; 1 equiv.) dropwise over 1-2 min at ambient temperature. The reaction mixture was heated to 65° C. for 2 hours and then allowed to cool to ambient temperature while stirring for 18 hours. The yellow solution was concentrated under vacuum and the residue was triturated with pentane, decanted, and dried under vacuum to give the product as a canary yellow solid (1.06 g; 93%). $^1$H NMR (toluene-d$_8$): δ 6.44 (s, 5H), 1.85 (s, 6H), 1.78 (m, 2H), 1.51 (s, 6H), 1.44 (d, J=15.2 Hz, 3H), 1.15 (dd, J=15.6 and 7.2 Hz, 6H), 0.943 (dd, J=16.4 and 6.8 Hz, 6H). $^{31}$P{$^1$H} NMR: δ 34.5.

Example 2

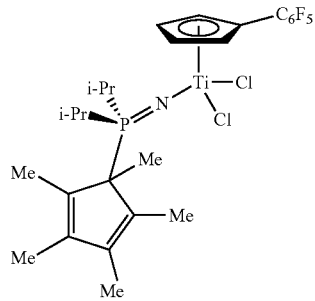

N-Trimethylsilyl-di-iso-propyl(pentamethylcyclopentadienyl)phosphinimine, (Cp*)(i-Pr)$_2$P=NSiMe3 was made as above in Example 1.

The reaction between C$_6$F$_5$CpTiCl$_3$ (0.946 g; 2.46 mmol; 1 equiv.) and (Cp*)(i-Pr)$_2$P=NSiMe3 (0.834 g; 2.46 mmol; 1 equiv.) was carried out as described above for Example 1. The product was isolated as a yellow powder (1.27 g; 84%). $^1$H NMR (toluene-d$_8$): δ 6.98 (m, 2H), 6.54 (m, 2H), 1.83 (s, 6H), 1.80 (m, 2H), 1.50 (s, 6H), 1.42 (d, J=15.6 Hz, 3H), 1.13 (dd, J=15.6 and 7.2 Hz, 6H), 0.95 (dd, J=16.4 and 7.2 Hz, 6H). $^{19}$F NMR: δ-139.4 (d, 2F), −157.4 (s, 1F), −163.8 (t, 2F). $^{31}$P{$^1$H} NMR: δ 37.0.

Example 3

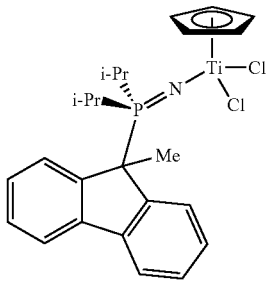

9-Methylfluorene. To a THF solution (100 mL) of fluorene (10.17 g; 61.2 mmol; 1 equiv.) at ambient temperature was added n-BuLi (42 mL of a 1.6 M solution in hexanes; 67.2 mmol; 1.1 equiv.) dropwise over 20 minutes. After stirring for 3 hours, the solution of FluLi was added dropwise via canula to a THF solution (100 mL) of MeI (freshly passed through a column of activated neutral alumina; 18.7 mL; 300 mmol; 4.9 equiv.) at 0° C. over a period of approximately 30 minutes. After the addition, the reaction flask was wrapped in aluminum foil and stirred for 18 hours. The volatiles were removed under vacuum and the residue was taken up into toluene, filtered through a silica plug, and then concentrated to give the product as an off-white solid (10.1 g; 93%).

Di-iso-propyl-(9-methylfluorenyl)phosphine, (9-Me-Flu)(i-Pr)$_2$P. To an ether solution (40 mL) of 9-methylfluorene (2.05 g; 11.1 mmol; 1 equiv.) at −60° C. was added n-BuLi (7 mL of a 1.6 M solution in hexane; 11.2 mmol; 1.01 equiv.) dropwise via syringe. The reaction mixture was allowed to warm to ambient temperature and then stirred for a further 2 hours. The resulting solution of 9-Me-FluLi was cooled to −60° C. and to it was added an ether solution (10 mL) of ClP(i-Pr)$_2$ (1.8 g; 12 mmol; 1.06 equiv.) and the reaction mixture was allowed to warm to ambient temperature and stirred for 18 hours. The volatiles were removed under vacuum and the residue was triturated with heptane and concentrated again to remove residual THF. The residue was taken up into toluene, filtered through a pad of Celite, and then concentrated to give the product as an off-white solid (2.76 g; 84%). $^1$H NMR (THF-$_8$): δ 7.77 (m, 2H), 7.50 (m, 2H), 7.30 (m, 4H), 1.40 (m, 2H), 1.61 (d, 3H), 1.04 (dd, J=14.4 and 7.2 Hz, 6H), 0.57 (dd, J=10.0 and 7.2 Hz, 6H). $^{31}$P{$^1$H} NMR: δ 42.4.

N-Trimethylsilyl-di-iso-propyl-(9-methylfluorenyl)phosphinimine, (9-Me-Flu)(i-Pr)$_2$P═N SiMe$_3$. The reaction between (9-Me-Flu)(i-Pr)$_2$P (2.76 g; 9.32 mmol; 1 equiv.) and azidotrimethylsilane (6.13 mL total; 47 mmol) was carried out as described above for the synthesis of Example 1 ligand. The crude product was used in the next reaction without further purification and assuming complete conversion. $^1$H NMR (toluene-d$_8$): δ 7.74 (m, 2H), 7.52 (m, 2H), 7.18 (m, 4H), 1.78 (d, J=12.0 Hz, 3H), 1.68 (m, 2H), 0.89 (dd, 6H), 0.48 (dd, J=14.4 and 7.2 Hz, 6H), 0.48 (s, 9H). $^{31}$P{$^1$H} NMR: δ 25.9.

The reaction between CpTiCl$_3$ (2.03 g; 9.32 mmol; 1 equiv.) and crude (9-Me-Flu)(i-Pr)$_2$P═NSiMe$_3$ (9.32 mmol; 1 equiv.) was carried out as described above for Example 1. The product was isolated as a yellow/orange powder (3.90 g; 84%). 1H NMR (toluene-d$_8$): δ 7.87 (m, 2H), 7.42 (m, 2H), 7.18 (m, 4H), 6.44 (s, 5H), 1.97 (d, J=14.0 Hz, 3H), 1.71 (m, 2H), 0.89 (dd, J=15.6, 8.4 Hz, 6H), 0.47 (dd, J=16.0, 7.2 Hz, 6H). $^{31}$P{$^1$H} NMR: δ 35.1. The purity is estimated at 89% based on an impurity in the $^{31}$P NMR at 62.4 ppm.

Example 4

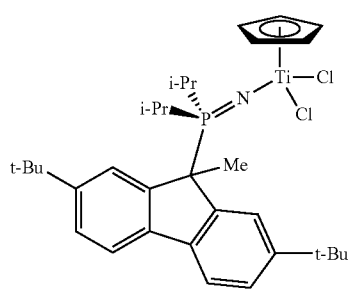

9-Methyl-2,7-di-tert-butylfluorene, 9-Me-2,7-t-Bu$_2$-FluH. To an ether solution (50 mL) of 2,7-di-tert-butylfluorene (1.00 g; 3.6 mmol; 1 equiv.) at ambient temperature was added n-BuLi (2.4 mL of a 1.6 M solution in hexanes; 3.8 mmol;

1.06 equiv.) dropwise via syringe over 5 minutes. After stirring for 3 hours, the solution of 2,7-t-Bu2FluLi was added dropwise via canula to an ether solution (20 mL) of MeI (freshly passed through a column of activated neutral alumina; 0.33 mL; 5.3 mmol; 1.5 equiv.) at 0° C. over a period of approximately 5 minutes. After the addition, the reaction flask was wrapped in aluminum foil and stirred for 18 hours. The volatiles were removed under vacuum and the residue was taken up into toluene, filtered through a silica plug, and then concentrated to give the product as an off-white solid (0.98 g; 93%). $^1$H NMR (CD$_2$Cl$_2$): δ 7.63 (d, J=8.0 Hz, 2H), 7.54 (s, 2H), 7.39 (d, J=8.0 Hz, 2H), 3.89 (q, J=7.2 Hz, 1H), 1.51 (d, J=7.6 Hz, 3H), 1.38 (s, 18H).

9-Methyl-2,7-di-tert-butyl(di-iso-propyl)phosphine, (9-Me-2,7-t-Bu$_2$-Flu)(i-Pr)$_2$P. To an THF solution (50 mL) of 9-Me-2,7-t-Bu$_2$-FluH (0.98 g; 3.35 mmol; 1 equiv.), at 0° C. was added n-BuLi (2.1 mL of a 1.6 M solution in hexane; 3.36 mmol; 1 equiv.) dropwise via syringe. The reaction mixture was allowed to warm to ambient temperature and then stirred for a further 2 hours. The resulting solution of 9-Me-2,7-t-Bu$_2$-FluLi was cooled to −60° C. and to it was added a THF solution (10 mL) of ClP(i-Pr)$_2$ (0.51 g; 3.35 mmol; 1 equiv.) and the reaction mixture was allowed to warm to ambient temperature and stirred for 18 hours. The volatiles were removed under vacuum and the residue was triturated with heptane and concentrated again to remove residual THF. The residue was taken up into toluene, filtered through a pad of Celite, then concentrated to give the product as an off-white solid (1.28 g; 94%). $^1$H NMR (THF-d$_8$): δ 7.67 (m, 2H), 7.59 (m, 2H), 7.30 (m, 2H), 1.81 (d, 3H), 1.52 (m, 2H), 1.36 (s, 18H), 1.10 (dd, 6H), 0.62 (dd, 6H). $^{31}$P{$^1$H} NMR: δ 42.2.

N-Trimethylsilyl-9-Methyl-2,7-di-tert-butyl(di-iso-propyl)phosphinimine, (9-Me-2,7-t-Bu$_2$-Flu)(i-Pr)$_2$P═NSiMe3. The reaction between (9-Me-2,7-t-Bu$_2$-Flu)(i-Pr)$_2$P (1.28 g; 3.13 mmol; 1 equiv.) and trimethylsilylazide (2.06 mL total; 16 mmol) was carried out as described above for the synthesis of Example 1 ligand. The crude product was used in the next reaction without further purification and assuming complete conversion. $^1$H NMR (toluene-d$_8$): δ 7.90 (s, 2H), 7.54 (d, J=8.0 Hz, 2H), 7.31 (m, 2H), 1.87 (d, J=10.4 Hz, 3H), 1.85 (m, 2H), 1.37 (s, 18H), 1.01 (dd, J=14.8 and 7.2 Hz, 6H), 0.56 (dd, J=15.2 and 7.2 Hz, 6H), 0.50 (s, 9H).

$^{31}$P{$^1$H} NMR: δ 26.1.

The reaction between CpTiCl$_3$ (0.68 g; 3.13 mmol; 1 equiv.) and crude (9-Me-2,7-t-Bu$_2$-Flu)(i-Pr)$_2$P═NSiMe$_3$ (3.13 mmol; 1 equiv.) was carried out as described above for the synthesis of Example 1. The product was isolated as a yellow/orange powder (1.57 g; 83%). $^1$H NMR (toluene-d$_8$): δ 8.01 (m, 2H), 7.46 (d, J=8.0 Hz, 2H), 7.31 (m, 2H), 6.47 (s, 5H), 2.10 (d, J=12.0 Hz, 3H), 1.89 (m, 2H), 1.38 (s, 18H) 1.05 (dd, J=15.6 and 7.2 Hz, 6H), 0.55 (dd, J=15.6 and 7.2 Hz, 6H). $^{31}$P{$^1$H} NMR: δ 35.5.

Example 5

Restricted Rotation

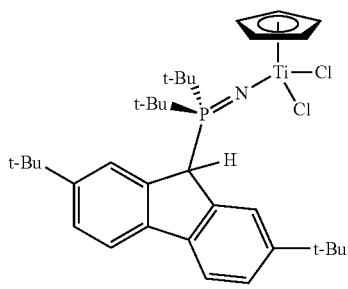

2,7-Di-tert-butylfluorenyllithium, 2,7-t-Bu2FluLi. To a solution of 2,7-di-tert-butylfluorene (2.781 g, 9.99 mmol) in minimal amount of pentane (10 mL) at ambient temperature was added n-BuLi (6.5 mL of a 1.6M hexane solution; 10.4 mmol; 1.05 equiv.) dropwise via syringe. A formation of a yellow precipitate occurred overnight. The lithium salt solution was filtered and a yellow solid collected. The filtrate was placed in the freezer and more yellow precipitate was collected to yield a total of 2.67 g (94%). $^1$H NMR (THF-$d_8$): δ 7.78 (d, J=8.4 Hz, 2H), 7.29 (s, 2H), 6.55 (d, J=8.4 Hz, 2H), 5.74 (s, 1H), 1.37 (s, 18H).

2,7-Di-tent-butylfluorenyl(di-tert-butyl)phosphine, 2,7-t-Bu$_2$Flu(t-Bu)$_2$P. To a THF solution of 2,7-di-tert-butylfluorenyllithium (1.31 g, 4.62 mmol) at ambient temperature was added a THF solution of ClP(t-Bu)$_2$ (0.813 g, 4.5 mmol) dropwise via cannula. After three days the clear yellow solution was concentrated under vacuum. The residue was taken up into heptane (50 mL) and filtered through Celite. The filtrate was concentrated under vacuum to give the desired product as a clear yellow oil. The isolated product (1.607 g, 84%) was >95% pure by NMR. $^1$H NMR (toluene-$d_8$): δ 8.03 (br. s, 2H), 7.63 (d, 2H), 7.35 (d, 2H), 4.16 (s, 1H), 1.4 (br. s, 9H), 1.39 (s, 18H), 0.7 (br. s, 9H). $^{31}$P{$^1$H} NMR: δ 54.8.

N-Trimethylsilyl-2,7-Di-tert-butylfluorenyl(di-tert-butyl)phosphinimine, 2,7-t-Bu$_2$Flu(t-Bu)$_2$P=NSiMe$_3$. The reaction between (2,7-t-Bu$_2$-Flu)(t-Bu)$_2$P (1.607; 3.80 mmol; 1 equiv.) and azidotrimethylsilane (2.3 mL total; 17 mmol) was carried out as described above for the synthesis of Example 1 ligand. The crude product was used in the next reaction without further purification and assuming complete conversion. $^1$H NMR (toluene-$d_8$): δ 8.14 (s, 2H), 7.56 (d, J=8.0 Hz, 2H), 7.33 (m, J=8.0 Hz, 2H), 4.43 (d, J=22.0 Hz, 1H), 1.42 (s, 18H), 1.01 (d, J=12.0 Hz, 18H), 0.51 (s, 9H). $^{31}$P{$^1$H} NMR: δ 30.1.

The reaction between (2,7-t-Bu$_2$-Flu)(t-Bu)$_2$P=NSiMe$_3$ (2.45 g, 4.80 mmol) and CpTiCl$_3$ (1.120 g, 5.11 mmol) was performed as described above for the synthesis of Example 1. The product was isolated as an orange solid (2.637 g, 89%). $^1$H NMR (toluene-$d_8$): δ 7.98 (br. s, 2H), 7.46 (d, J=8.0 Hz, 2H), 7.31 (m, 2H), 6.48 (s, 4H), 4.32 (d, J=20.8 Hz, 1H), 1.41 (s, 18H), 1.03 (br. d, J=12.8 Hz, 18H). $^{31}$P:{$^1$H} NMR: δ 40.8.

Example 6

Restricted Rotation

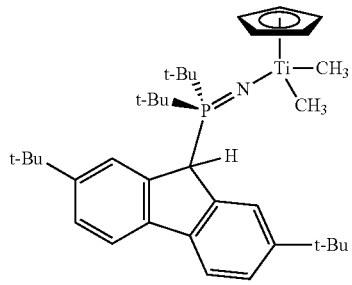

N-Trimethylsilyl-9-Methyl-2,7-di-tert-butyl(di-iso-propyl)phosphinimine, (9-Me-2,7-t-Bu2-Flu)(i-Pr)$_2$P=NSiMe$_3$ was made as above in Example 5. To a toluene slurry of Example 5 (500 mg, 0.806 mmol) at ambient temperature was added MeMgBr (0.672 mL of a 3.0 M solution in Et$_2$O, 2.02 mmol). After stirring for 3 hours, the volatiles were removed under vacuum to dryness. The solid residue was triturated with a 50:50 mixture of toluene and heptane and filtered. The filtrate was concentrated to give the product as a yellow solid (430 mg, 97%). $^1$H NMR (toluene-$d_8$): δ 8.07 (br. s, 2H), 7.54 (d, J=8.4 Hz, 2H), 7.34 (m, 2H), 6.30 (s, 4H), 4.48 (d, J=21.2 Hz, 1H), 1.38 (s, 18H), 1.09 (br. d, J=13.2 Hz, 18H), 0.77 (s, 6H). $^{31}$P{$^1$H} NMR: δ 28.2.

Example 7

Restricted Rotation

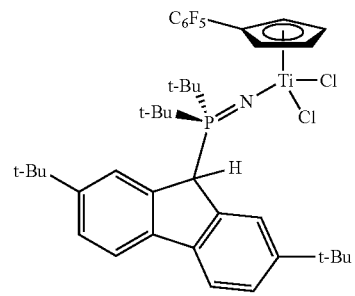

N-Trimethylsilyl-9-Methyl-2,7-di-tert-butyl(di-iso-propyl)phosphinimine, (9-Me-2,7-t-Bu$_2$-Flu)(i-Pr)$_2$P=NSiMe$_3$ was made as above in Example 5.

The reaction between CpTiCl$_3$ (0.68 g; 3.13 mmol; 1 equiv.) and crude (9-Me-2,7-t-Bu$_2$-Flu)(i-Pr)$_2$P=NSiMe$_3$ (3.13 mmol; 1 equiv.) was carried out as described above for the synthesis of Example 1. The product was isolated as a yellow/orange powder (1.57 g; 83%). $^1$H NMR (toluene-$d_8$): δ 8.01 (m, 2H), 7.46 (d, J=8.0 Hz, 2H), 7.31 (m, 2H), 6.47 (s, 5H), 2.10 (d, J=12.0 Hz, 3H), 1.89 (m, 2H), 1.38 (s, 18H) 1.05 (dd, J=15.6 and 7.2 Hz, 6H), 0.55 (dd, J=15.6 and 7.2 Hz, 6H). $^{31}$P{$^1$H} NMR: δ 35.5.

Example 8

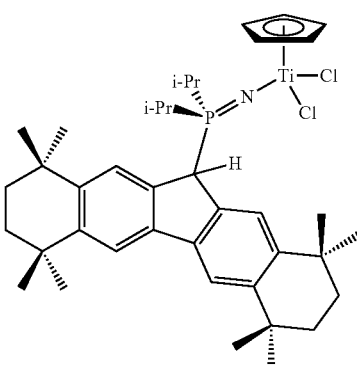

Octamethyloctahydrodibenzofluorenyl(di-iso-propyl) phosphine, (C$_{29}$H$_{37}$)(i-Pr)$_2$P. To a Et$_2$O solution (60 mL) of octamethyloctahydrodibenzofluorene (1.59 g; 4.10 mmol; 1 equiv.) at ambient temperature was added n-BuLi (2.6 mL of a 1.6 M hexane solution; 4.10 mmol; 1 equiv.) dropwise via syringe. The formation of an orange slurry was observed. After stirring for 2 hours, a Et$_2$O solution (10 mL) of ClP(i-Pr)$_2$ (0.63 g; 4.10 mmol; 1 equiv.) was added dropwise via canula. The mixture was stirred for 18 hours at ambient temperature and then concentrated under vacuum. The residue was taken up into heptane (30 mL), filtered, and the filtrate was concentrated under vacuum to give the desired product as a clear yellow oil (1.88 g; 91%). $^1$H NMR (toluene-d$_8$): δ 7.92 (s, 2H), 7.72 (s, 2H), 4.29 (s, 1H), 1.79 (m, 2H), 1.67 (m, 8H), 1.39, 1.36, 1.34, 1.33 (4 singlets, 6H each), 0.98 (dd, J=13.1 and 7.1 Hz, 6H), 0.81 (dd, J=12.2 and 7.0 Hz, 6H). $^{31}$P{$^1$H} NMR: δ 23.8.

N-Trimethylsilyl-octamethyloctahydrodibenzofluorenyl (di-iso-propyl)phosphinimine, (C$_{29}$H$_{37}$)(i-Pr)$_2$P=NSiMe$_3$. The reaction between (Oct)(i-Pr)$_2$P (1.88 g; 3.75 mmol; 1 equiv.) and azidotrimethylsilane (2.5 mL total; 19 mmol) was carried out as described above for the synthesis of Example 1 ligand. The crude product was used in the next reaction without further purification and assuming complete conversion. $^1$H NMR (toluene-d$_8$): δ 7.91 (m, 2H), 7.89 (m, 2H), 4.34 (d, J=23.1, 1H), 1.95 (m, 2H), 1.66 (m, 8H), 1.42 (app. s, 12H), 1.33 (s, 6H), 1.31 (s, 6H), 0.95 (dd, J=15.4 and 7.2 Hz, 6H), 0.68 (dd, J=15.2 and 7.2 Hz, 6H). $^{31}$P{$^1$H} NMR: δ 23.2.

The reaction between CpTiCl$_3$ (0.69 g; 3.15 mmol; 1 equiv.) and crude (Oct)(i-Pr)$_2$P=NSiMe$_3$ (1.86 g, 3.15 mmol; 1 equiv.) was carried out as described for Example 1. The crude product was washed with cold toluene and isolated as a yellow solid (2.06 g; 93%). $^1$H NMR (toluene-d$_8$): δ 7.84 (s, 4H), 6.50 (s, 5H), 4.30 (d, J=24 Hz, 1H), 1.93 (m, 2H), 1.69-1.62 (m, 8H), 1.47 (s, 6H), 1.41 (s, 6H), 1.30 (s, 6H), 1.29 (s, 6H), 0.95 (dd, J=16.2 and 7.2 Hz, 6H), 0.67 (dd, J=15.8 and 7.1 Hz, 6H). $^{31}$P{$^1$H} NMR: δ 33.4.

Example 9

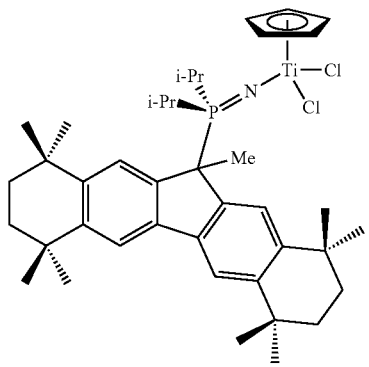

9-Methyloctamethyloctahydrodibenzofluorene, 9-MeC$_{29}$H$_{37}$. Preparation of 9-MeOct was accomplished by sequential treatment of OctH with n-BuLi and MeI as described for 9-methyl-2,7-di-tert-butylfluorene. 9-Methyloctamethyloctahydrodibenzofluorenyl(di-iso-propyl)phosphine, (9-MeC$_{29}$H$_{36}$)(i-Pr)$_2$P. To a Et$_2$O solution (10 mL) of 9-MeC$_{29}$H$_{37}$ (1.026 g; 2.56 mmol; 1 equiv.) at 10° C. was added n-BuLi (1.6 mL of a 1.6 M solution in hexane; 2.56 mmol; 1 equiv.) dropwise via syringe. The reaction mixture was allowed to warm to ambient temperature and then stirred for a further 2 hours. The resulting solution of 9-MeOctLi was cooled to −10° C. and to it was added a Et$_2$O solution (5 mL) of ClP(i-Pr)$_2$ (0.39 g; 2.56 mmol; 1 equiv.) and the reaction mixture was allowed to warm to ambient temperature and stirred for 18 hours. The volatiles were removed under vacuum and the residue was taken up into toluene, filtered through a pad of Celite, then concentrated to give the product as colourless solid (1.24 g; 94%). $^1$H NMR (toluene-d8): δ 7.89 (s, 2H), 7.60 (s, 2H), 2.69 (d, J=12.7 Hz, 3H), 1.66 (m, 8H), 1.57 (m, 2H), 1.39 (s, 6H), 1.36 (s, 6H), 1.33 (s, 6H), 1.31 (s, 6H), 1.11 (dd, J=14.0 and 7.2 Hz, 6H), 0.65 (dd, J=10.4 and 7.2 Hz, 6H). $^{31}$P{$^1$H} NMR: δ 41.0.

N-Trimethylsilyl-9-methyloctamethyloctahydrodibenzofluorenyl(di-iso-propyl)phosphinimine, (9-MeC$_{29}$H$_{36}$)(i-Pr)$_2$P=NSiMe$_3$. The reaction between (9-MeC$_{29}$H$_{36}$)(i-Pr)$_2$P (1.20 g; 2.33 mmol; 1 equiv.) and azidotrimethylsilane (1.53 mL total; 11.6 mmol; 5 equiv.) was carried out as described above for the synthesis of Example 1 ligand. The crude product was used in the next reaction without further purification and assuming complete conversion. $^1$H NMR (toluene-d$_8$): δ 7.87 (s, 2H), 7.83 (s, 2H), 1.90 (m, 2H), 1.88 (d, J=13.1 Hz, 3H), 1.67-1.62 (m, 8H), 1.41 (s, 6H), 1.40 (s, 6H), 1.32 (s, 6H), 1.29 (s, 6H), 1.03 (dd, J=14.7 and 7.2 Hz, 6H), 0.58 (dd, J=14.8 and 7.1 Hz, 6H), 0.53 (s, 9H). $^{31}$P{$^1$H} NMR: δ 26.2.

The reaction between CpTiCl$_3$ (0.43 g; 1.94 mmol; 1 equiv.) and crude (9-MeC$_{29}$H$_{36}$)(i-Pr)$_2$P=NSiMe$_3$ (1.17 g, 1.94 mmol; 1 equiv.) was carried out as described for the synthesis of Example 1. The crude product was washed with cold toluene and then dried to yield the pure product as a yellow powder (1.18 g; 85%). $^1$H NMR (toluene-d$_8$): δ 7.94 (s, 2H), 7.81 (s, 2H), 6.48 (s, 5H), 2.08 (s, 3H), 1.93 (m, 2H), 1.61 (m, 8H), 1.42 (s, 6H), 1.41 (s, 6H), 1.29 (s, 6H), 1.27 (s, 6H), 1.06 (dd, J=15.4 and 7.1 Hz, 6H), 0.57 (dd, J=15.2 and 7.1 Hz, 6H). $^{31}$P{$^1$H} NMR: δ 35.9.

Example 10

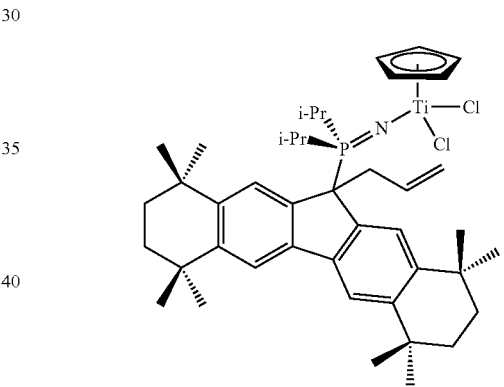

9-Allyloctamethyloctahydrodibenzofluorene, 9-AllylC$_{29}$H$_{37}$. To an ether solution (20 mL) of octamethyloctahydrodibenzofluorene (2.00 g; 5.2 mmol; 1 equiv.) at 10° C. was added n-BuLi (3.23 mL of a 1.6 M solution in hexanes; 5.2 mmol; 1 equiv.) dropwise via syringe over 5 minutes. The reaction mixture was warmed to ambient temperature and stirred for 3 hours. The resulting solution of C$_{29}$H$_{37}$Li was added dropwise via canula to an ether solution (20 mL) of allylchloride (0.42 mL; 5.2 mmol; 1 equiv.) at 10° C. over a period of approximately 5 minutes. After the addition, the reaction flask was allowed to warm to ambient temperature and stirred overnight. The volatiles were removed under vacuum and the residue was taken up into toluene, filtered and then concentrated to give the product as a colourless solid (2.20 g; 99%). $^1$H NMR (toluene-d$_8$): δ 7.87 (s, 2H), 7.49 (s, 2H), 5.84 (m, 1H), 4.97 (s, 1H), 4.94 (d, J=5.4 Hz, 1H), 3.76 (t, J=6.8 Hz, 1H), 2.50 (m, 2H), 1.67 (m, 8H), 1.34 (m, 12H), 1.33 (s, 6H), 1.32 (s, 6H).

9-Allyloctamethyloctahydrodibenzofluorenyl(di-iso-propyl)phosphine, 9-AllylC$_{29}$H$_{36}$(i-Pr)$_2$P. To a Et$_2$O solution (60 mL) of 9-AllylC$_{29}$H$_{37}$ (2.195 g; 5.14 mmol; 1 equiv.) at 10° C. was added n-BuLi (3.22 mL of a 1.6 M solution in hexane; 5.15 mmol; 1 equiv.) dropwise via syringe. The reaction mixture was allowed to warm to ambient temperature and then stirred for a further 2 hours. The resulting solution of 9-AllylC$_{29}$H$_{36}$Li was cooled to −10° C. and to it was added a Et$_2$O solution (15 mL) of ClP(i-Pr)$_2$ (0.784 g; 5.14 mmol; 1 equiv.) and the reaction mixture was allowed to warm to ambient temperature and stirred for 18 hours. The volatiles were removed under vacuum and the residue was taken up into toluene, filtered through a pad of Celite, then concentrated to give the product as yellow oil (2.44 g; 87%). $^1$H NMR (toluene-d$_8$): δ 7.88 (s, 2H), 7.58 (s, 2H), 5.34 (m, 1H), 4.78 (dd, J=17.1 and 1.7 Hz, 1H), 4.54 (dd, J=10.0 and 1.0 Hz, 1H), 3.18 (m, 2H), 1.67 (m, 8H), 1.59 (m, 2H), 1.40 (s, 6H), 1.36 (s, 6H), 1.32 (s, 6H), 1.31 (s, 6H), 1.11 (dd, J=14.3 and 7.2 Hz, 6H), 0.64 (dd, J=10.0 and 7.0 Hz, 6H). $^{31}$P{$^1$H} NMR: δ 39.1.

N-Trimethylsilyl-9-allyloctamethyloctahydrodibenzofluorenyl(di-iso-propyl)phosphinimine, 9-AllylC$_{29}$H$_{36}$(i-Pr)$_2$P═NSiMe$_3$. The reaction between 9-AllylC$_{29}$H$_{36}$(i-Pr)$_2$P (2.44 g; 4.51 mmol; 1 equiv.) and trimethylsilylazide (3.29 mL total; 25 mmol) was carried out as described above for the synthesis of Example 1 ligand. The crude product was used in the next reaction without further purification and assuming complete conversion. $^1$H NMR (toluene-d$_8$): δ 7.86 (s, 2H), 7.81 (s, 2H), 4.95 (m, 1H), 4.82 (dd, J=17.0 and 2.4 Hz, 1H), 4.42 (dd, J=9.8 and 1.4 Hz, 1H), 3.52 (t, J=6.2 Hz, 2H), 1.89 (m, 2H), 1.65 (m, 8H), 1.43 (s, 6H), 1.40 (s, 6H), 1.31 (s, 6H), 1.28 (s, 6H), 1.04 (dd, J=14.8 and 7.2 Hz, 6H), 0.58 (dd, J=14.9 and 7.2 Hz, 6H), 0.53 (s, 9H). $^{31}$P{$^1$H} NMR: δ 25.6.

The reaction between CpTiCl$_3$ (0.821 g; 3.75 mmol; 1 equiv.) and crude 9-AllylC$_{29}$H$_{36}$(i-Pr)$_2$P═NSiMe$_3$ (2.36 g; 3.75 mmol; 1 equiv.) was carried out as described above for Example 1. The product was isolated as an orange powder (1.86 g; 67%). $^1$H NMR (toluene-d$_8$): δ 7.95 (s, 2H), 7.80 (s, 2H), 6.48 (s, 5H), 5.02 (dd, J=16.9 and 2.0 Hz, 1H), 4.86 (m, 1H), 4.47 (d, 10.0 Hz, 1H), 3.92 (t, J=6.3 Hz, 2H), 1.94 (m, 2H), 1.62 (m, 8H), 1.43 (s, 6H), 1.42 (s, 6H), 1.28 (s, 6H), 1.25 (s, 6H), 1.08 (dd, J=15.5 and 7.1 Hz, 6H), 0.57 (dd, J=15.3 and 7.1 Hz, 6H). $^{31}$P{$^1$H} NMR: δ 35.1.

Example 11

Restricted Rotation

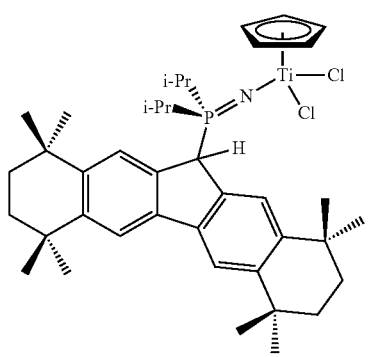

9-Octamethyloctahydrodibenzofluorenyl(di-tert-butyl)phosphine, (C$_{29}$H$_{37}$)(t-Bu)$_2$P. To a THF solution (50 mL) of octamethyloctahydrodibenzofluorene (4.93 g, 12.7 mmol) was added n-BuLi (1.6 M hexane, 8.36 mL, 13.4 mmol, 1.05 equiv.)

dropwise via syringe and the resulting dark brown solution was stirred for 3 hours at ambient temperature. To the solution was added a THF solution (10 mL) of ClP(t-Bu)$_2$ (2.54 mL, 13.4 mmol) and the resulting mixture was stirred for 72 hours at ambient temperature. The volatiles were removed under vacuum to give a dark beige solid which was washed with heptane and pumped down to dryness to give a beige solid (4.83 g, 71%). $^1$H NMR (toluene-d$_8$): δ 7.92 (s, 4H), 4.16 (d, J=0.8 Hz, 1H), 1.52-1.57 (m, 8H), 1.41 (v. br. s, 9H), 1.41 (s, 6H), 1.39 (s, 6H), 1.35 (s, 6H), 1.34 (s, 6H), 0.75 (v. br. s, 9H). $^{31}$P{$^1$H} NMR: δ 53.8.

N-Trimethylsilyloctamethyloctahydrodibenzofluorenyl(di-tert-butyl)phosphinimine, (C$_{29}$H$_{37}$)(t-Bu)$_2$P═NSiMe$_3$. The reaction between (C$_{29}$H$_{37}$)(t-Bu)$_2$P (2.34 g; 4.42 mmol; 1 equiv.) and trimethylsilylazide (2.9 mL total; 22.1 mmol) was carried out as described above for the synthesis of Example 1 ligand. The crude product was used in the next reaction without further purification and assuming complete conversion. $^1$H NMR (toluene-d$_8$): δ0 8.10 (s, 2H), 7.88 (s, 2H), 4.44 (d, J=22.8 Hz, 1H), 1.7-1.6 (m, 8H), 1.46 (s, 6H), 1.44 (s, 6H), 1.34 (s, 6H), 1.31 (s, 6H), 1.06 (br. d, J=9.6 Hz, 18H), 0.56 (s, 9H). $^{31}$P{$^1$H} NMR: δ 30.2.

The reaction between CpTiCl$_3$ (0.86 g; 3.94 mmol; 1 equiv.) and crude (C$_{29}$H$_{37}$)(t-Bu)$_2$P═NSiMe$_3$ (2.56 g, 4.14 mmol; 1 equiv.) was carried out as described above for the synthesis of Example 1. The product was isolated as a yellow powder (1.65 g; 58%). $^1$H NMR (toluene-d$_8$): δ 8.04 (br. s, 2H), 7.81 (s, 2H), 6.53 (s, 5H), 4.48 (d, J=21.6 Hz, 1H), 1.67 (m, 8H), 1.48 (s, 6H), 1.47 (s, 6H), 1.30 (app. s, 12H), 1.06 (br. d, J=14.4 Hz, 18H). $^{31}$P{$^1$H} NMR: δ 41.7.

Example 12

Restricted Rotation

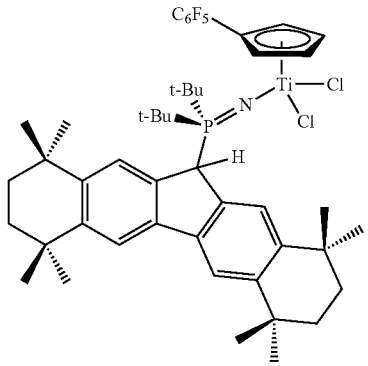

N-Trimethylsilyloctamethyloctahydrodibenzofluorenyl(di-tert-butyl)phosphinimine, (C$_{26}$H$_{37}$)(t-Bu)$_2$P═NSiMe3 was made as above in Example 11.

The reaction between C$_6$F$_5$CpTiCl$_3$ (1.40 g; 3.61 mmol; 1 equiv.) and crude (C$_{26}$H$_{37}$)(t-Bu)$_2$P═NSiMe$_3$ (2.16, 3.51 mmol; 1 equiv.) was carried out as described for above for the synthesis of Example 1. The product was isolated as a yellow powder (1.83 g; 58%). $^1$H NMR (toluene-d$_8$): δ 8.03 (br. s, 2H), 7.81 (s, 2H), 7.14 (m, 2H), 6.63 (m, 2H), 4.48 (d, J=21.6 Hz, 1H), 1.67 (m, 8H), 1.46 (s, 6H), 1.45 (s, 6H), 1.29 (m, 12H), 1.04 (br. d, J=14.8 Hz, 18H). $^{19}$F NMR: δ-139.2, −157.2, −163.7. $^{31}$P{$^1$H} NMR: δ0 44.1.

Example 13

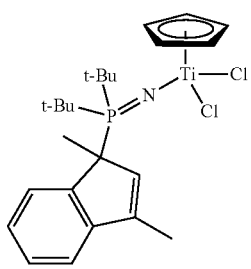

1,3-Dimethylindene. 1,3-Dimethylindene was prepared by successive methylations of indene according to the following procedure. To a stirred solution of freshly distilled indene (17.5 g, 150.67 mmol, 1.00 equiv.) in pentane (400 mL) at ambient temperature was added dropwise a solution of n-BuLi (98.9 mL of a 1.6 M solution in hexane, 158.2 mmol, 1.05 equiv.). The resulting colourless slurry was stirred for 18 hours, filtered, and dried under vacuum to give indenyllithium as a colourless solid (17.10 g, 93%). The indenyllithium (17.10 g, 113.5 mmol, 1.00 equiv.) was taken up into $Et_2O$ (200 mL) and added dropwise via cannula to a solution of iodomethane (10.6 mL, 170.2 mmol, 1.5 equiv.) in $Et_2O$ (100 mL) at ambient temperature. The reaction flask was covered with aluminum foil and the resulting pink solution was stirred for 18 hours. The reaction mixture was quenched with distilled water (100 mL) and the organic portion was extracted into $Et_2O$ (3×50 mL). The combined organic fraction was dried over anhydrous $MgSO_4$ and filtered. The solvent and excess iodomethane were distilled away at atmospheric pressure to give the 1-methylindene product (10.86 g, 77%), which was determined to be 98% pure by GC-MS analysis. To a pentane solution (500 mL) of 1-methylindene (14.06 g, 108 mmol, 1.00 equiv.) was added a solution of n-BuLi (70.9 mL of a 1.6 M solution in hexane, 113.4 mmol, 1.05 equiv.) dropwise via addition funnel at ambient temperature. After stirring overnight, the resulting slurry was filtered and the solid was dried under vacuum to give 1-methylindenyllithium as an off-white solid (11.37 g, 77%). An $Et_2O$ solution (200 mL) of 1-methylindenyllithium (11.367 g, 83.5 mmol, 1.00 equiv.) was added dropwise via cannula to a stirred $Et_2O$ solution (200 mL) of iodomethane (7.80 mL, 125.25 mmol, 1.5 equiv.). The reaction flask was covered with aluminum foil and the resulting brown reaction mixture was stirred for 72 hours. The reaction mixture was quenched with distilled water (150 mL) and the organic component was extracted into $Et_2O$ (3×80 mL). The combined organic fraction was dried over anhydrous $MgSO_4$ and filtered. The solvent and excess iodomethane were distilled away at atmospheric pressure to give the 1,3-dimethylindene product (10.97 g, 91%), which was determined to be 92% pure by GC-MS analysis.

1,3-Dimethylindenyl(di-tert-butyl)phosphine, (1,3-$Me_2Ind$)(t-$Bu$)$_2$P To a solution of 1,3-dimethylindene (3.19 g, 22.1 mmol, 1.0 equiv.) in THF (100 mL) at ambient temperature was added n-BuLi (14.5 mL of a 1.6 M hexane solution; 23.2 mmol; 1.05 equiv.). The resulting mixture was stirred for 2 hours and then the volatiles were removed under vacuum. The solid residue was triturated with pentane, filtered, and dried under vacuum to give 1,3-dimethylindenyllithium as a yellow solid. A THF solution (10 mL) of ClP(t-$Bu$)$_2$ (4.41 mL, 23.2 mmol, 1.05 equiv.) was then added dropwise to a THF solution (80 mL) of the 1,3-dimethylindenyllithium at 0° C. The resulting solution was allowed to warm to ambient temperature over 72 hours. The volatiles were removed under vacuum and the residue was taken up into pentane (100 mL). The mixture was then filtered and the pentane soluble filtrate was pumped down to dryness yielding a blue oil Analysis by $^{31}P\{^1H\}$ NMR (tol-$d_8$) showed a mixture of ClP(t-$Bu$)$_2$ (δ 148.2 ppm; 20%) and the product (δ 59.3 ppm; 80%). A pentane solution (50 mL) of the blue oil was diluted with degassed distilled water (30 mL) and extracted with pentane (3×30 mL) under a nitrogen atmosphere. The yellow pentane extracts were dried over anhydrous $NaSO_4$, filtered and concentrated to give a yellow oil that eventually solidified (3.19 g, 50%). $^1H$ NMR (toluene-$d_8$): δ 7.58 (m, 1H), 7.25 (m, 3H), 6.65 (d, J=1.6 Hz, 1H), 2.16 (d, J=1.6 Hz, 3H), 1.46 (d, J=10.0 Hz, 9H), 1.46 (d, J=10.0 Hz, 3H), 0.74 (d, J=10.4 Hz, 9H). $^{31}P\{^1H\}$ NMR: δ 59.2 ppm.

N-Trimethylsilyl-1,3-dimethylindenyl(di-tert-butyl)phosphinimine, (1,3-$Me_2Ind$)(t$Bu_2$)P=$SiMe_3$. The reaction between (1,3-$Me_2Ind$)(t-$Bu$)$_2$P (1.04 g, 3.6 mmol, 1 equiv.) and trimethylsilylazide (2.4 mL total; 18.0 mmol; 5 equiv.) was carried out as described above for the synthesis of Example 1 ligand. The crude product was isolated as an orange solid (1.323 g, 98%) and used in the next reaction without further purification. $^1H$ NMR (toluene-$d_8$): δ 8.11 (m, 1H), 7.16 (m, 3H), 6.24 (m, 1H), 1.94 (m, 3H), 1.57 (d, J=3.2 Hz, 3H), 1.28 (d, J=13.2 Hz, 9H), 0.77 (d, J=13.6 Hz, 9H), 0.47 (s, 9H).

The reaction between $CpTiCl_3$ (0.625 g, 2.85 mmol, 1 equiv.) and crude (1,3-$Me_2Ind$)(t$Bu_2$)P=$SiMe_3$ (1.45 g, 2.85 mmol, 1 equiv.) was carried out as described for above for the synthesis of Example 1. The product was isolated as a yellow powder (1.40 g, 79%). $^1H$ NMR ($CD_2Cl_2$): δ 8.17 (d, J=7.6 Hz, 1H), 7.45-2.27 (m, 3H), 6.55 (s, 5H), 6.38 (s, 1H), 2.24-2.11 (m, 3H), 1.84 (d, J=13.6 Hz, 3H), 1.63 (d, J=14.4 Hz, 9H), 1.02 (d, J=14.4 Hz, 9H). $^{31}P\{^1H\}$ NMR: δ 46.4.

Example 14

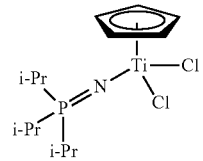

Example 14 was prepared according to the literature method (Stephan, D. W.; Stewart, J. C.; Guerin, F.; Courtenay, S.; Kickham, J.; Hollink, E.; Beddie, C.; Hoskin, A.; Graham, T.; Wei, P.; Spence, R. E. v. H.; Xu, W.; Koch, L.; Gao, X.; Harrison, D. G. *Organometallics* 2003, 22, 1937-1947).

Example 15

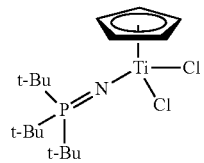

Example 15 was prepared according to the literature method (Stephan, D. W.; Stewart, J. C.; Guerin, F.; Courtenay, S.; Kickham, J.; Hollink, E.; Beddie, C.; Hoskin, A.; Graham, T.; Wei, P.; Spence, R. E. v. H.; Xu, W.; Koch, L.; Gao, X.; Harrison, D. G. *Organometallics* 2003, 22, 1937-1947).

Dynamic $^1$H NMR Studies

Several of the exemplified phosphinimine complexes exhibited broadened $^1$H NMR resonances in the aromatic and P-tert-butyl regions of their NMR spectra at ambient temperature which was indicative of restricted rotation within the phosphinimine ligand. These complexes were examined using variable temperature (VT) solution $^1$H NMR spectroscopy.

As is well known in the art (see Gunther, H., in *NMR Spectroscopy*, $2^{nd}$ ed.;

John Wiley & Sons: Chichester, 1995, pp. 336-345), the energetic barrier for the exchange of two NMR resonance frequencies (in this case, by rotation around a P—C bond) can be estimated from the free energy of activation, $\Delta G^{\ddagger}$ (J·mol$^{-1}$), using the following equation:

$$\Delta G^{\ddagger} = RT_c \left[ 22.96 + \ln\left(\frac{T_c}{\delta v}\right) \right]$$

where $T_c$ is the coalescence temperature (in Kelvin, K), $\delta v$ is the difference between the resonance frequencies of the nuclei in positions A and B (Hz), and R is the universal gas constant (8.31 J·K$^{-1}$). At low temperature (200 K), the exchange of positions A and B is in a slow exchange regime relative to the NMR acquisition time scale and $\delta v$ is maximized. At the coalescence point the two signals merge and broaden (sometimes into the spectral baseline) and then reemerge as a sharp single peak in the fast exchange regime at higher temperature (300 K).

Figure 2:
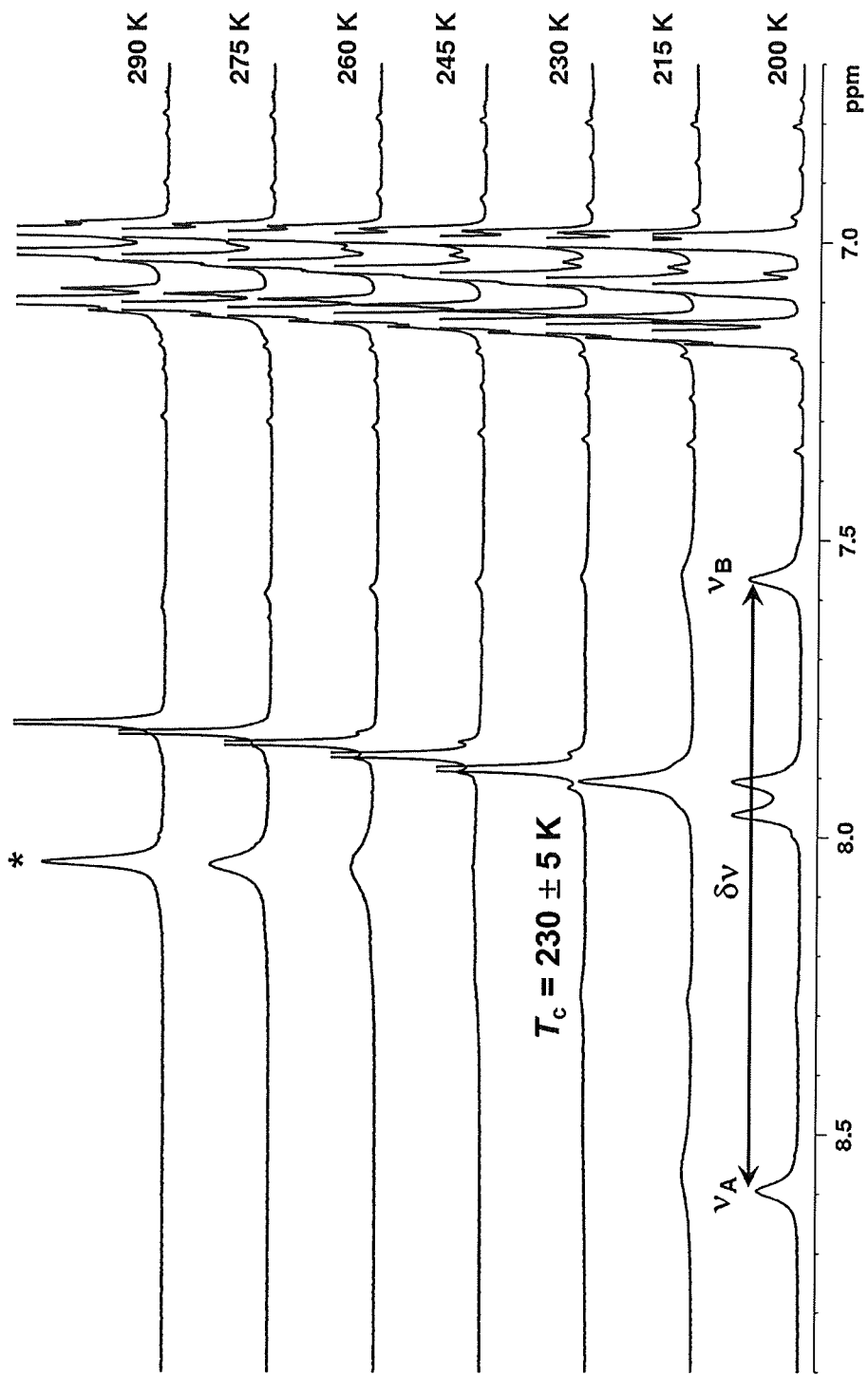
FIG. 2. shows the variable temperature $^1$H NMR spectra for the catalyst of Example 11 in toluene-$d_8$ solution (the aromatic region is shown).

Titanium phosphinimine complexes Examples 5, 6, 7, 11 and 12 exhibited fluxional solution NMR behaviour and the calculated free energies of activation, $\Delta G^{\ddagger}$, are shown in Table 1. For example, the aromatic region for the variable temperature $^1$H NMR spectra of titanium complexes Examples 5 and 11 are shown in FIGS. 1 and 2, respectively.

TABLE 1

| Complex | $T_c$ (K) | $\delta v$ (Hz) | $\Delta G^{\ddagger}$ (kJ · mol$^{-1}$) |
|---|---|---|---|
| Example 5 | 245 ± 5 | 344 | 11.0 ± 0.2 |
| Example 6 | — | — | Not measured. NMR behaviour is similar to Example 5. |
| Example 7 | 240 ± 5 | 338 | 10.8 ± 0.2 |
| Example 11 | 230 ± 5 | 412 | 10.2 ± 0.2 |
| Example 12 | 230 ± 5 | 405 | 10.2 ± 0.2 |

Dynamic NMR behaviour was only apparent (within the temperature ranges accessible with conventional NMR solvents) in Ti phosphinimine complexes containing a P-bonded fluorenyl substituent and two P-bonded tent-butyl substituents (Ex. 5, 6, 7, 11, 12). Fluorenyl phosphinimine complexes with two smaller P-bonded iso-propyl substituents (Ex. 1, 2, 3, 4, 8, 9, and 10) did not display dynamic NMR behaviour (i.e., had sharp $^1$H NMR spectra at ambient temperature). A comparative phosphinimine complex with a P-bonded 1,3-dimethylindenyl substituent and two P-tert-butyl groups (Ex. 13) also did not display dynamic NMR behaviour which suggests that an additional fused ring or equivalent steric bulk is required to achieve the measurable energetic barriers, $\Delta G^{\ddagger}$, as described above. The origin of the rotational barrier is postulated to be due to steric interactions between the P-tert-butyl groups and CHn substituents at the A2 and A5 positions of the ligand fragment:

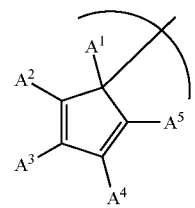

Interestingly, when solution phase polymerization was carried out using titanium phosphinimine complexes Ex. 5, 6, 7, 11, and 12 identified above, multisite catalyst behaviour was observed. The extent of multisite behaviour was dependent on the temperature at which the polymerization was carried out.

Variable Temperature Solution Polymerization

Continuous polymerizations were conducted on a continuous polymerization unit (CPU) using cyclohexane as the solvent. The CPU contained a 71.5 mL stirred reactor and was operated between 130 to 190° C. for the polymerization experiments. An upstream mixing reactor having a 20 mL volume was operated at 5° C. lower than the polymerization reactor. The mixing reactor was used to pre-heat the ethylene, octene and some of the solvent streams. Catalyst feeds (xylene or cyclohexane solutions of titanium phosphinimine complex, $(Ph_3C)[B(C_6F_5)_4]$, and MMAO-7/BHEB) and additional solvent were added directly to the polymerization reactor in a continuous process. MMAO-7 and BHEB solution flows were combined prior to the reactor to ensure that all of the phenolic OH had been passivated through reaction with the MMAO-7 prior to reaching the reactor. A total continuous flow of 27 mL/min into the polymerization reactor was maintained.

Copolymers were made at a 1-octene/ethylene weight ratio of 0.5. The ethylene was fed at a 10 wt % ethylene concentration in the polymerization reactor. The CPU system operated at a pressure of 10.5 MPa. The solvent, monomer, and comonomer streams were all purified by the CPU systems before entering the reactor. The polymerization activity, kp (expressed in mM$^{-1}$.min$^{-1}$), is defined as:

$$k_p = \left(\frac{Q}{100-Q}\right)\left(\frac{1}{[Ti]}\right)\left(\frac{1}{HUT}\right)$$

where Q is ethylene conversion (%) (measured using an online gas chromatograph (GC)), [Ti] is catalyst concentration in the reactor (mM), and HUT is hold-up time in the reactor (2.6 min).

Copolymer samples were collected at 90±1% ethylene conversion (Q), dried in a vacuum oven, ground, and then analyzed using FTIR (for short-chain branch frequency) and GPC-RI (for molecular weight and distribution). Selected ethylene/1-octene copolymer samples were further characterized using GPC-FTIR and TREF. Copolymerization conditions are listed in Table 2 and copolymer properties are listed in Table 3.

Phosphinimine complexes having P-bonded cyclopentadienyl (Ex. 1 and 2) or fluorenyl (Ex. 3 and 4) substituents and two iso-propyl groups displayed sharp $^1$H NMR spectra at ambient temperature. Catalysts made from Ex. 1-4 produced copolymers (runs 16-19) with moderate to low activity at 140° C. and with no obvious differentiated behaviour versus comparative phosphinimine catalysts Ex. 14 and 15 (copolymer runs 35 and 37). However, copolymers from runs 16-19 had polymer molecular weight distributions ranging from $M_w/M_n$ of 1.91-2.06 which are slightly broader than the comparative copolymers from runs 35 and 37 ($M_w/M_n$ 1.68 and 1.63, respectively). This may be an indication of some effect on catalyst site behaviour and polymer microstructure from having very sterically bulky substituents on the phosphinimine ligand even though dynamic behaviour was not observed in the NMR spectra.

Figure 3:
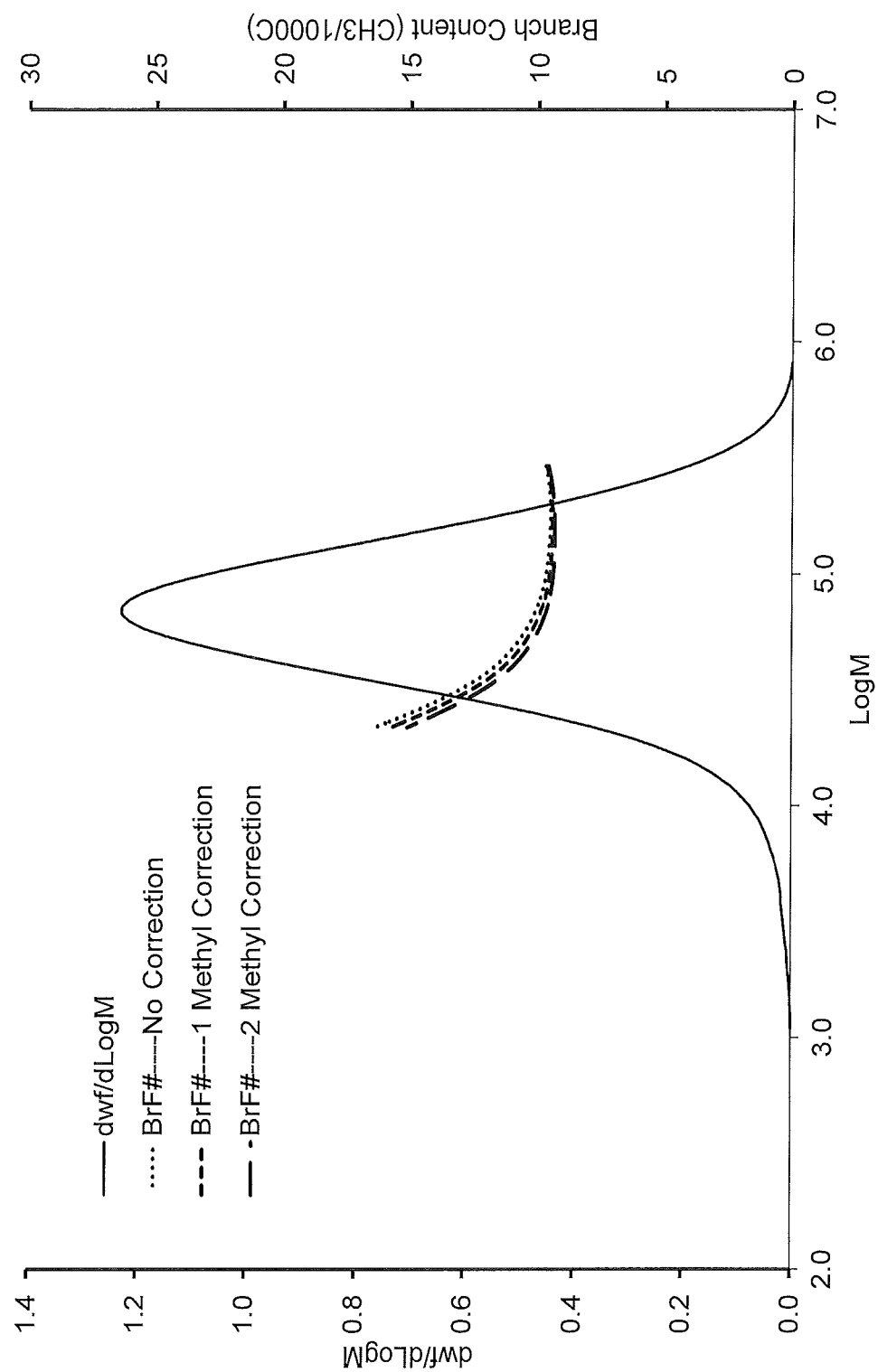
FIG. 3. shows the gel permeation chromatograph with Fourier Transform Infra-Red detection (GPC-FTIR) for the polymer obtained in polymerization Run No. 20 (carried out at 140° C.) which employed the catalyst of Example 5.
Figure 4:
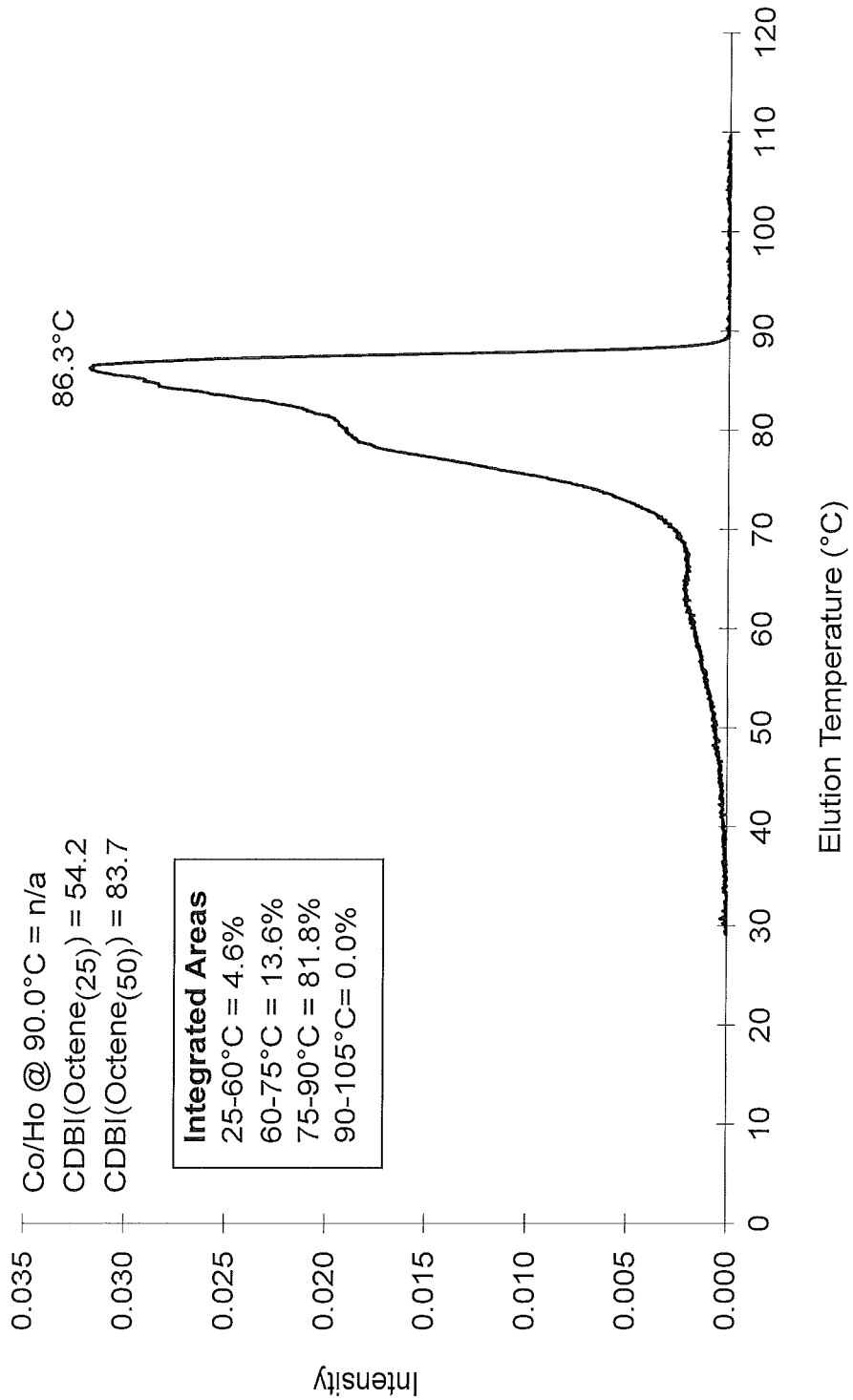
FIG. 4. shows the temperature rising elution fractionation (TREF) profile for the polymer obtained in polymerization Run No. 20 (carried out at 140° C.) which employed the catalyst of example 5.
Figure 5:
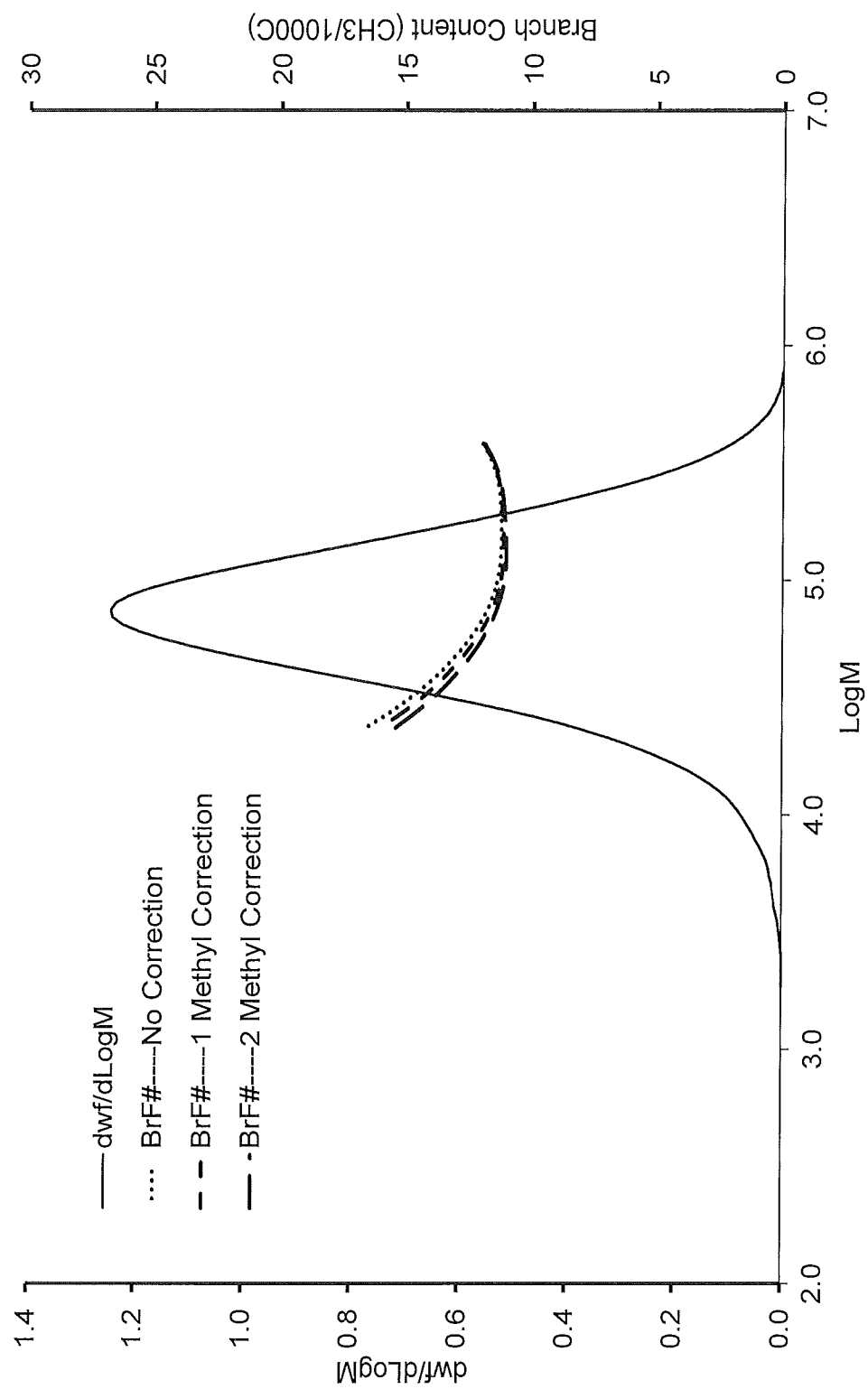
FIG. 5. shows the GPC-FTIR profile for the polymer obtained in polymerization Run No. 21 (carried out at 140° C.) which employed the catalyst of Example 6.
Figure 6:
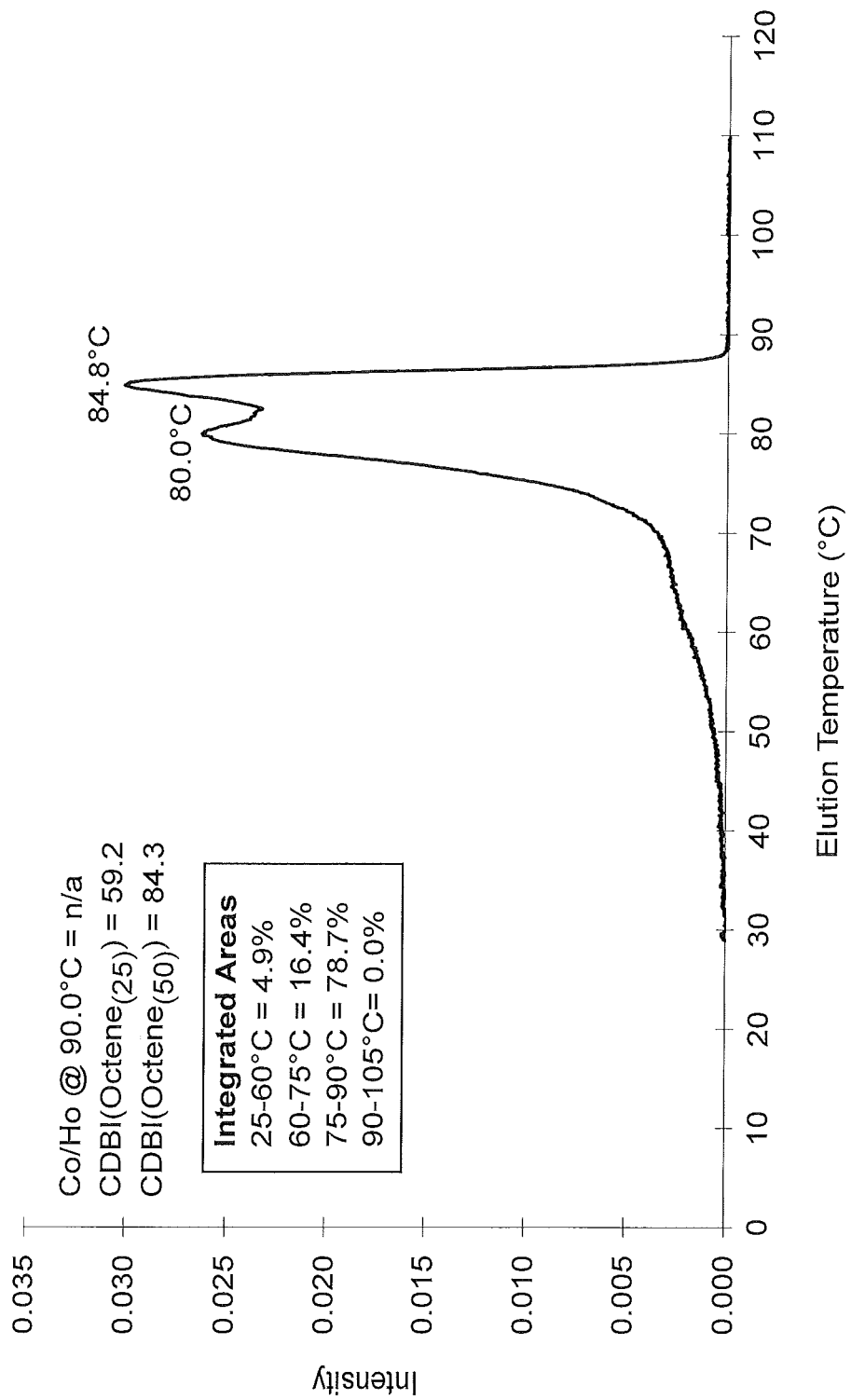
FIG. 6. shows the TREF profile for the polymer obtained in polymerization Run No. 21 (carried out at 140° C.) which employed the catalyst of Example 6.
Figure 7:
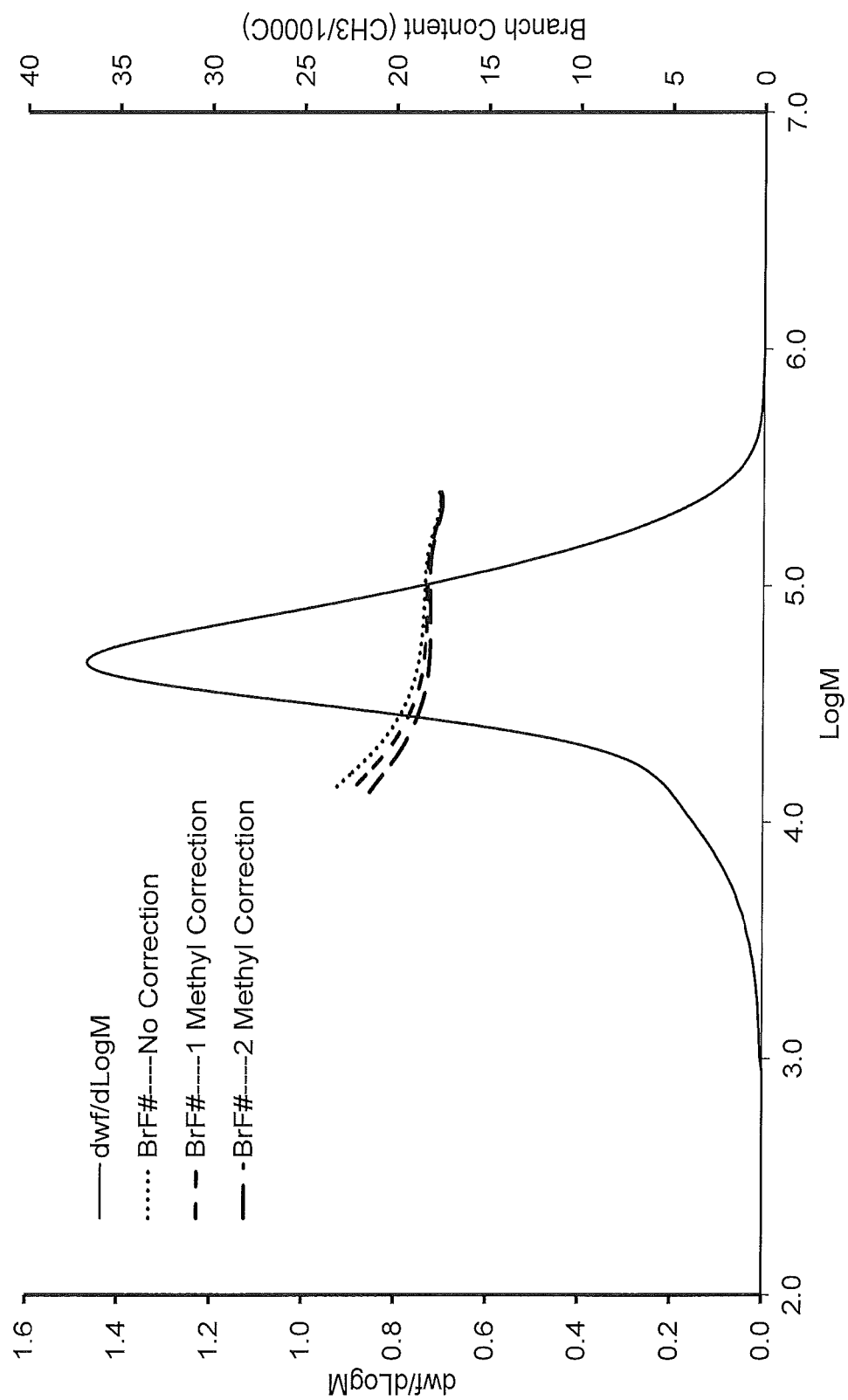
FIG. 7. shows the GPC-FTIR profile for the polymer obtained in polymerization Run No. 22 (carried out at 140° C.) which employed the catalyst of Example 7.
Figure 8:
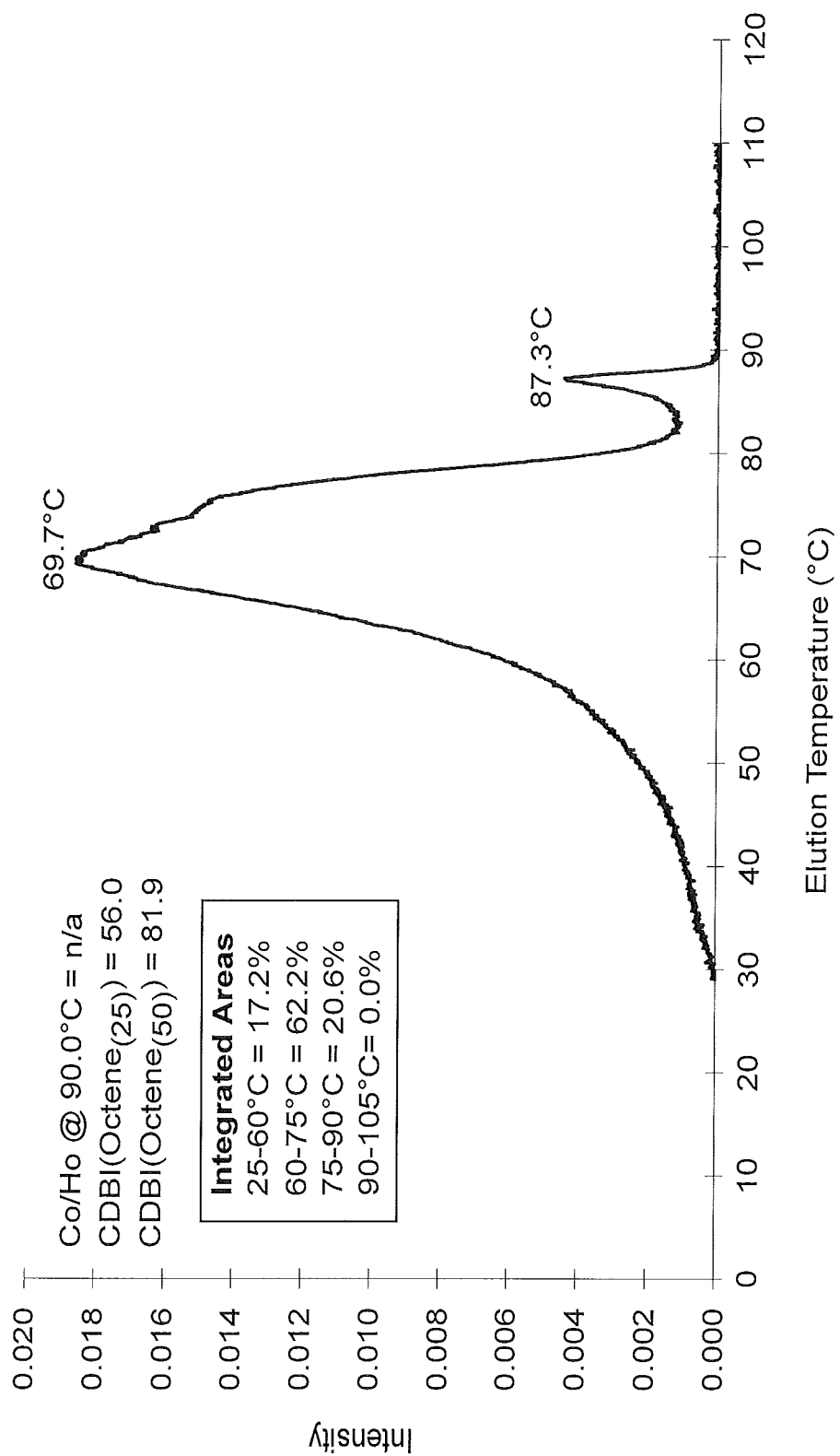
FIG. 8. shows the TREF profile for the polymer obtained in polymerization Run No. 22 (carried out at 140° C.) which employed the catalyst of Example 7.
Figure 27:
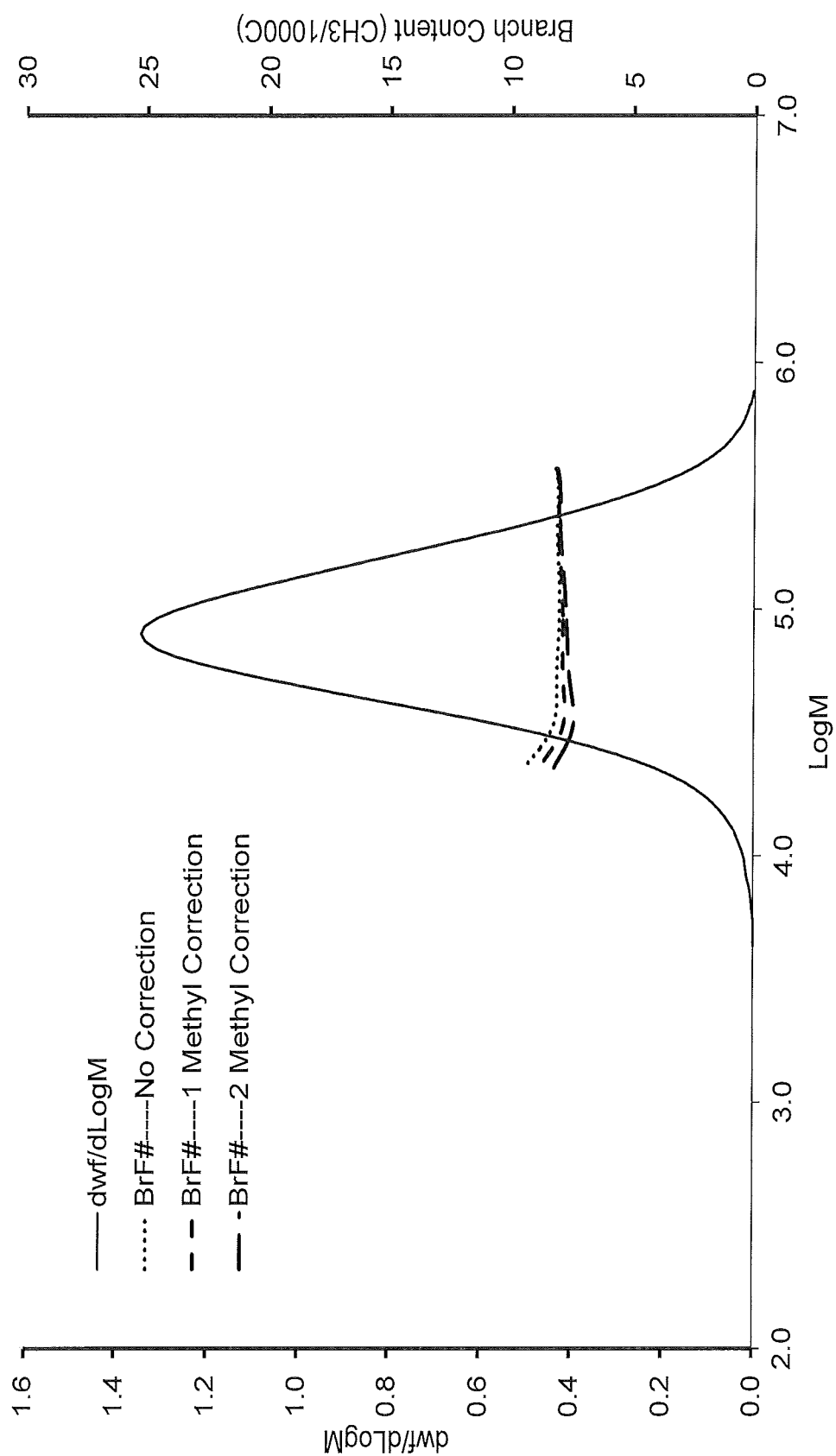
FIG. 27. shows the GPC-FTIR profile for the polymer obtained from polymerization Run No. 35 (carried out at 140° C.) which employed the catalyst of Example 14.
Figure 28:
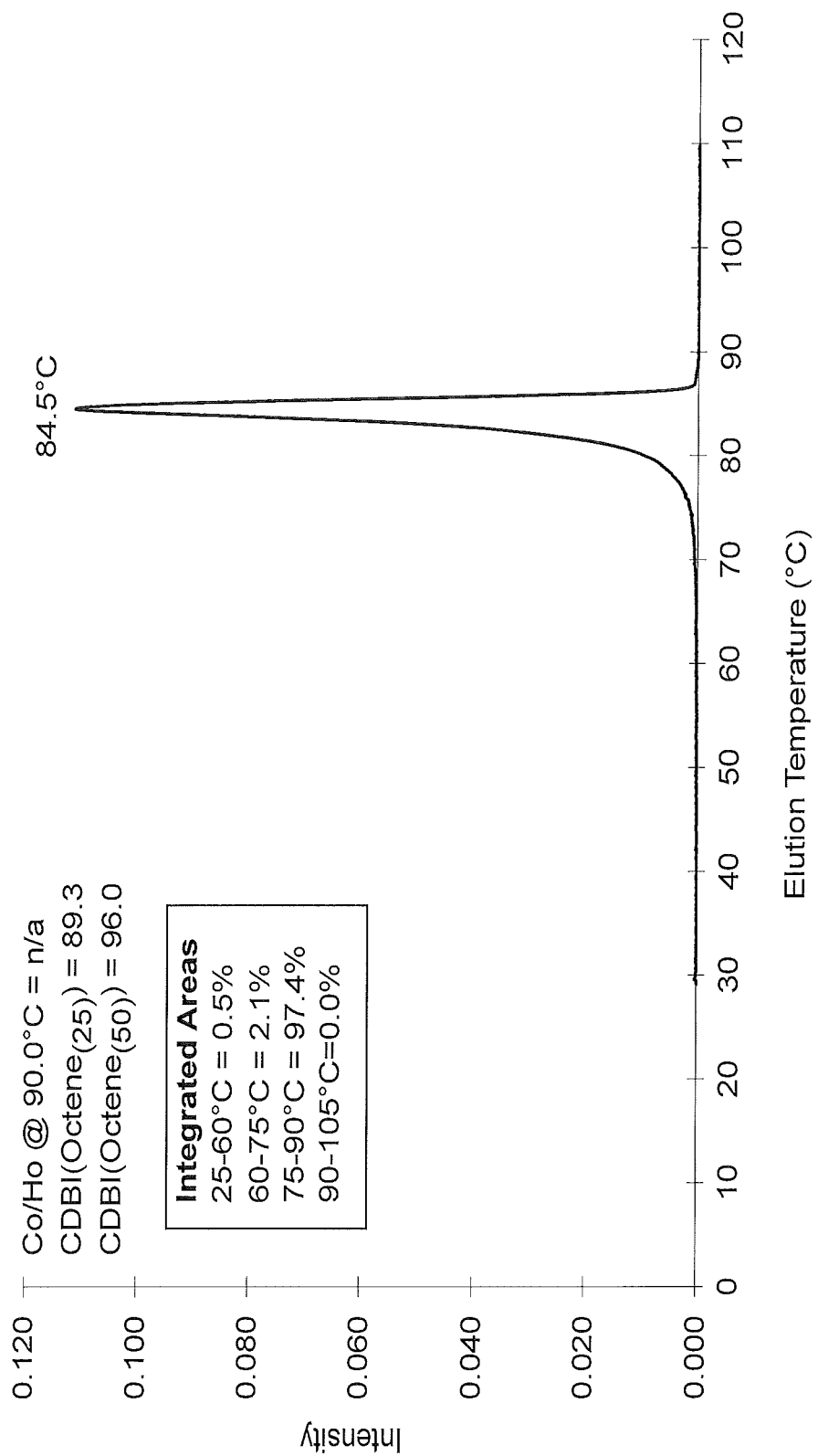
FIG. 28. shows the TREF profile for the polymer obtained in polymerization Run No. 35 (carried out at 140° C.) which employed the catalyst of Example 14.
Figure 29:
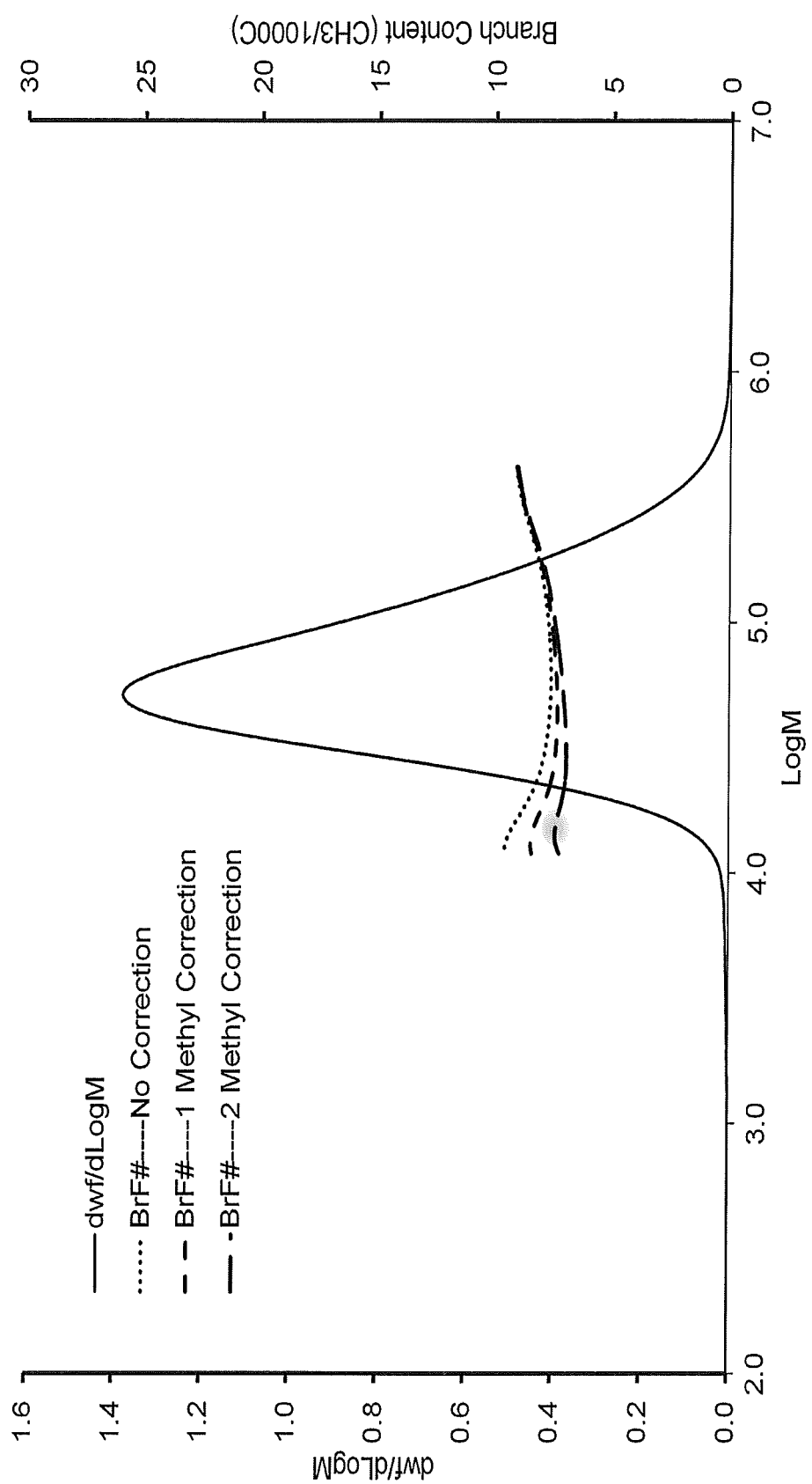
FIG. 29. shows the GPC-FTIR profile for the polymer obtained from polymerization Run No. 37 (carried out at 140° C.) which employed the catalyst of Example 15.
Figure 30:
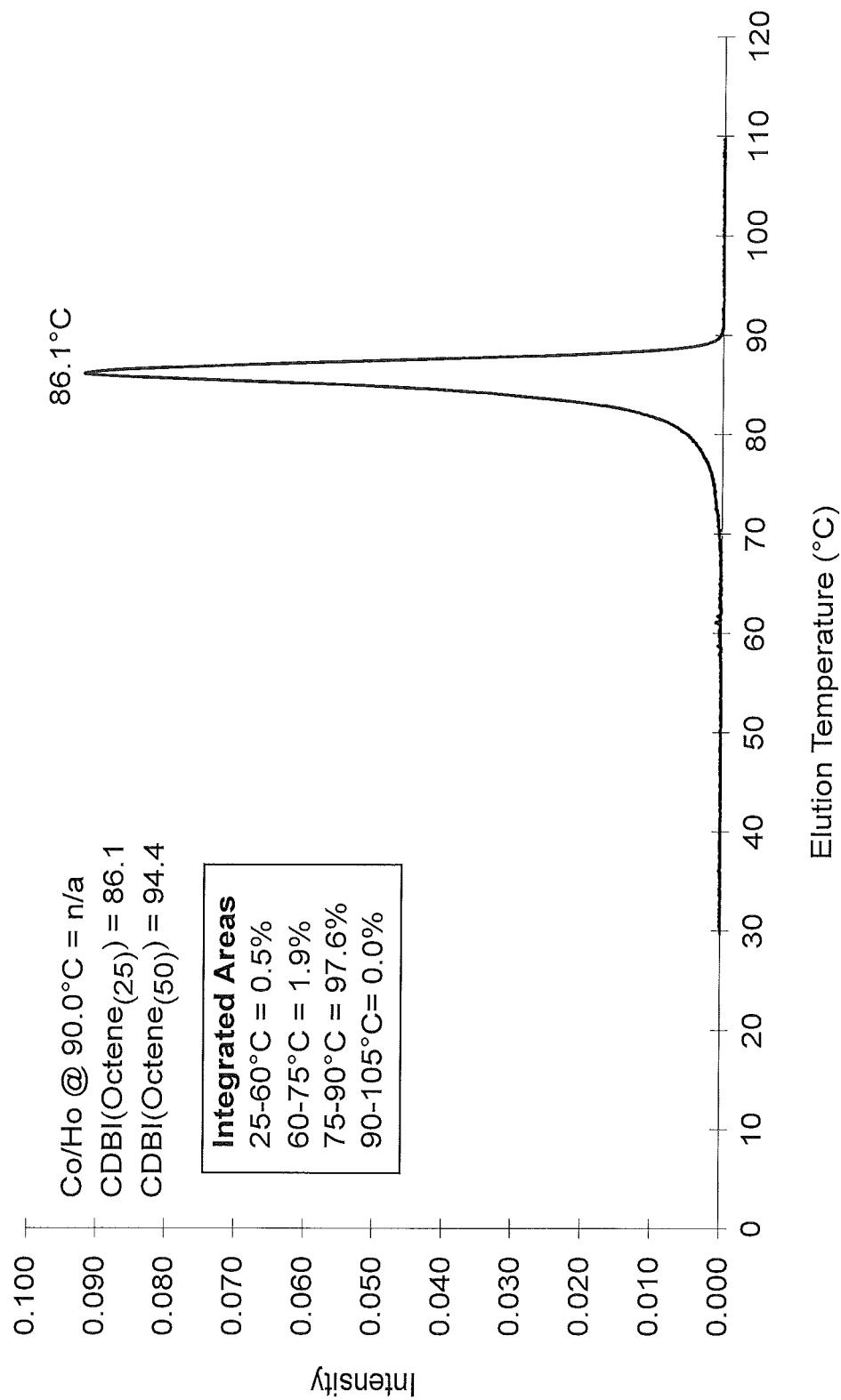
FIG. 30. shows the TREF profile for the polymer obtained in polymerization Run No. 37 (carried out at 140° C.) which employed the catalyst of Example 15.

As discussed above, inventive phosphinimine complexes having P-bonded bulky 2,7-di-tent-butylfluorenyl substituents and two larger P-bonded tent-butyl groups (Ex. 5, 6, and 7) displayed dynamic $^1$H NMR behaviour. Catalysts derived from these complexes displayed multisite behaviour, inferred from the non-homogeneous distribution of short chain branches (SCB) as indicated by GPC-FTIR and TREF analysis of the copolymers. Copolymers from runs 20-22 conducted at 140° C. all displayed broadened bimodal or trimodal TREF profiles (FIGS. 4, 6, and 8) with $CDBI_{50}$ of <90 wt % while comparative runs 35 and 37 (140° C.) had sharp, unimodal TREF profiles with $CDBI_{50}$ of 96.0 and 94.4 wt %, respectively (FIGS. 28 and 30). Similarly, the GPC-FTIR profiles for runs 20-22 (FIGS. 3, 5, and 7) all displayed 'normal' SCB distributions (higher SCB at lower MW) which are in contrast to the flat (uniform) SCB distributions shown in runs 35 and 37 (FIGS. 27 and 29).

To distinguish between multisite behaviour originating from slow rotational isomerism (i.e., due to the energetic barrier to rotation observed in the NMR) and multisite behaviour due to incomplete or slow alkylation/activation of the catalyst, the performance of dichloride complex Ex. 5 (run 20) was compared to that of its dimethylated congener Ex. 6 (run 21). Polymerization runs 20 and 21 showed similar catalyst activities ($k_p$), GPC-FTIR and TREF profiles. These results suggest that the alkylation and activation of dichloride complex Ex. 5 was rapid and produced the same active species as the dimethylated version Ex. 6 and also that the multisite behaviour is due to rotational ligand dynamics rather than slow or incomplete alkylation/activation.

Figure 9:
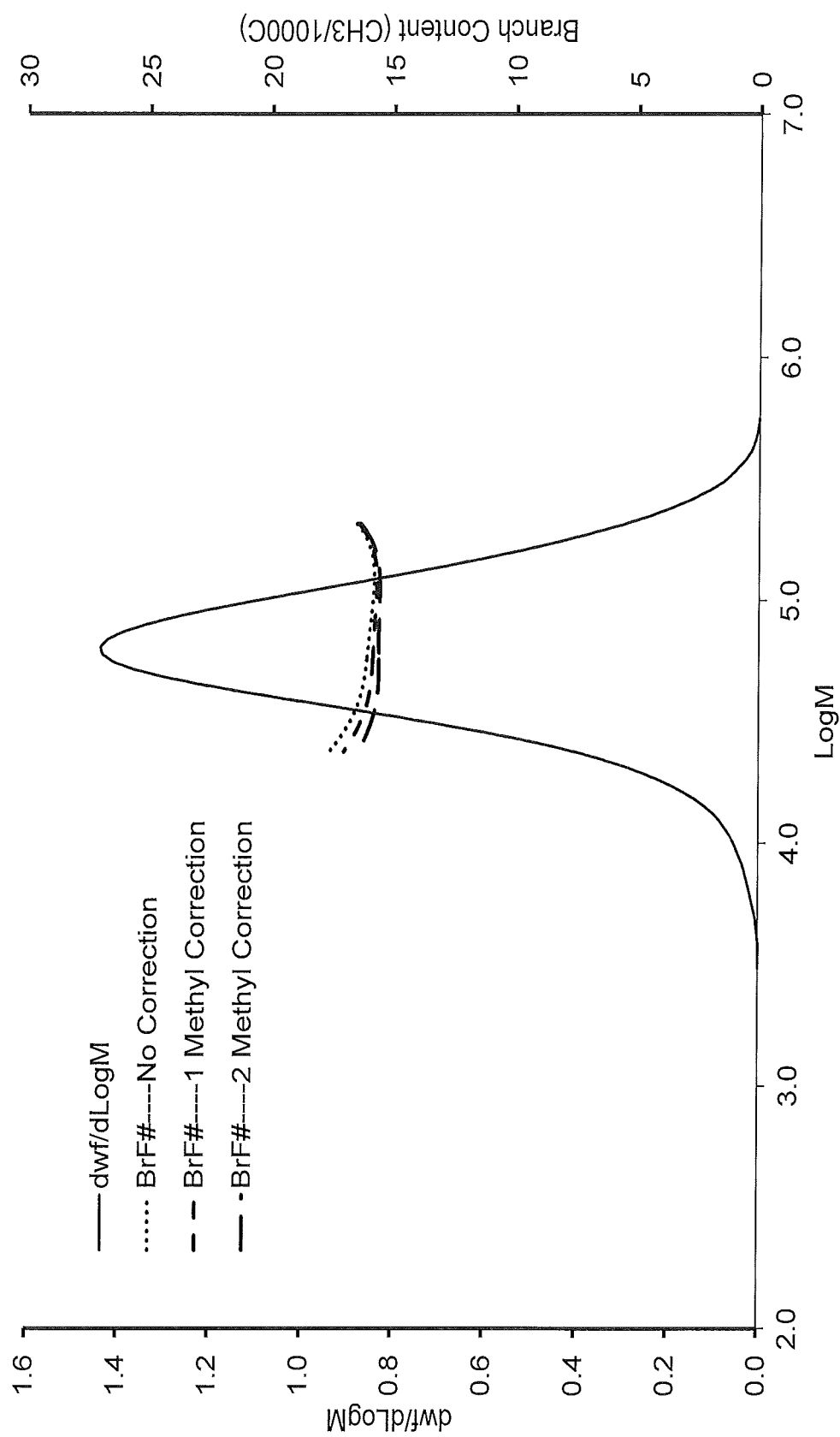
FIG. 9. shows the GPC-FTIR profile for the polymer obtained from polymerization Run No. 23 (carried out at 140° C.) which employed the catalyst of Example 8.
Figure 10:
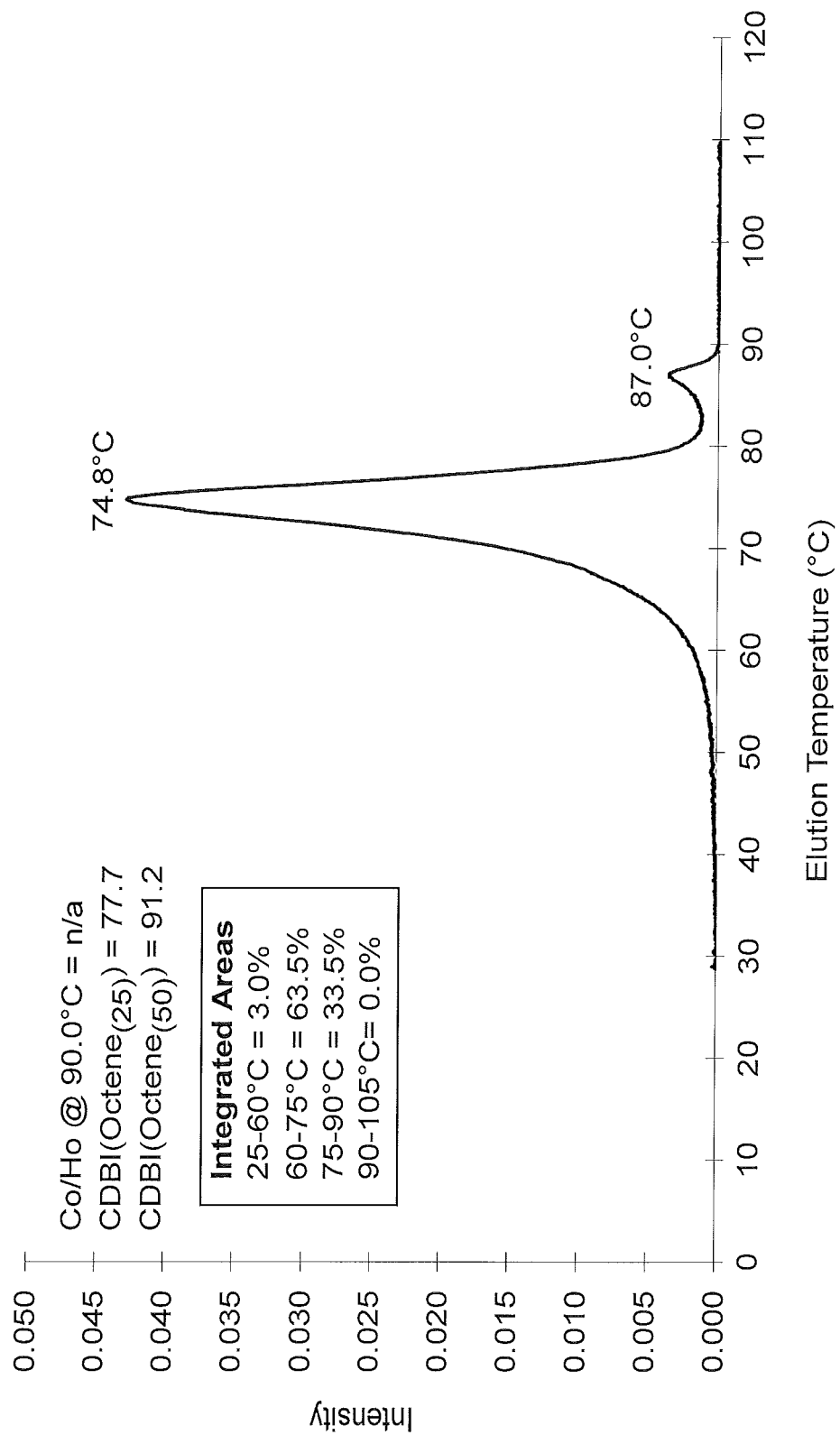
FIG. 10. shows the TREF profile for the polymer obtained in polymerization Run No. 23 (carried out at 140° C.) which employed the catalyst of Example 8.
Figure 11:
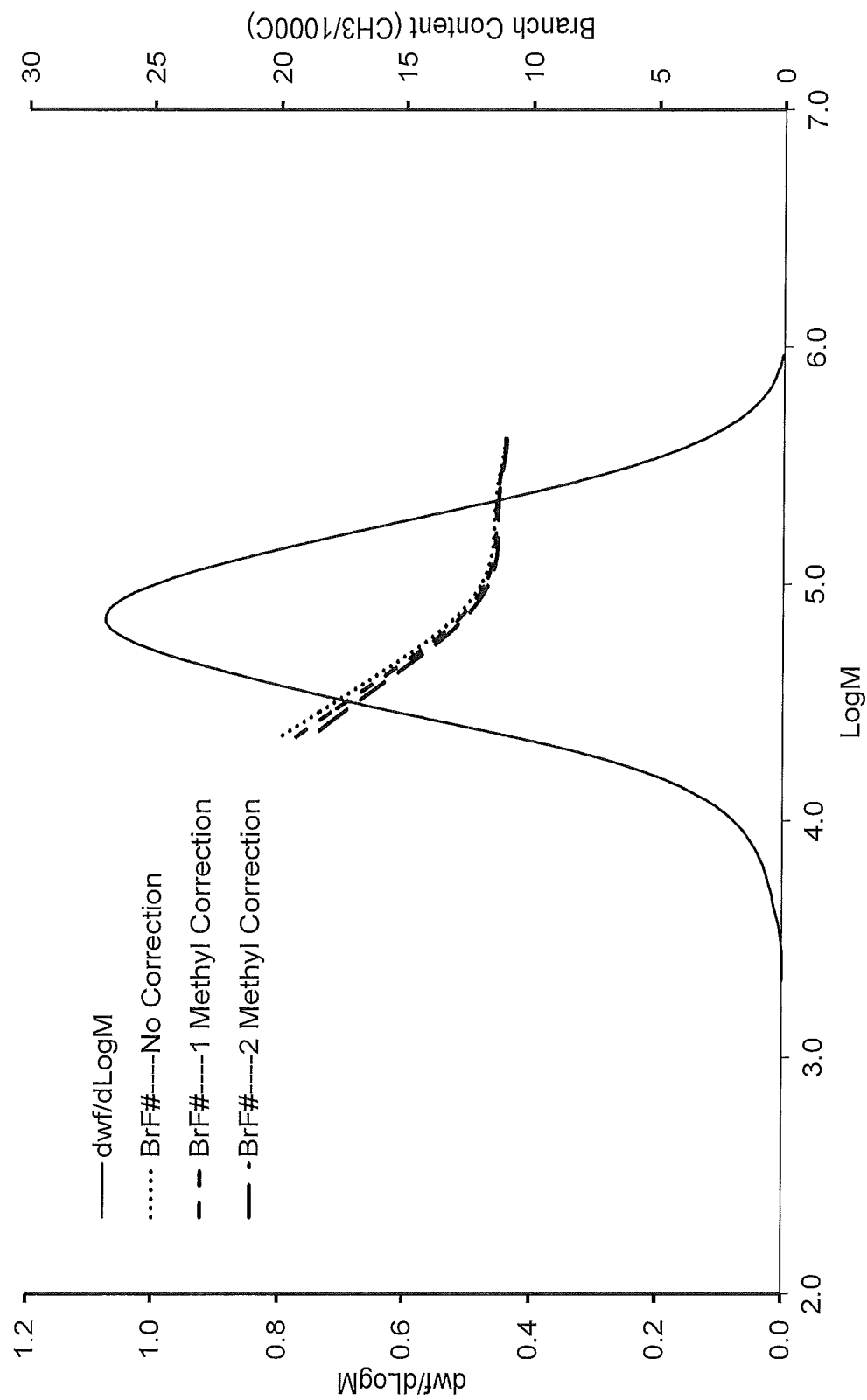
FIG. 11. shows the GPC-FTIR profile for the polymer obtained from polymerization Run No. 26 (carried out at 130° C.) which employed the catalyst of Example 11.
Figure 12:
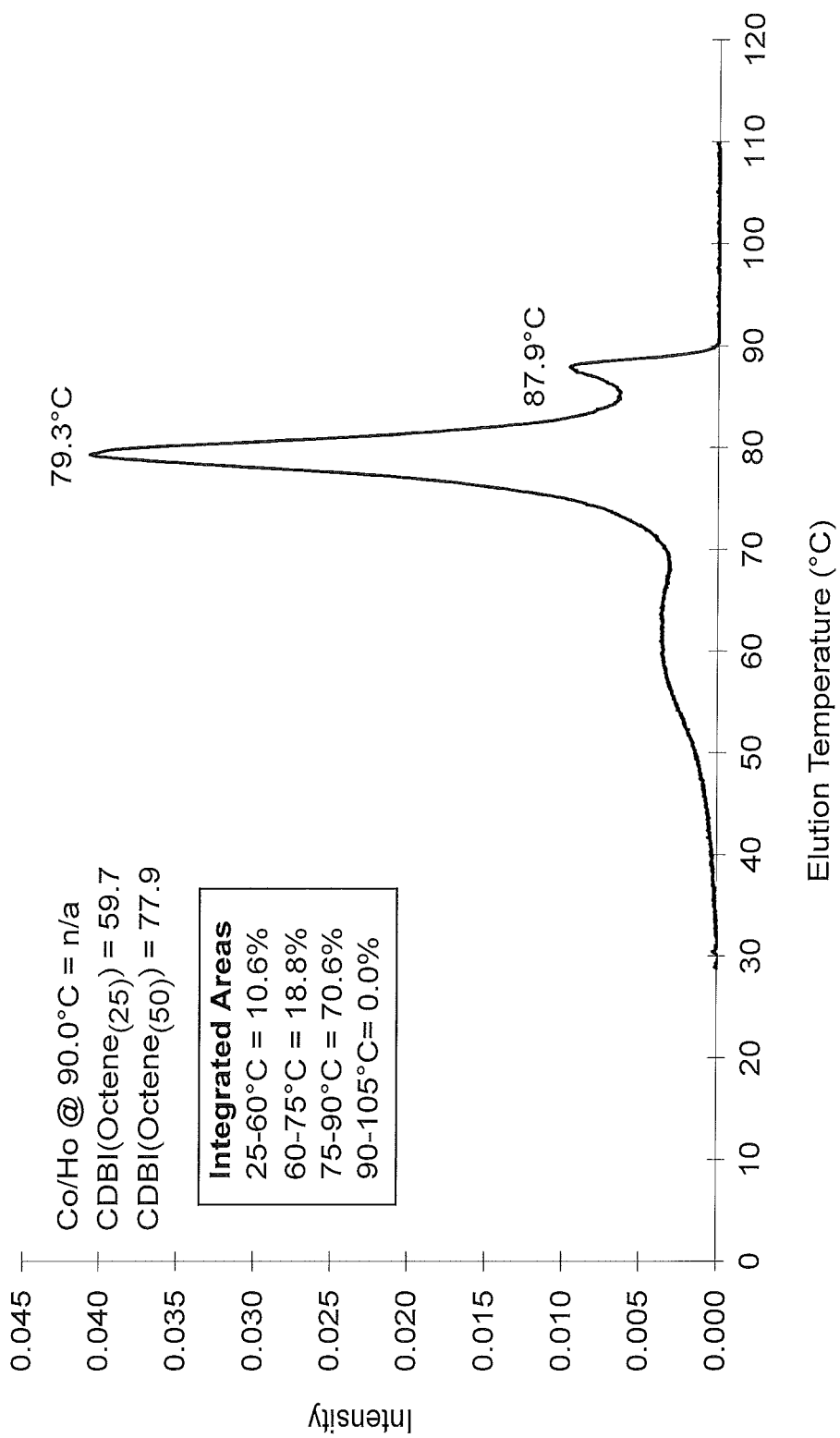
FIG. 12. shows the TREF profile for the polymer obtained in polymerization Run No. 26 (carried out at 130° C.) which employed the catalyst of Example 11.
Figure 13:
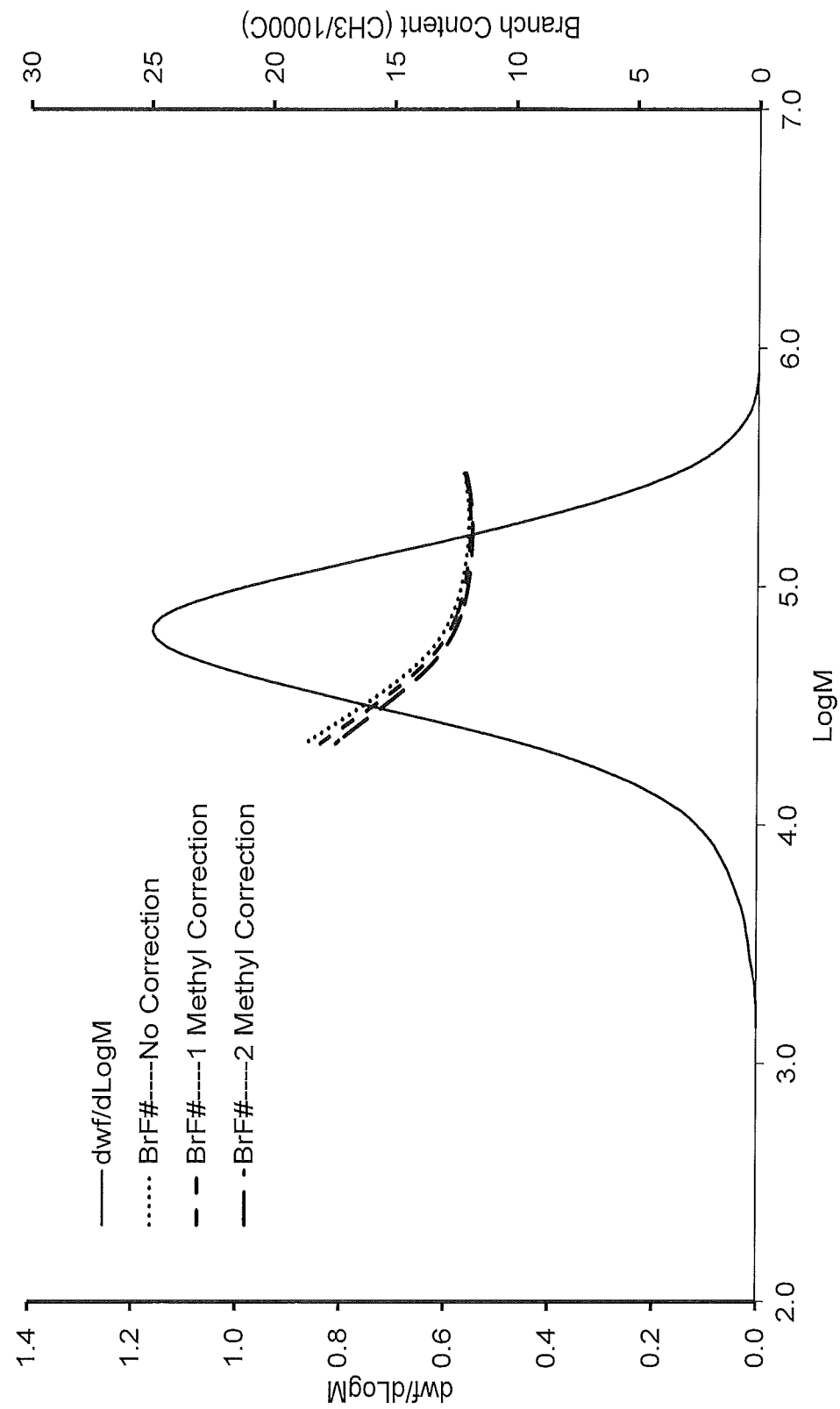
FIG. 13. hows the GPC-FTIR profile for the polymer obtained from polymerization Run No. 27 (carried out at 140° C.) which employed the catalyst of Example 11.
Figure 14:
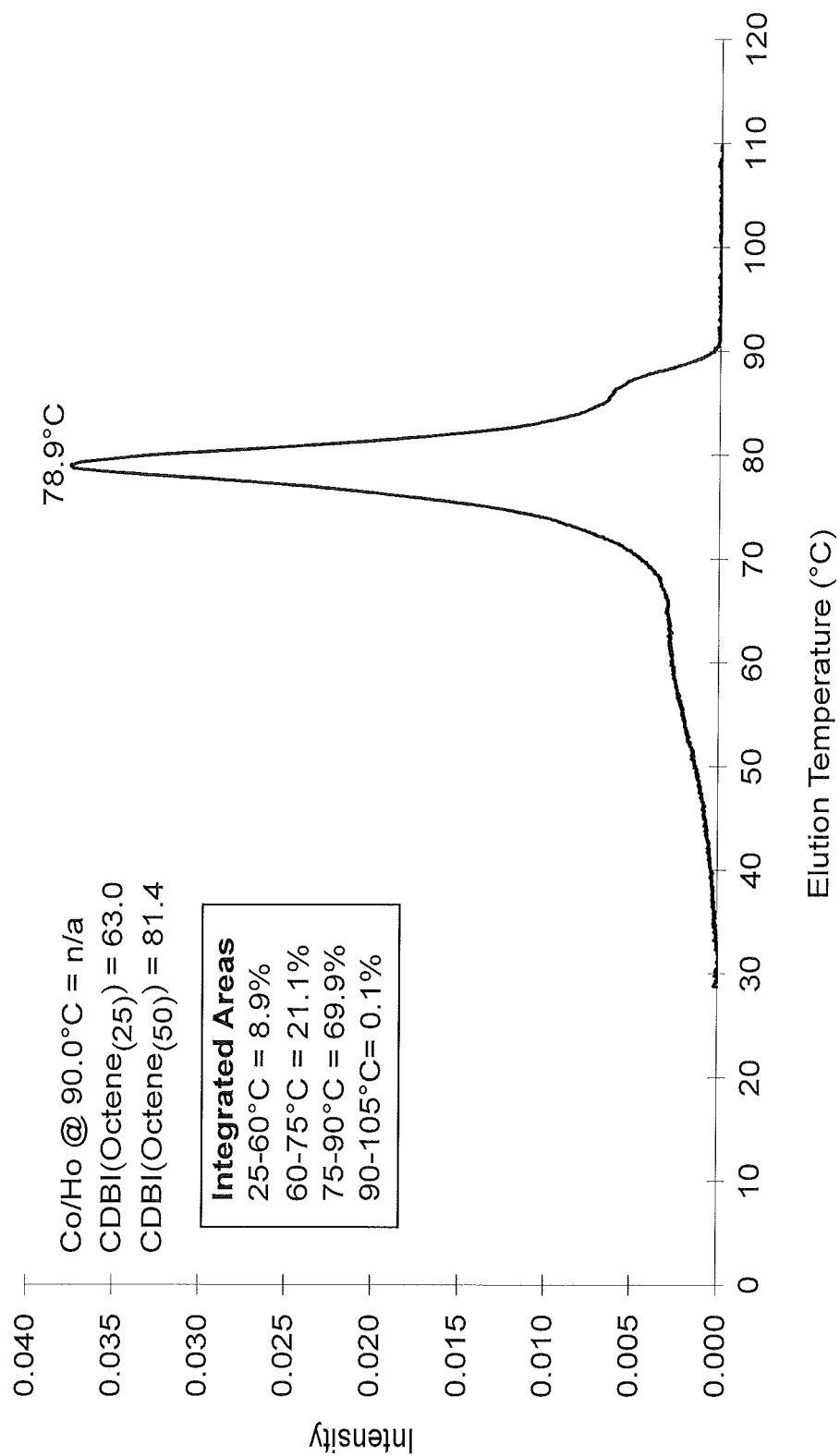
FIG. 14. shows the TREF profile for the polymer obtained in polymerization Run No. 27 (carried out at 140° C.) which employed the catalyst of Example 11.
Figure 15:
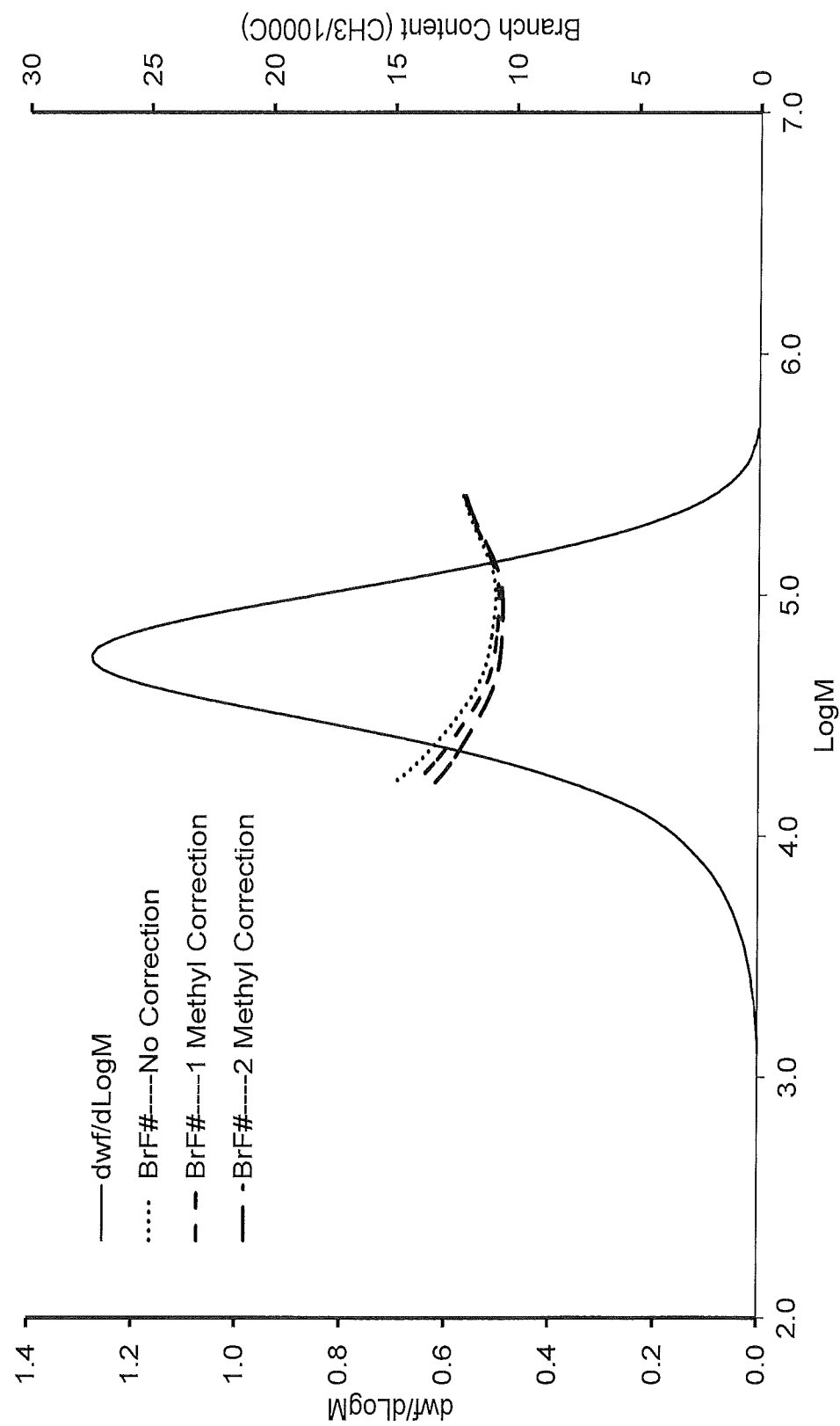
FIG. 15. shows the GPC-FTIR profile for the polymer obtained from polymerization Run No. 28 (carried out at 160° C.) which employed the catalyst of Example 11.
Figure 16:
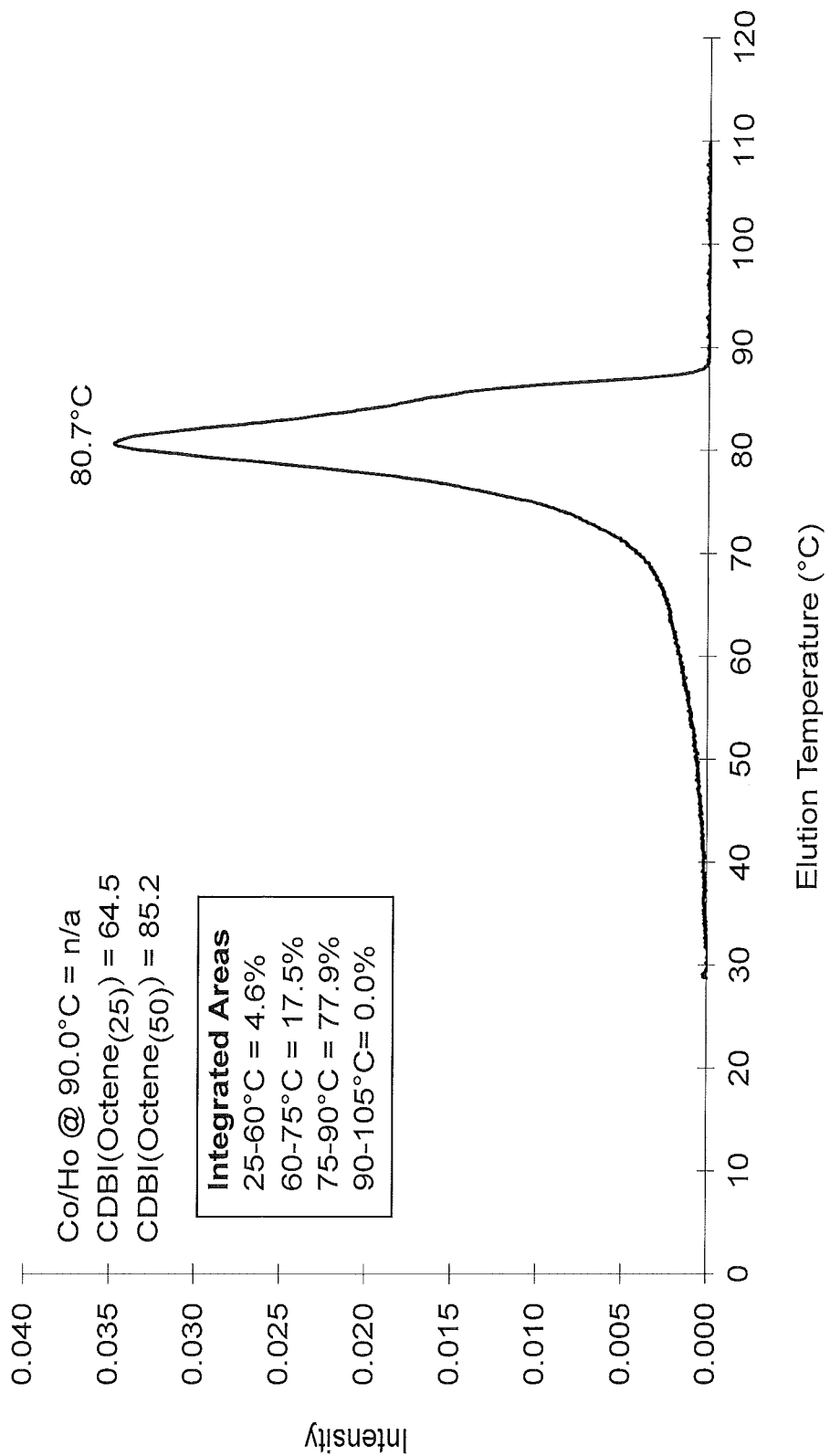
FIG. 16. shows the TREF profile for the polymer obtained in polymerization Run No. 28 (carried out at 160° C.) which employed the catalyst of Example 11.
Figure 17:
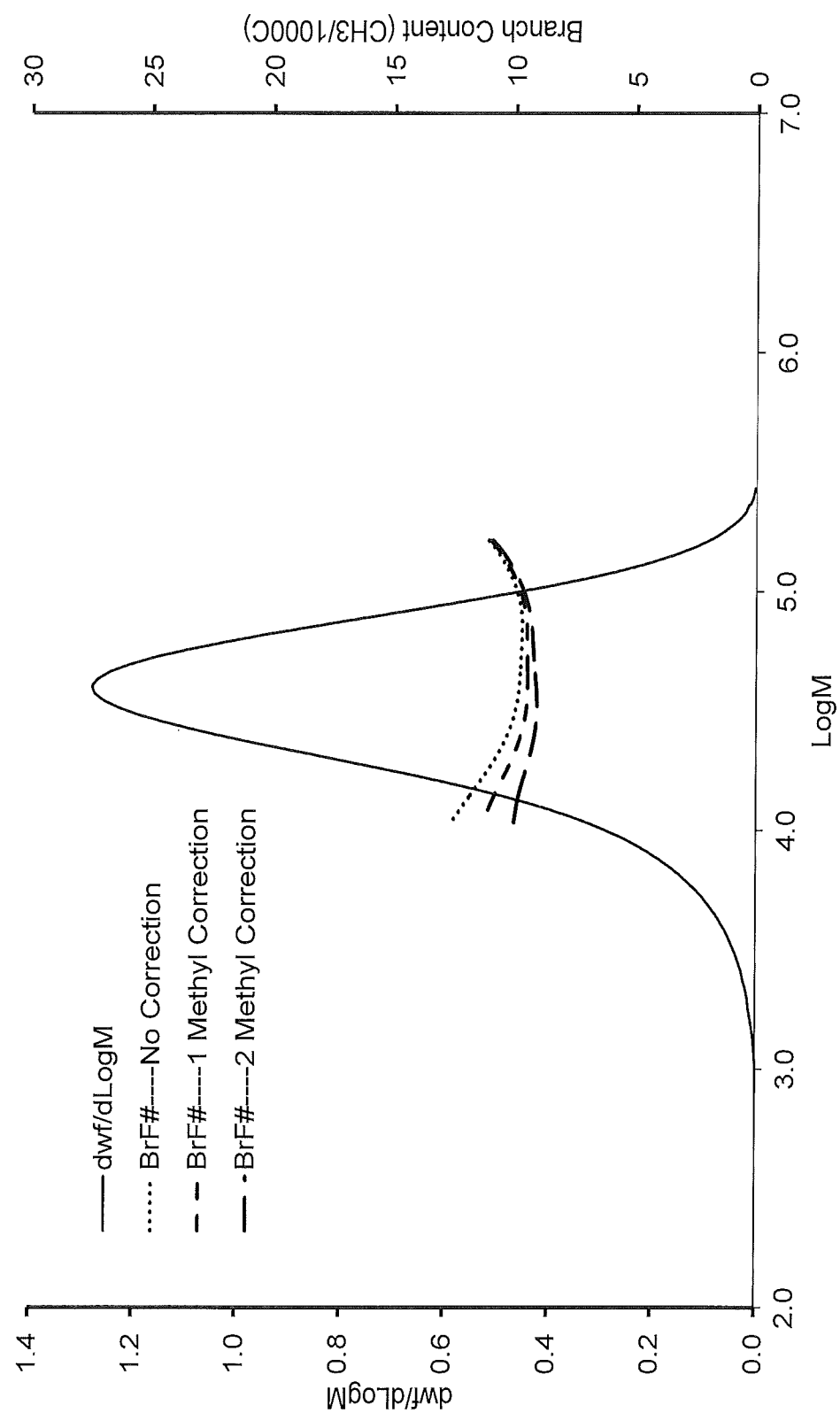
FIG. 17. shows the GPC-FTIR profile for the polymer obtained from polymerization Run No. 29 (carried out at 190° C.) which employed the catalyst of Example 11.
Figure 18:
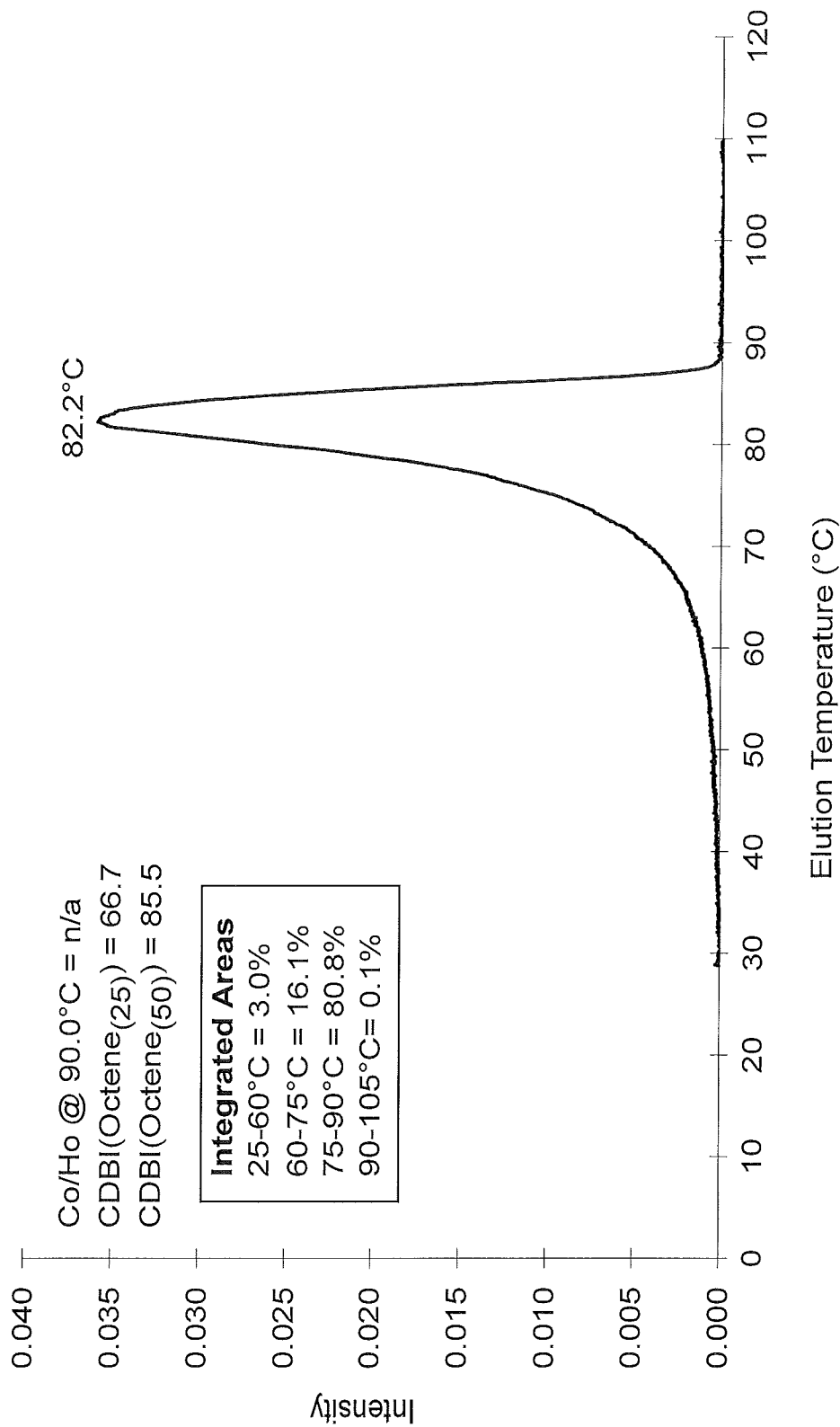
FIG. 18. shows the TREF profile for the polymer obtained in polymerization Run No. 29 (carried out at 190° C.) which employed the catalyst of Example 11.
Figure 19:
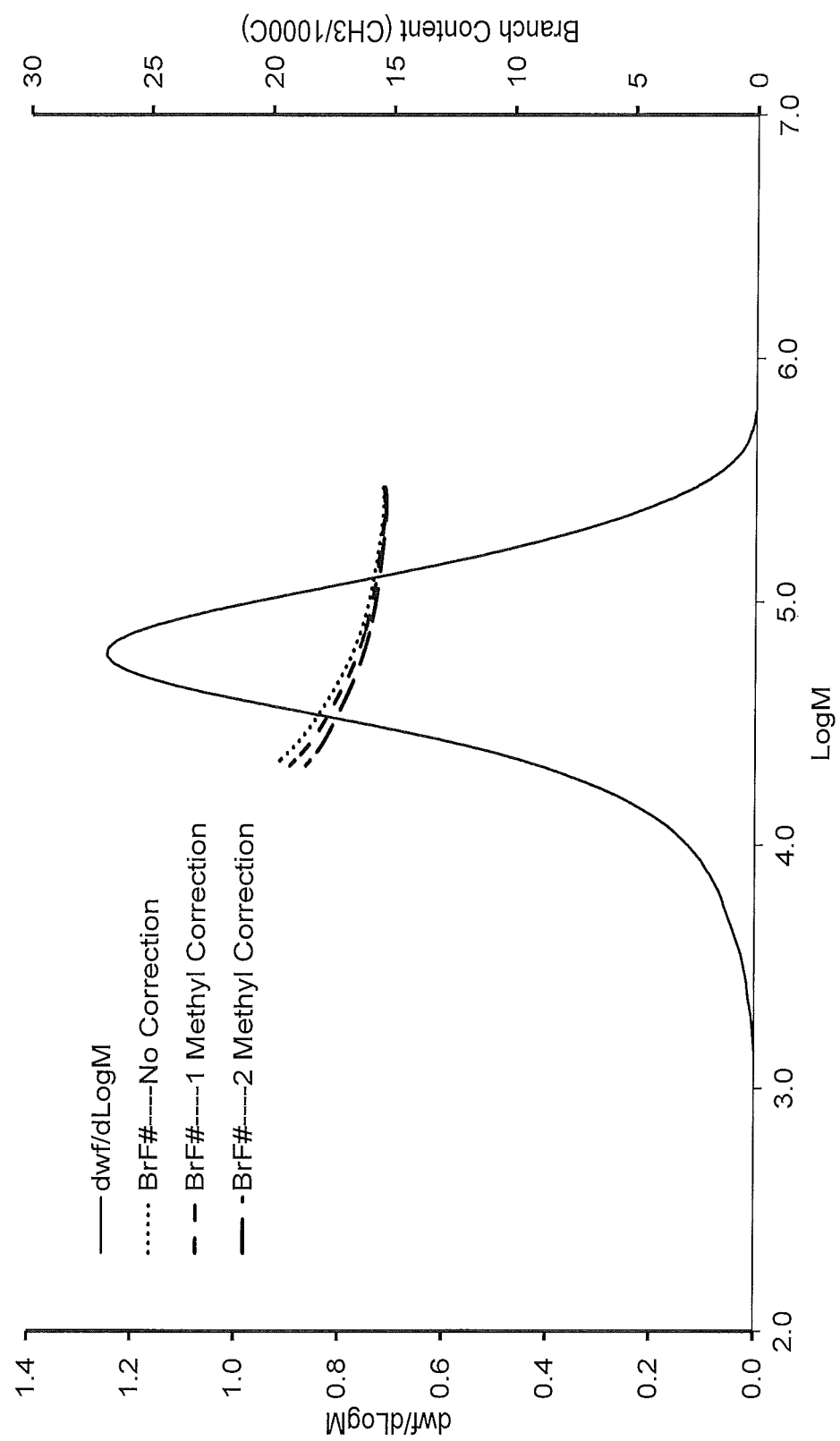
FIG. 19. shows the GPC-FTIR profile for the polymer obtained from polymerization Run No. 30 (carried out at 130° C.) which employed the catalyst of Example 11.
Figure 20:
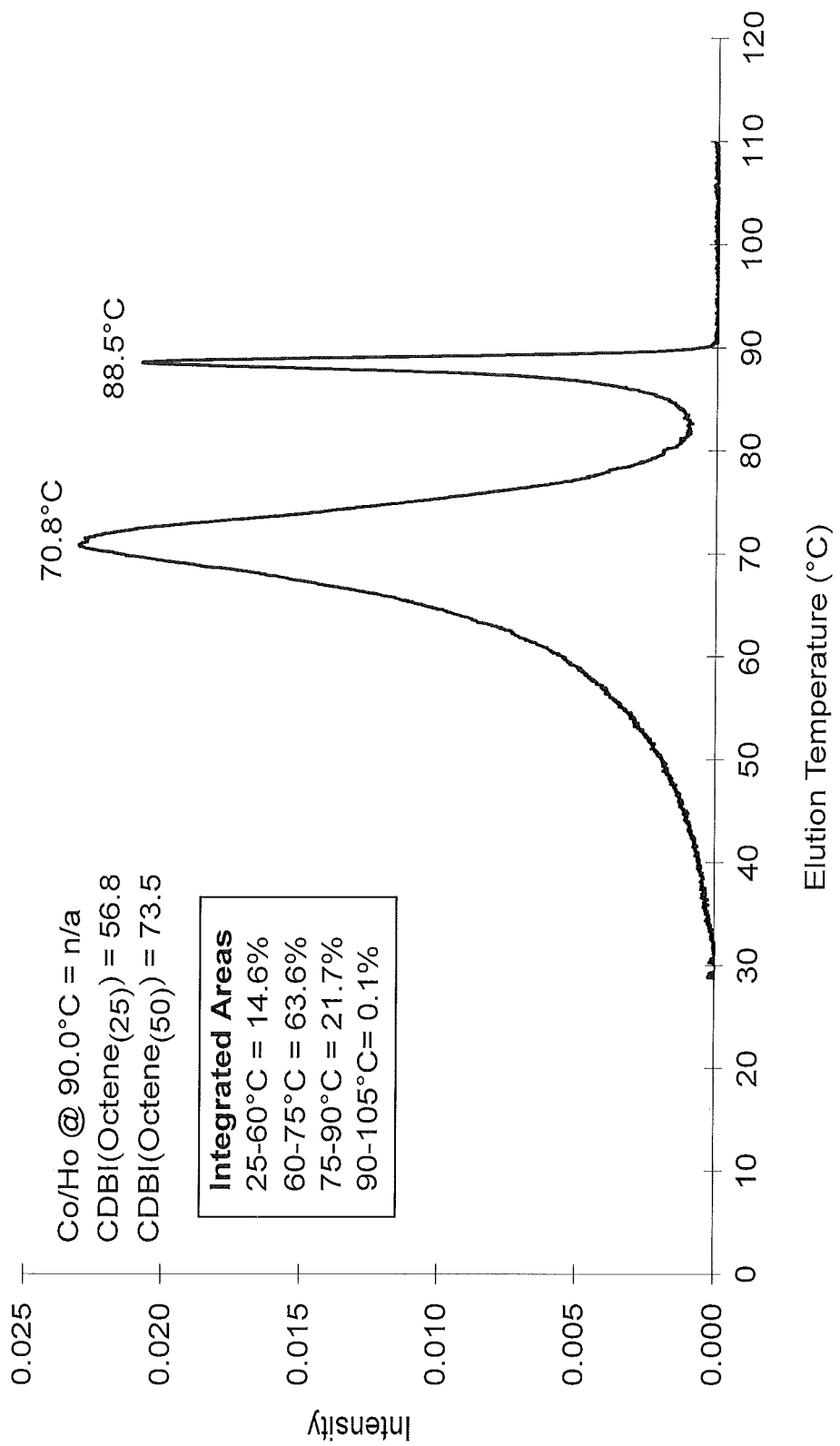
FIG. 20. shows the TREF profile for the polymer obtained in polymerization Run No. 30 (carried out at 130° C.) which employed the catalyst of Example 12.
Figure 21:
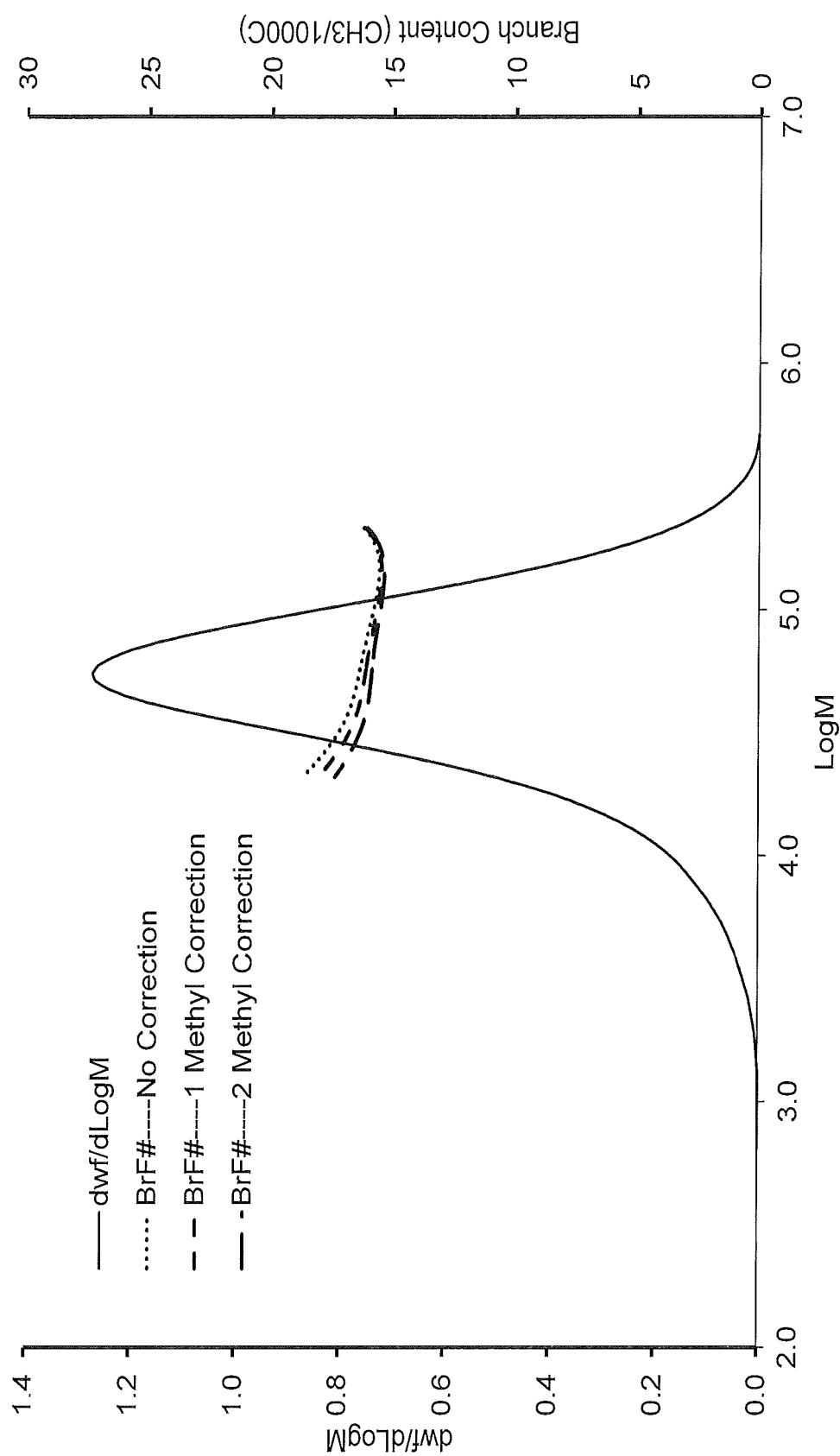
FIG. 21. shows the GPC-FTIR profile for the polymer obtained from polymerization Run No. 31 (carried out at 140° C.) which employed the catalyst of Example 12.
Figure 22:
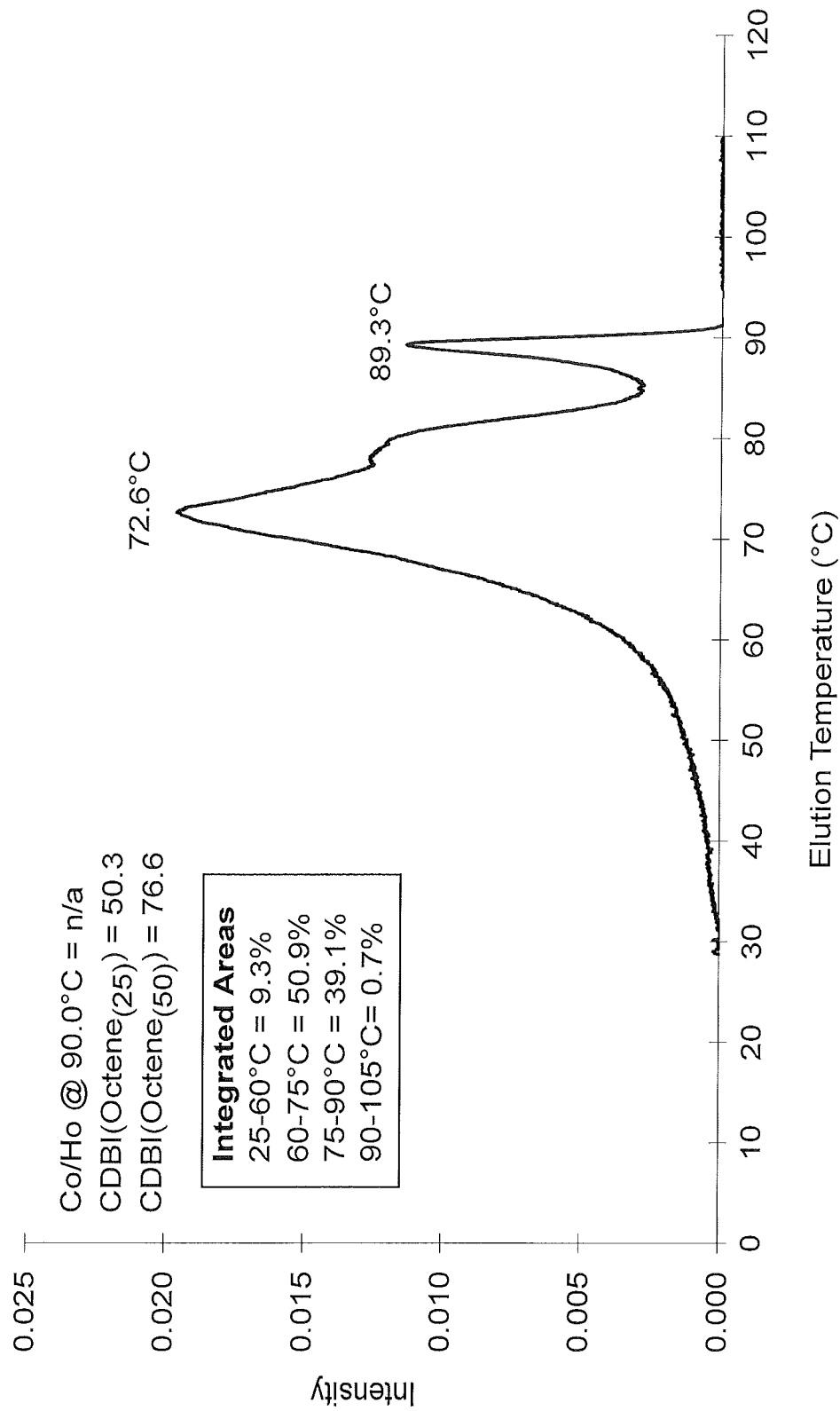
FIG. 22. shows the TREF profile for the polymer obtained in polymerization Run No. 31 (carried out at 140° C.) which employed the catalyst of Example 12.
Figure 23:
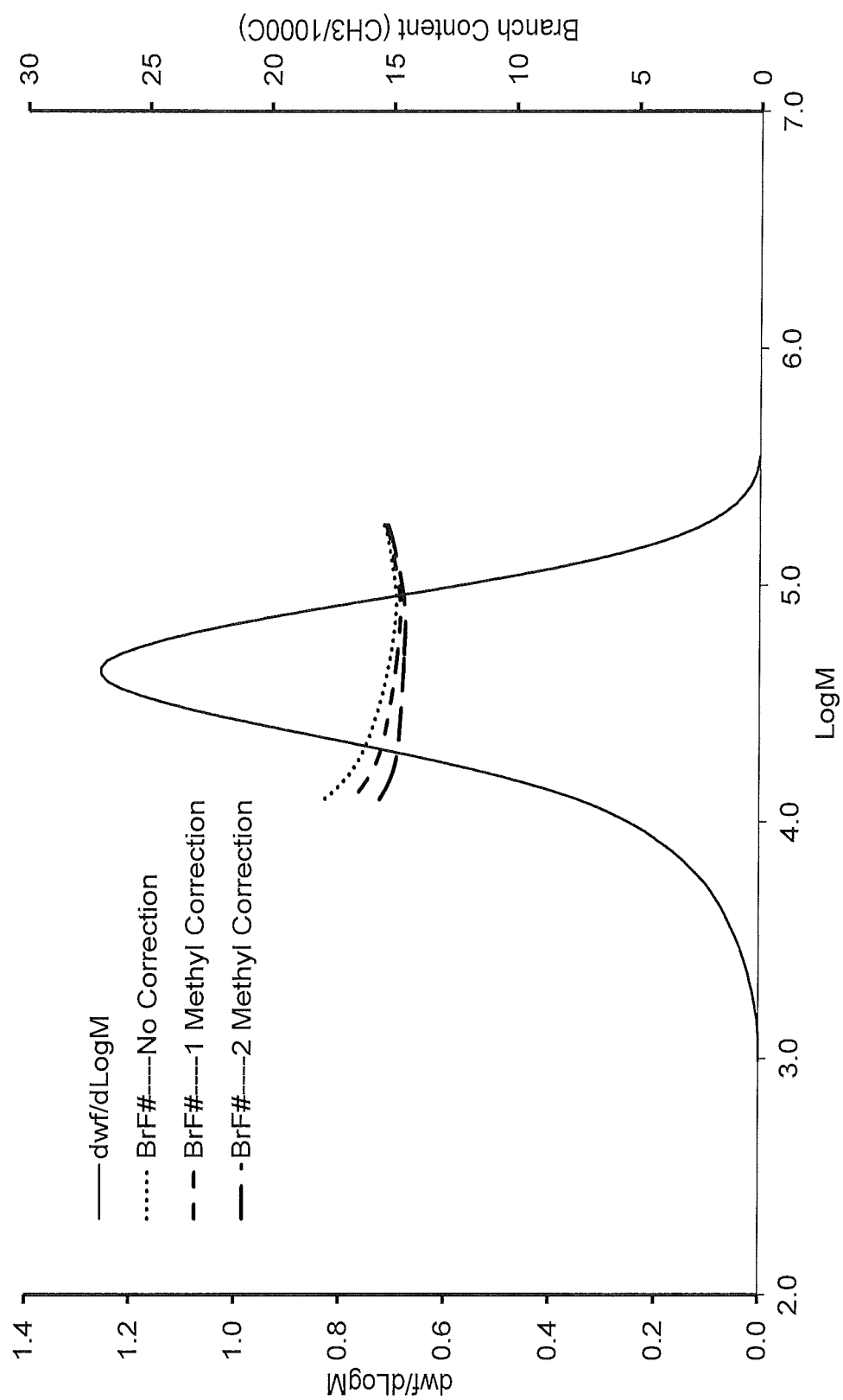
FIG. 23. shows the GPC-FTIR profile for the polymer obtained from polymerization Run No. 32 (carried out at 160° C.) which employed the catalyst of Example 12.
Figure 24:
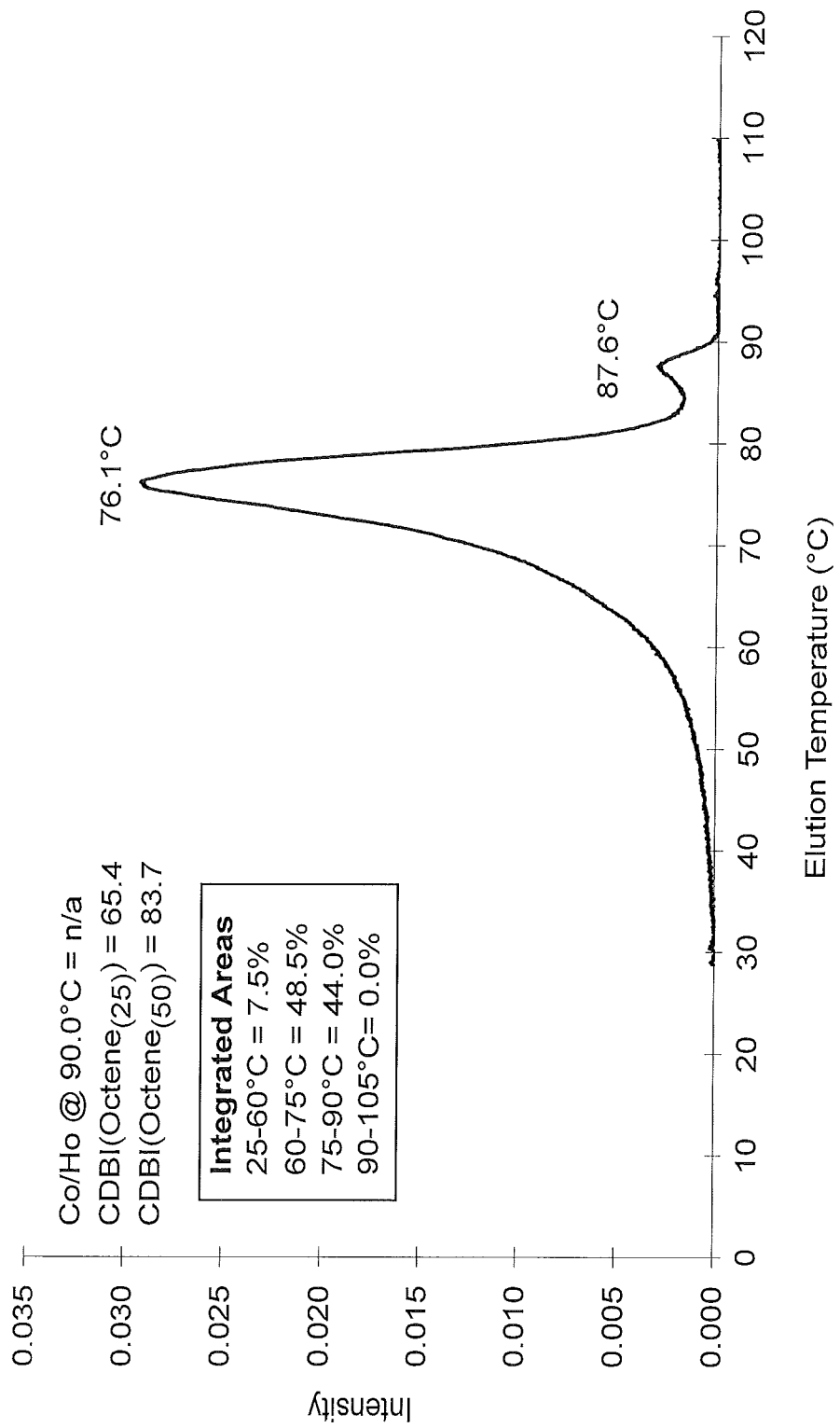
FIG. 24. shows the TREF profile for the polymer obtained in polymerization Run No. 32 (carried out at 160° C.) which employed the catalyst of Example 12.
Figure 25:
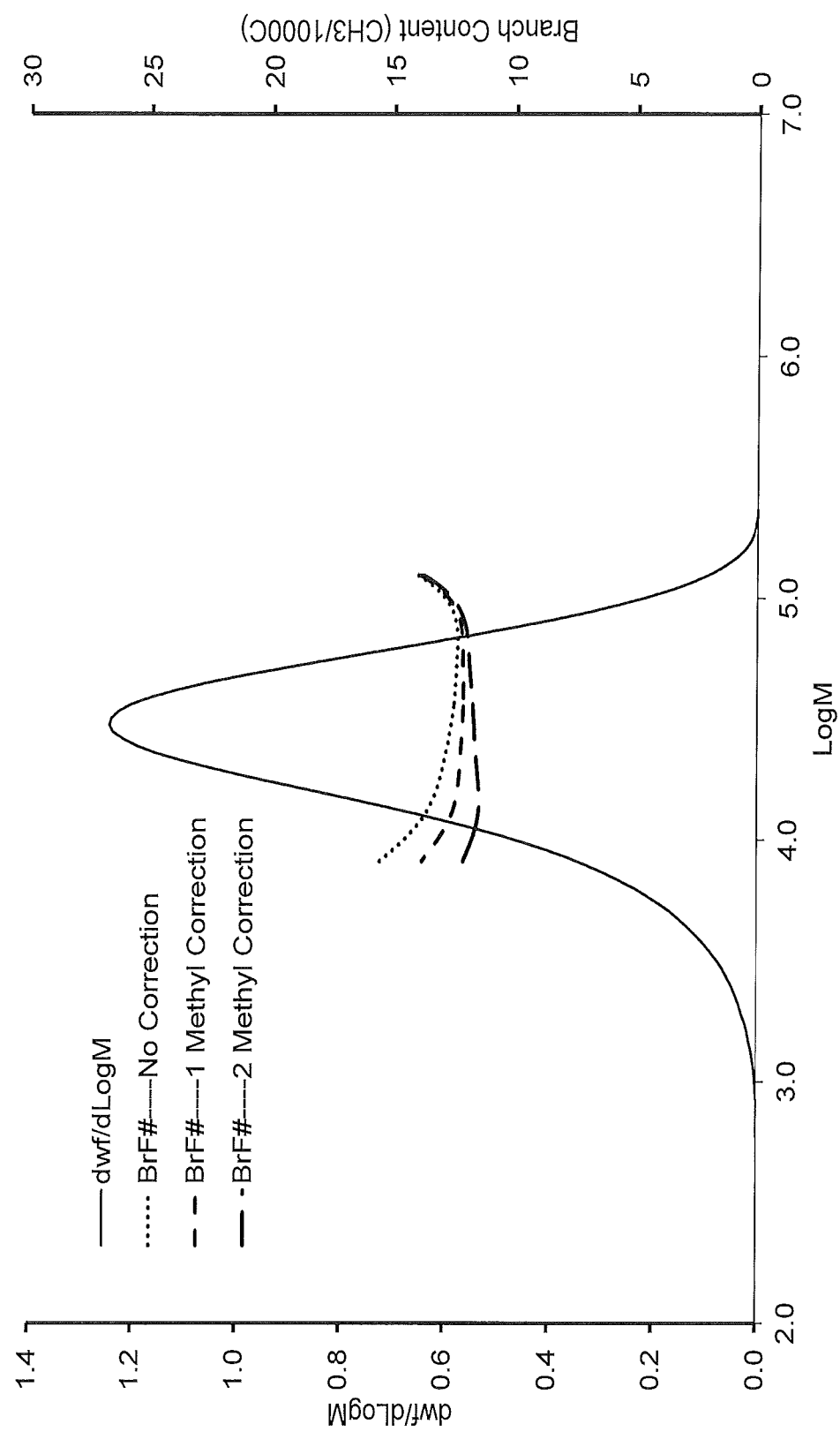
FIG. 25. shows the GPC-FTIR profile for the polymer obtained from polymerization Run No. 33 (carried out at 190° C.) which employed the catalyst of Example 12.
Figure 26:
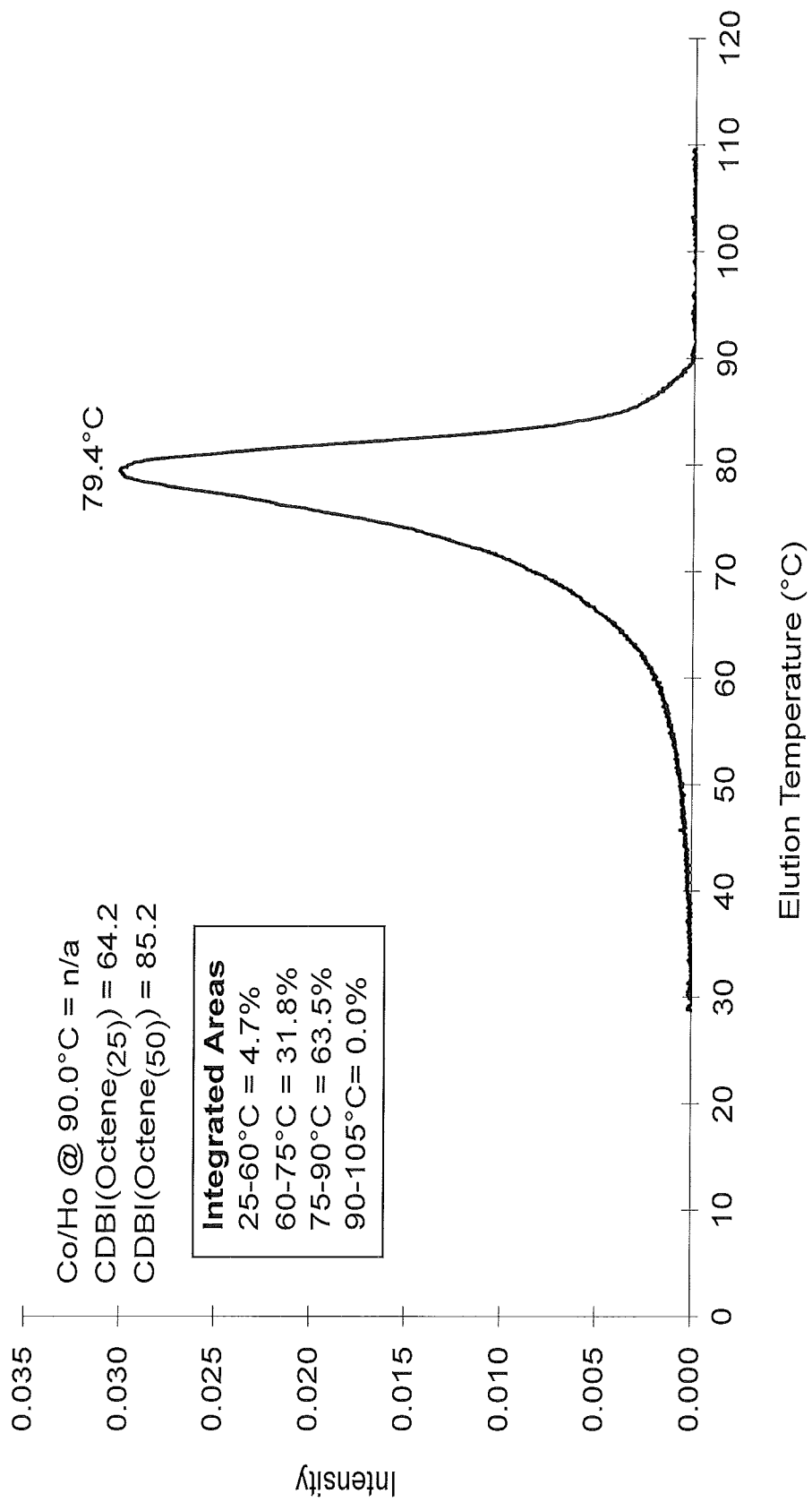
FIG. 26. shows the TREF profile for the polymer obtained in polymerization Run No. 33 (carried out at 190° C.) which employed the catalyst of Example 12.

The catalyst site behaviour of a series of phosphinimine complexes containing the P-bonded octamethyloctahydrodibenzofluorenyl, $C_{29}H_{37}$ (Ex. 8, 11, and 12), or 9-alkyl-substituted-octamethyloctahydrodibenzofluorenyl, 9-$RC_{29}H_{36}$ (Ex. 9 and 10), fragments was also examined. Comparing copolymers from runs 27 (with Ex. 11) and 23 (with Ex. 8), both conducted at 140° C., it is apparent that the di-tert-butyl complex Ex. 11 exhibited multisite behaviour while Ex. 8 did not. Copolymer run 27 had $M_w/M_n$ of 2.57, a broad trimodal TREF profile ($CDBI_{50}$ of 81.4 wt %), and sloped SCB distribution in the GPC-FTIR, while copolymer from run 23 showed $M_w/M_n$ of 1.62, flat SCB distribution, and $CDBI_{50}$ of 91.2 wt % indicative of single-site behaviour (compare FIGS. 9 and 10 for run 23 with FIGS. 13 and 14 for run 27). This observation correlates with Ex. 8 exhibiting a sharp $^1$H NMR spectrum while Ex. 11 exhibits dynamic NMR behaviour and a large, measurable free energy of activation. Increasing the ligand steric bulk on Ex. 8 by functionalizing the 9-fluorenyl position with $CH_3$ (Ex. 9) or allyl, $CH_2CH=CH_2$ (Ex. 10) did not result in either dynamic NMR behaviour or indication of distinct multisite catalyst behaviour. Copolymer runs 24 (from Ex. 9) and 25 (from Ex. 10) both had narrow $M_w/M_n$ of 1.70 and 1.84 consistent with single-site behaviour.

The copolymerization behaviour of phosphinimine catalysts Ex. 11 and 12 were examined over a range of four reactor temperatures (130, 140, 160, and 190° C.) in order to probe the impact on the multisite behaviour. In both cases, the lowest reaction temperature (130° C.) gave the most distinct multisite behaviour (non-uniform SCB distribution and multimodal TREF profile) and the highest reaction temperature (190° C.) gave the most single-site behaviour (flattened SCB distribution by GPC-FTIR and unimodal TREF profile). Runs 26-29 with phosphinimine catalyst Ex. 11 gave copolymers that went from broad, trimodal TREF ($CDBI_{50}$ of 77.9 wt %) and non-uniform SCB distribution at 130° C. (run 26) to a slightly broad but unimodal TREF ($CDBI_{50}$ of 85.5 wt %) with flat SCB distribution at 190° C. (see Table 3 and FIGS. 11-18). Although runs 30-33 with catalyst Ex. 12, the (pentafluorophenyl)cyclopentadienyl analogue of Ex. 11, gave similar trends (see Table 3 and FIGS. 19-26), the differences in the polymer compositions (i.e., the distribution and elution temperatures of the TREF fractions and extent of non-uniformity in the GPC-FTIR profiles) suggest that the performance of the catalyst can be fine-tuned through structural modification of the other ancillary ligands. These observations of increasing single-site behaviour with increasing temperature are consistent with the hypothesis that higher temperature results in a rapid interchange of rotational isomers and an averaging of the catalyst structure during polymerization.

The comparative 1,3-dimethylindenyl phosphinimine complex Ex. 13 gave a copolymer from run 34 at 140° C. that had a very narrow $M_w/M_n$ of 1.65. This observation is consistent with the hypothesis that the sharp $^1$H NMR spectrum indicates that there is no substantial barrier to interchange of rotational isomers and that a uniform, averaged catalyst site behaviour results.

The multisite behaviour described above for the inventive catalysts Ex. 5, 6, 7, 11, and 12 is contrasted with distinctly single-site behaviour with comparative phosphinimines Ex. 14 and 15. Runs 35 and 37 conducted at 140° C. with Ex. 14 and 15, respectively, gave copolymers with narrow $M_w/M_n$ (1.74 and 1.63), narrow and unimodal TREF profiles ($CDBI_{50}$ 96.0 and 94.4 wt %), and flat SCB distributions (see FIGS. 27-30).

The catalyst activities of Ex. 11 and 12, while comparatively low at lower reactor temperatures, become competitive with comparative phosphinimine catalysts Ex. 14 and 15 at reactor temperature of 190° C. Runs 29 (Ex. 11) and 33 (Ex. 12) had kp of 1190 and 2308 mM$^{-1}$.min$^{-1}$, while runs 36 (Ex. 14) and 38 (Ex. 15) had $k_p$ of 2079 and 4457, respectively. These results suggest that the inventive catalysts have commercially useful catalyst activity over a range of reactor temperatures.

Polyethylene copolymers composed of resin components with broader (non-uniform) comonomer compositions and broader molecular weight distributions could bring commercial advantages. For example, an ethylene copolymer having a mixed microstructure derived from a catalyst having a mixture of single site and multisite catalyst behaviors may provide a balance of good dart impact values, processability and tear properties, as well as good optical properties.

TABLE 2

Ethylene/1-Octene Copolymerization Conditions

| Polymerization Run. No. | Catalyst complex (¹H NMR spectrum description) | [Ti] (μM) | B (from borate)/Ti | Al (from MMAO-7)/Ti | BHEB/Al | Reactor temp. (° C.) | C2 flow (g/min) | C8/C2 | C2 conversion, Q (%) | $k_p$ (mM$^{-1}$·min$^{-1}$) |
|---|---|---|---|---|---|---|---|---|---|---|
| 16 | Ex. 1 (sharp) | 2.85 | 1.2 | 80 | 0.6 | 140 | 2.1 | 0.50 | 89.8 | 1190 |
| 17 | Ex. 2 (sharp) | 2.92 | 1.2 | 80 | 0.6 | 140 | 2.1 | 0.50 | 89.6 | 1134 |
| 18 | Ex. 3 (sharp) | 17.10 | 1.2 | 90 | 0.6 | 140 | 2.1 | 0.50 | 89.9 | 200 |
| 19 | Ex. 4 (sharp) | 1.90 | 1.2 | 80 | 0.6 | 140 | 2.1 | 0.50 | 90.2 | 1873 |
| 20 | Ex. 5 (dynamic) | 2.78 | 1.2 | 80 | 0.3 | 140 | 2.1 | 0.50 | 89.6 | 1196 |
| 21 | Ex. 6 (dynamic) | 2.64 | 1.2 | 8 (scavenging level only) | 0.3 | 140 | 2.1 | 0.50 | 89.5 | 1249 |
| 22 | Ex. 7 (dynamic) | 3.70 | 1.2 | 100 | 0.3 | 140 | 2.1 | 0.50 | 90.7 | 1016 |
| 23 | Ex. 8 (sharp) | 1.90 | 1.2 | 100 | 0.6 | 140 | 2.1 | 0.50 | 89.8 | 1786 |
| 24 | Ex. 09 (sharp) | 1.64 | 1.2 | 81 | 0.6 | 140 | 2.1 | 0.50 | 90.4 | 2206 |
| 25 | Ex. 10 (sharp) | 1.90 | 1.2 | 99 | 0.6 | 140 | 2.1 | 0.50 | 89.4 | 1705 |
| 26 | Ex. 11 (dynamic) | 4.63 | 1.2 | 100 | 0.3 | 130 | 1.9 | 0.50 | 89.4 | 699 |
| 27 | Ex. 11 (dynamic) | 3.70 | 1.2 | 100 | 0.3 | 140 | 2.1 | 0.50 | 90.8 | 1023 |
| 28 | Ex. 11 (dynamic) | 2.96 | 1.2 | 100 | 0.3 | 160 | 2.7 | 0.50 | 90.4 | 1224 |
| 29 | Ex. 11 (dynamic) | 2.96 | 1.2 | 100 | 0.3 | 190 | 3.5 | 0.50 | 90.1 | 1190 |
| 30 | Ex. 12 (dynamic) | 2.65 | 1.2 | 100 | 0.3 | 130 | 1.9 | 0.50 | 89.8 | 1278 |
| 31 | Ex. 12 (dynamic) | 2.04 | 1.2 | 100 | 0.3 | 140 | 2.1 | 0.50 | 90.2 | 1747 |
| 32 | Ex. 12 (dynamic) | 0.98 | 1.2 | 100 | 0.3 | 160 | 2.7 | 0.50 | 90.7 | 3828 |
| 33 | Ex. 12 (dynamic) | 1.37 | 1.2 | 99 | 0.3 | 190 | 3.5 | 0.50 | 89.1 | 2308 |
| 34 | Ex. 13 (sharp) | 1.83 | 1.4 | 49 | 0.4 | 140 | 2.1 | 0.50 | 89.6 | 1803 |
| 35 | Ex. 14 (sharp) | 0.74 | 1.2 | 90 | 0.6 | 140 | 2.1 | 0.50 | 90.7 | 5048 |
| 36 | Ex. 14 (sharp) | 1.60 | 1.2 | 100 | 0.8 | 190 | 3.5 | 0.50 | 89.6 | 2079 |
| 37 | Ex. 15 (sharp) | 0.19 | 1.2 | 161 | 0.3 | 140 | 2.1 | 0.50 | 89.7 | 18080 |
| 38 | Ex. 15 (sharp) | 0.74 | 1.2 | 160 | 0.3 | 190 | 3.5 | 0.50 | 89.5 | 4457 |

Note:
C2 = ethylene;
C8 = 1-octene;
Q = conversion in weight percent ethylene consumed

TABLE 3

Copolymer Properties

| Polymerization Run No. | 16 | 17 | 18 | 19 | 20 |
|---|---|---|---|---|---|
| Catalyst complex (¹H NMR spectrum description) | Ex. 1 (sharp) | Ex. 2 (sharp) | Ex. 3 (sharp) | Ex. 4 (sharp) | Ex. 5 (dynamic) |
| Reactor temperature (° C.) | 140 | 140 | 140 | 140 | 140 |
| FTIR 1-octene content (weight percent, wt %) | 8.5 | 11.6 | 9.4 | 10.1 | 8.8 |
| FTIR Short Chain Branching per 1000 carbon atoms (SCB per 1000 C) | 11.4 | 15.9 | 12.7 | 13.6 | 11.8 |
| $M_n$ | 54495 | 35952 | 51729 | 44318 | 58650 |
| $M_w$ | 104286 | 74039 | 106388 | 85886 | 119852 |
| $M_z$ | 183714 | 130629 | 172887 | 140472 | 196500 |
| $M_w/M_n$ | 1.91 | 2.06 | 2.06 | 1.94 | 2.04 |
| TREF profile | | | | | broad, trimodal |
| Peak Elution Temperature (° C.) in the TREF (sh. = shoulder) | | | | | 86.3 (major), 80.1 (sh.), 63.6 (sh.) |
| 25-60° C. fraction (wt %) in TREF | | | | | 4.6 |
| 60-75° C. fraction (wt %) in TREF | | | | | 13.6 |
| 75-90° C. fraction (wt %) in TREF | | | | | 81.8 |
| 90-105° C. fraction (wt %) in TREF | | | | | 0 |
| $CDBI_{25}$ (wt %) | | | | | 54.2 |
| $CDBI_{50}$ (wt %) | | | | | 83.7 |
| Comonomer Distribution Profile (GPC-FTIR) | | | | | normal |
| Maximum SCB/1000C (log MW), Minimum SCB/1000C (log MW) | | | | | 15.0 (4.3), 9.3 (5.2) |
| Δ(SCB/1000C) across molecular weight distribution (i.e. Maximum SCB/1000C − Minimum SCB/1000C) | | | | | 5.7 |

TABLE 3

| Copolymer Properties (cont.) | | | | |
|---|---|---|---|---|
| Polymerization Run No. | 21 | 22 | 23 | 24 |
| Catalyst complex | Ex. 6 (dynamic) | Ex. 7 (dynamic) | Ex. 8 (sharp) | Ex. 9 (sharp) |
| Reactor temperature (° C.) | 140 | 140 | 140 | 140 |
| FTIR 1-octene content (weight percent, wt %) | 9.0 | 13.6 | 11.5 | 6.6 |
| FTIR SCB per 1000 C | 12.1 | 19.0 | 15.7 | 8.7 |
| $M_n$ | 61206 | 36928 | 59425 | 47290 |
| $M_w$ | 119590 | 77521 | 96423 | 80579 |
| $M_z$ | 193012 | 124321 | 145103 | 121351 |
| $M_w/M_n$ | 1.95 | 2.10 | 1.62 | 1.70 |
| TREF profile | broad, trimodal | broad, bimodal | narrow, bimodal | |
| Peak Elution Temperature (° C.) in the TREF (sh. = shoulder) | 84.8 (major), 80.0, 64.1 (sh.) | 87.3 (minor), 69.7 (br. major) | 87.0, 74.8 (major) | |
| 25-60° C. fraction (wt %) in TREF | 4.9 | 17.2 | 3.0 | |
| 60-75° C. fraction (wt %) in TREF | 16.4 | 62.2 | 63.5 | |
| 75-90° C. fraction (wt %) in TREF | 78.7 | 20.6 | 33.5 | |
| 90-105° C. fraction (wt %) in TREF | 0 | 0 | 0 | |
| $CDBI_{25}$ (wt %) | 59.2 | 56.1 | 77.7 | |
| $CDBI_{50}$ (wt %) | 84.3 | 81.9 | 91.2 | |
| Comonomer Distribution Profile (GPC-FTIR) | normal | normal | flat | — |
| Maximum SCB/1000C (log MW), Minimum SCB/1000C (log MW) | 15.2 (4.4), 11.0 (5.2) | 21.2 (4.1), 17.4 (5.4) | | |
| Δ(SCB/1000C) across molecular weight distribution (i.e. Maximum SCB/1000C − Minimum SCB/1000C) | 4.2 | 3.8 | | |

| Polymerization Run No. | 25 | 26 | 27 | 28 | 29 |
|---|---|---|---|---|---|
| Catalyst complex ($^1$H NMR spectrum description) | Ex. 10 (sharp) | Ex. 11 (dynamic) | Ex. 11 (dynamic) | Ex. 11 (dynamic) | Ex. 11 (dynamic) |
| Reactor temperature (° C.) | 140 | 130 | 140 | 160 | 190 |
| FTIR 1-octene content (weight percent, wt %) | 11.7 | 10.8 | 10.6 | 9.1 | 8.0 |
| FTIR SCB per 1000 C | 16.0 | 14.7 | 14.5 | 12.2 | 10.6 |
| $M_n$ | 40936 | 58285 | 40398 | 37205 | 23544 |
| $M_w$ | 75471 | 137094 | 103637 | 76051 | 46719 |
| $M_z$ | 118315 | 242280 | 183416 | 119672 | 71465 |
| $M_w/M_n$ | 1.84 | 2.35 | 2.57 | 2.04 | 1.98 |
| TREF profile | | broad, trimodal | broad, trimodal | broad, unimodal | unimodal |
| Peak Elution Temperature (° C.) in the TREF (sh. = shoulder) | | 87.9, 79.3 (major), 62.4 | 86.5 (sh.), 78.9 (major), 62.1 (sh.) | 80.7 | 82.2 |
| 25-60° C. fraction (wt %) in TREF | | 10.6 | 8.9 | 4.6 | 3.0 |
| 60-75° C. fraction (wt %) in TREF | | 18.8 | 21.1 | 17.5 | 16.1 |
| 75-90° C. fraction (wt %) in TREF | | 70.6 | 69.9 | 77.9 | 80.8 |
| 90-105° C. fraction (wt %) in TREF | | 0 | 0 | 0 | 0.1 |
| $CDBI_{25}$ (wt %) | | 59.7 | 63.0 | 64.5 | 66.7 |
| $CDBI_{50}$ (wt %) | | 77.9 | 81.4 | 85.2 | 85.5 |
| Comonomer Distribution Profile (GPC-FTIR) | | Normal | normal | nearly flat | flat |
| Maximum SCB/1000C (log MW), Minimum SCB/1000C (log MW) | | 18.6 (4.4), 11.0 (5.6) | 17.3 (4.3), 11.8 (5.3) | — | — |
| Δ(SCB/1000C) across molecular weight distribution (i.e. Maximum SCB/1000C − Minimum SCB/1000C) | | 7.6 | 5.5 | | |

| Polymerization Run No. | 30 | 31 | 32 | 33 |
|---|---|---|---|---|
| Catalyst complex ($^1$H NMR spectrum description) | Ex. 12 (dynamic) | Ex. 12 (dynamic) | Ex. 12 (dynamic) | Ex. 12 (dynamic) |
| Reactor temperature (° C.) | 130 | 140 | 160 | 190 |
| FTIR 1-octene content (weight percent, wt %) | 12.3 | 12.1 | 11.0 | 9.5 |
| FTIR SCB per 1000 C | 17 | 16.7 | 15.0 | 12.8 |
| $M_n$ | 47651 | 40033 | 30302 | 17668 |
| $M_w$ | 96021 | 79095 | 53783 | 34370 |
| $M_z$ | 155592 | 123527 | 80770 | 52378 |
| $M_w/M_n$ | 2.02 | 1.98 | 1.77 | 1.95 |
| TREF profile | broad, bimodal | broad, trimodal | broad, bimodal | broad, unimodal |
| Peak Elution Temperature (° C.) in the TREF (sh. = shoulder) | 85.5, 70.8 (major) | 89.3, 78.3 (sh.), 72.6 (major) | 87.6, 76.1 (major) | 79.4 |
| 25-60° C. fraction (wt %) in TREF | 14.6 | 9.3 | 7.5 | 4.7 |
| 60-75° C. fraction (wt %) in TREF | 63.6 | 50.9 | 48.5 | 31.8 |
| 75-90° C. fraction (wt %) in TREF | 21.7 | 39.1 | 44.0 | 63.5 |
| 90-105° C. fraction (wt %) in TREF | 0.1 | 0.7 | 0 | 0 |
| $CDBI_{25}$ (wt %) | 56.8 | 50.3 | 65.4 | 64.2 |
| $CDBI_{50}$ (wt %) | 73.5 | 76.6 | 83.7 | 85.2 |
| Comonomer Distribution Profile (GPC-FTIR) | normal | normal | Flat | flat |
| Maximum SCB/1000C (log MW), Minimum SCB/1000C (log MW) | 18.5 (4.3), 15.3 (5.4 | 17.3 (4.3), 15.3 (5.2) | — | — |

TABLE 3-continued

| Copolymer Properties (cont.) | | | | | |
|---|---|---|---|---|---|
| Δ(SCB/1000C) across molecular weight distribution (i.e. Maximum SCB/1000C − Minimum SCB/1000C) | 3.2 | 2.0 | — | — | |

| Polymerization Run No. | 34 | 35 | 36 | 37 | 38 |
|---|---|---|---|---|---|
| Catalyst complex (¹H NMR spectrum description) | Ex. 13 (sharp) | Ex. 14 (sharp) | Ex. 14 (sharp) | Ex. 15 (sharp) | Ex. 15 (sharp) |
| Reactor temperature (° C.) | 140 | 140 | 190 | 140 | 190 |
| FTIR 1-octene content (weight percent, wt %) | 7.6 | 6.9 | 8.0 | 6.1 | 6.3 |
| FTIR SCB per 1000 C | 10.0 | 9.0 | 10.6 | 8.0 | 8.3 |
| $M_n$ | 74972 | 76478 | 30749 | 78949 | 34539 |
| $M_w$ | 123706 | 132756 | 49477 | 128555 | 53852 |
| $M_z$ | 188005 | 210354 | 70206 | 190248 | 75438 |
| $M_w/M_n$ | 1.65 | 1.74 | 1.61 | 1.63 | 1.56 |
| TREF profile | | unimodal, narrow | | unimodal, narrow | |
| Peak Elution Temperature (° C.) in the TREF (sh. = shoulder) | | 84.5 | | 86.1 | |
| 25-60° C. fraction (wt %) in TREF | | 0.5 | | 0.5 | |
| 60-75° C. fraction (wt %) in TREF | | 2.1 | | 1.9 | |
| 75-90° C. fraction (wt %) in TREF | | 97.4 | | 97.6 | |
| 90-105° C. fraction (wt %) in TREF | | 0 | | 0 | |
| $CDBI_{25}$ (wt %) | | 89.3 | | 86.1 | |
| $CDBI_{50}$ (wt %) | | 96.0 | | 94.4 | |
| Comonomer Distribution Profile (GPC-FTIR) | | Flat | | flat | |
| Maximum SCB/1000C (log MW), Minimum SCB/1000C (log MW) | | — | | — | |
| Δ(SCB/1000C) across molecular weight distribution (i.e. Maximum SCB/1000C − Minimum SCB/1000C) | | — | | — | |

INDUSTRIAL APPLICABILITY

Phosphinimine catalysts are important catalysts for use in the solution phase polymerization of ethylene and alpha olefins into commercially useful polyethylene thermoplastic materials. The present invention provides phosphinimine catalysts exhibiting thermally tunable polymerization behavior which allows for increased levels of control over a polyethylene copolymer microstructure.

The invention claimed is:

1. A phosphinimine polymerization catalyst having the following structure:

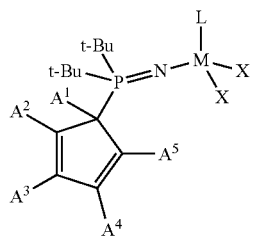

wherein M is Ti, Zr or Hf; L is a cyclopentadienyl type ligand; each X is independently an activatable ligand; $A^1$ is a H or a substituted or unsubstituted alkyl group; $A^2$ and $A^5$ are independently an acyclic or a cyclic hydrocarbyl group or an acyclic or a cyclic heteroatom containing hydrocarbyl group; $A^3$ and $A^4$ are independently a H, a halide, an acyclic or a cyclic hydrocarbyl group or an acyclic or a cyclic heteroatom containing hydrocarbyl group; and where any of $A^2$ to $A^5$ may be part of a cyclic hydrocarbyl group or a cyclic heteroatom containing hydrocarbyl group.

2. The phosphinimine polymerization catalyst of claim 1 wherein the L is a substituted cyclopentadienyl ligand.

3. The phosphinimine polymerization catalyst of claim 1 where the L is a cyclopentadienyl ligand substituted with a $C_6F_5$- group.

4. The phosphinimine polymerization catalyst of claim 1 wherein $A^1$ is a H or a straight chain alkyl group and each of $A^2$, $A^3$, $A^4$ and $A^5$ is a methyl group.

5. The phosphinimine polymerization catalyst of claim 1 wherein

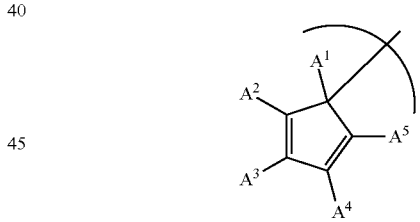

is substituted at $A^2$ to $A^5$ to form an indenyl group having the structure:

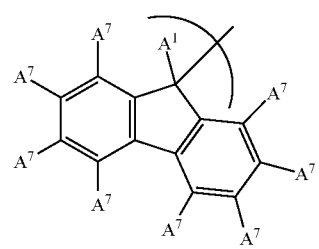

wherein $A^1$ is a H or a straight chain alkyl group; each $A^7$ is independently a H, a halide, an acyclic or a cyclic hydrocarbyl group or an acyclic or a cyclic heteroatom containing hydrocarbyl group, and where any $A^7$ may be part of a cyclical hydrocarbyl group or a cyclical heteroatom containing hydrocarbyl group.

6. The phosphinimine polymerization catalyst of claim 1 wherein

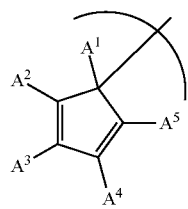

is substituted at $A^2$ to $A^5$ to form a structure selected from the group consisting of:

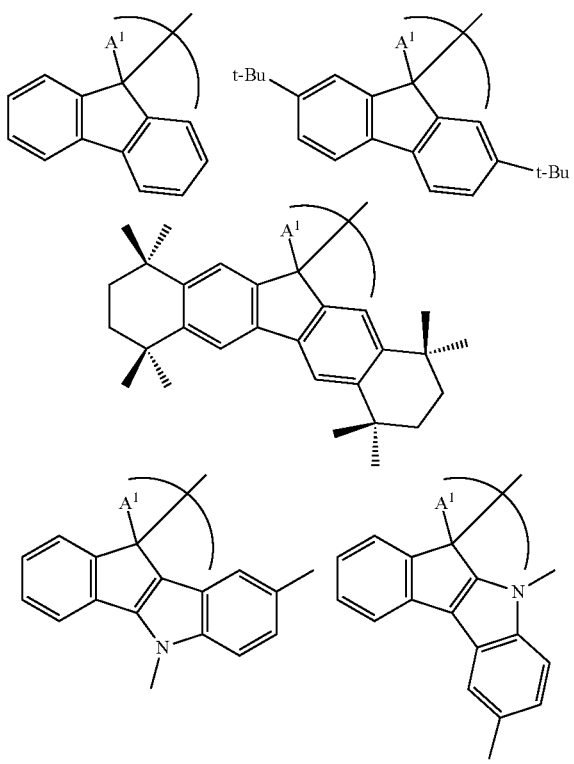

and wherein $A^1$ is a H or a straight chain alkyl group.

7. The phosphinimine polymerization catalyst of claim 1 wherein

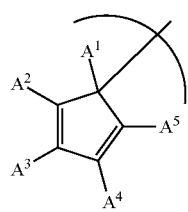

is substituted at $A^2$ to $A^5$ to form a structure selected from the group consisting of:

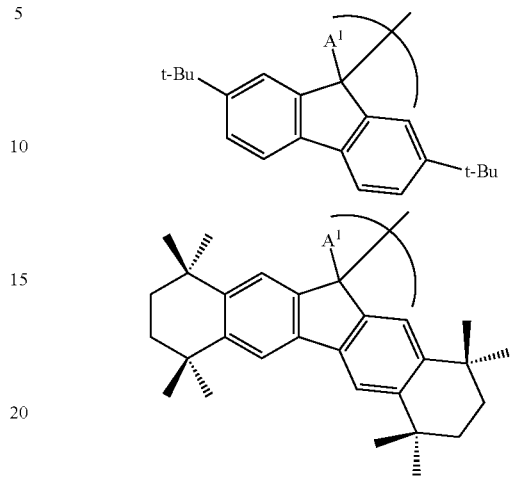

and wherein $A^1$ is a H or a straight chain alkyl group.

8. The phosphinimine polymerization catalyst of claim 1 wherein $A^1$ is H.

9. The phosphinimine polymerization catalyst of claim 1 wherein M is Ti.

10. The phosphinimine polymerization catalyst of claim 1 wherein M is Hf.

11. A solution polymerization process comprising polymerizing ethylene with one or more $C_{3-12}$ alpha olefins in a solvent in the presence of a catalyst system comprising:

i) a phosphinimine polymerization catalyst having the following structure:

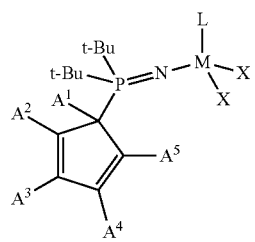

wherein M is Ti, Zr or Hf; L is a cyclopentadienyl type ligand; each X is independently an activatable ligand; $A^1$ is a H or an alkyl group; $A^2$ and $A^5$ are a hydrocarbyl group or heteroatom containing hydrocarbyl group; $A^3$ and $A^4$ are H, a hydrocarbyl group, or a heteroatom containing hydrocarbyl group; and where any of $A^2$ to $A^5$ may be part of a cyclic hydrocarbyl group or a cyclic heteroatom containing hydrocarbyl group; and ii) a catalyst activator selected from the group consisting of an ionic activator, an alkylaluminoxane and a mixture thereof.

* * * * *